(12) United States Patent
Cloonan et al.

(10) Patent No.: US 11,108,657 B2
(45) Date of Patent: Aug. 31, 2021

(54) QOE-BASED CATV NETWORK CAPACITY PLANNING AND UPGRADE SYSTEM

(71) Applicant: ARRIS Enterprises LLC, Suwanee, GA (US)

(72) Inventors: Thomas J. Cloonan, Lisle, IL (US); Ruth Cloonan, Lisle, IL (US); Santhana Chari, Johns Creek, GA (US); John Ulm, Pepperell, MA (US); Michael J. Emmendorfer, Saint Peters, MO (US); Benjamin Widrevitz, Downers Grove, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 160 days.

(21) Appl. No.: 15/976,406

(22) Filed: May 10, 2018

(65) Prior Publication Data

US 2018/0367421 A1  Dec. 20, 2018

Related U.S. Application Data

(60) Provisional application No. 62/520,968, filed on Jun. 16, 2017.

(51) Int. Cl.
*H04L 12/24* (2006.01)
*H04L 12/26* (2006.01)

(52) U.S. Cl.
CPC .......... *H04L 41/5067* (2013.01); *H04L 41/14* (2013.01); *H04L 41/5006* (2013.01); *H04L 41/5035* (2013.01); *H04L 43/022* (2013.01); *H04L 41/0893* (2013.01); *H04L 41/0896* (2013.01); *H04L 41/5016* (2013.01); *H04L 41/5038* (2013.01); *H04L 43/0876* (2013.01)

(58) Field of Classification Search
USPC ....................................................... 709/223
See application file for complete search history.

(56) References Cited

U.S. PATENT DOCUMENTS

2006/0031288 A1* 2/2006 Ter Horst ............ G06F 16/9535
709/204
2008/0273591 A1* 11/2008 Brooks ................ H04N 7/1675
375/240.01
2011/0143811 A1* 6/2011 Rodriguez ......... G06K 9/00986
455/556.1
2012/0063347 A1* 3/2012 Rui ..................... H04L 43/0882
370/252

(Continued)

FOREIGN PATENT DOCUMENTS

BR  102013016740 A2  3/2015
WO  2004/036814 A2  4/2004

OTHER PUBLICATIONS

Tom Cloonan et. al., Simulating the Impact of QoE on Per-Service Group HSD Bandwidth Capacity Requirements, in 2014 Proceedings of SCTE Cable Tec Expo, SCTE, 2014.

(Continued)

*Primary Examiner* — Umar Cheema
*Assistant Examiner* — John Fan
(74) *Attorney, Agent, or Firm* — Chernoff, Vilhauer, McClung & Stenzel, LLP

(57) ABSTRACT

Systems and methods for analyzing network parameters in a data communications network so as to maintain a desired Quality of Experience (QoE) of at least one subscriber.

14 Claims, 23 Drawing Sheets

(56) References Cited

U.S. PATENT DOCUMENTS

2014/0341566 A1 11/2014 Smith
2015/0341812 A1* 11/2015 Dion ..................... H04W 24/08
370/252

OTHER PUBLICATIONS

Grimstead, Charles M. et al, "Introduction to Probablity" American Mathematical Society, 2nd Revised Edition, URL: https://www.dartmouth.edu/~chance/teaching_aids/books_articles/probability_book/Chapter7.pdf.
PCT Search Report & Written Opinion, Re: Application No. PCT/US2018/032201, dated Jul. 17, 2018.
Z. Avramova, et al., "Capacity Gain of Mixed Multicast/Unicast Transport Schemes in a TV Distribution Network", IEEE Transactions on Multimedia, vol. 11, No. 5, Aug. 1, 2009, pp. 918-931.

* cited by examiner

QOE-BASED CATV NETWORK CAPACITY PLANNING AND UPGRADE SYSTEM

CROSS REFERENCE TO RELATED APPLICATIONS

This application is a non-provisional application claiming the benefit of U.S. Provisional Application Ser. No. 62/520,968, entitled "Big Data QoE-Based Capacity Planning and Capacity Modification System," which was filed on Jun. 16, 2017, and is incorporated herein by reference in its entirety.

BACKGROUND

The subject matter of this application generally relates to a network traffic engineering system for determining bandwidth, processing power, or other network requirements for maintaining a desired Quality-of Experience (QoE) to each of a group of individual users, or each set of a plurality of sets of users.

Traffic engineering is an important endeavour that attempts to quantify the network resources (e.g. link bandwidth capacity, processing power, etc.) required provide and/or maintain desired Quality of Experience levels for a single subscriber or for a combined set of subscribers who share interconnection links in the Internet or who share processing resources in a Server. For example, traffic engineering is useful to determine the number of telephone trunks required for telephone subscribers sharing a telephone link, or the number of touch-tone receivers that are needed in a central office to support a given set of telephone subscribers. Traffic engineering can also be used to determine the amount of LTE Wireless spectrum required for a set of mobile subscribers or the size of a cell in a Mobile Network environment, to determine the processing power required in a CMTS Core or the Ethernet bandwidth capacity required in a Spine/Leaf network or the DOCSIS bandwidth capacity required in an HFC plant connected to a RPHY Node for High-Speed Data delivery to DOCSIS subscribers connected to a single HFC plant. Thus, Traffic Engineering can be applied across a broad array of applications within a large number of infrastructure types (Voice, Video, and Data) used by a large number of Service Providers (Telcos, Cable MSOs, and Wireless Providers).

Traffic engineering usually combines various aspects of system architecture, statistics, cost analysis, and human factors to determine the appropriate amount of bandwidth capacity or processing power required to deliver content to subscribers at a quality satisfactory to them. It also simultaneously involves detailed cost analyses, since any proposed solution must also be cost effective to the service provider as well as, ultimately, the subscribers. "Keeping subscribers happy" at a cost reasonable to them is a difficult modelling exercise given the subjective nature of the issues: How happy are the subscribers today? How happy will they be in the future if no changes are made? How happy will they be in the future if changes are made? How much bandwidth capacity or processing power is required to keep them happy?

It is difficult to determine the QoE of each subscriber even for a present moment in time, which would probably require placing a probe on neurons within each subscriber's brain, a minute-by-minute survey to be filled out by each of the subscribers to track their opinions, or similar impossible, odious and/or impractical techniques. It is even more difficult to determine the QoE that each subscriber may have in the future when Internet application, traffic patterns, and Service Level Agreements have changed; trying to do so while also investigating many different network design options for the future can make the problem even more complicated. Nevertheless, these daunting calculations and predictions are necessary in order to steer future evolution of the network.

What is desired, therefore, is an improved traffic engineering system that more accurately assesses the network resource allocation necessary for providing and/or maintaining a desired QoE for individual subscribers and/or sets of subscribers.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
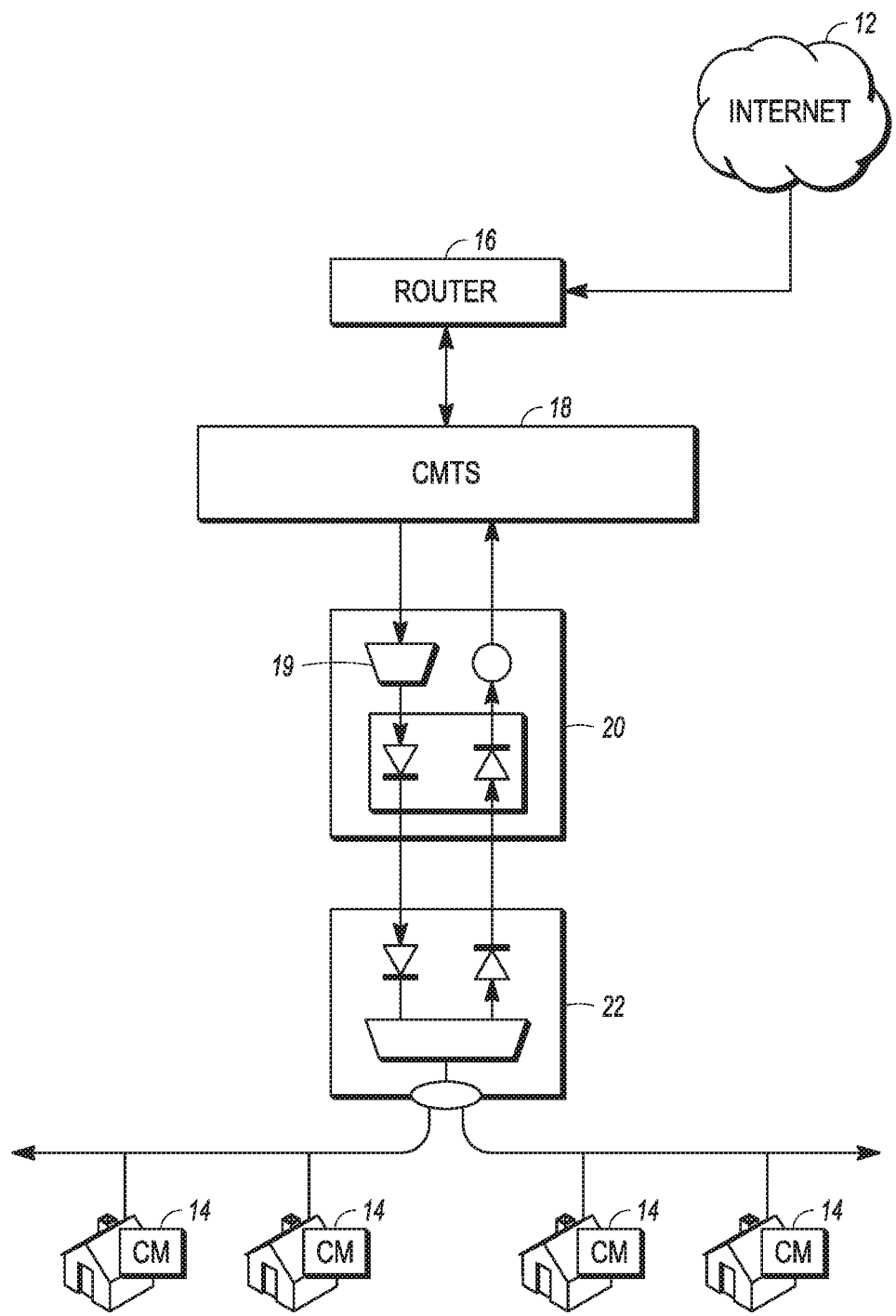
FIG. 1 shows an exemplary generic model of downstream CATV content flowing from the Internet to a subscriber.

As previously noted, determining existing and future QoE levels of subscribers is a complex but necessary task, which typically requires that traffic engineers resort to use of quantitative estimates of the subjective satisfaction of individual users. Preferably, these quantitative estimates rely on calculations based on easily-collectable metrics. Such metrics might include measurements of bandwidth vs. time, packet drops vs. time, and/or packet delays vs. time—each of which can be monitored either for a single subscriber or for a pool of subscribers. Ultimately, the numerical estimate of QoE levels is usually based on calculations of functions that combine such attainable metrics, and comparisons of the results of those functions against threshold values that respectively differentiate among a plurality of QoE levels.

Most of the traffic engineering methods known to date use relatively simple metrics, relatively simple formulae, and relatively simple threshold values to define adequate QoE for one or more subscribers. As a result, most existing methods have been somewhat inaccurate, and their ability to correctly predict the required amount of bandwidth capacity, or other network resources for Internet traffic is hampered by a numerous and significant problems. First, existing methods do not always account for the different average bandwidth usage patterns of different types of subscribers, i.e. different subscribers have significantly different uses for the Internet and other services.

Second, existing methods do not always account for the different peak bandwidth usage patterns of different types of subscribers, i.e. different subscribers will sign up for, and be permitted to transmit, peak bursts at different levels. Third, existing methods do not always account for the different types of applications being used by subscribers, i.e. different applications used by different subscribers may consume bandwidth very differently. Fourth, existing methods do not permit creation of various mixes of different types of subscribers and applications when calculating the Quality of Experience levels. For example, different markets may have different mixes of high-end subscribers and low-end subscribers, which should be reflected in QoE calculations, but to date are not.

Fifth, it is possible to simultaneously have some subscribers transmitting at their peak levels, some subscribers transmitting at moderate levels, and some subscribers are relatively idle and not transmitting much at all. Yet existing methods typically do not account for such concurrent, different transmission levels of multiple subscribers, or do so properly even when such an attempt is made.

Sixth, existing methods do not always provide a mechanism to project changes in bandwidth usage patterns (e.g. user's average bandwidth, user's peak bandwidth, application types, etc.) into the future or into the past. Stated differently, existing methods gave little or no means to project changes in bandwidth levels forward or backwards in time, but instead are fixated solely on instantaneous bandwidth levels.

Seventh, existing methods do not always provide a mechanism to permit providers to specify the required QoE levels for their subscribers. For example, different providers may want to give higher or lower QoE levels to their subscribers to match that which is offered by competitors, or to match the size of the financial budgets of the particular provider. As another example, some providers may wish to allow for different QoE levels for different groups of subscribers. Accordingly, a target QoE levels should in some instances be an input to one or more traffic engineering functions, but existing methods do not provide such flexibility.

Eighth, existing methods are not always applicable to groups of subscribers larger or smaller than the typical number of subscribers utilized, i.e. Multiple System Operators (MSOs) would only use formulae accurate for groups of "Service Group" subscribers whose sizes were less than approximately 400 subscribers, and thus precluded the formulae from being used in other applications where more subscribers were usual, such as an application where 40,000 subscribers are connected to an I-CMTS system, or 20,000 subscribers are connected to an Ethernet Switch or a Fiber Deep Service Group with 50 subscribers or less.

Ninth, existing methods do not always provide a mechanism to predict the actual user experience level, e.g. expected bandwidth levels vs. time, from their simple formulae. Rather, existing methods tend to be binary in nature (good or bad), ignoring the reality that Quality of Experience is a continuum.

Tenth, existing methods do not always provide guidance on the many paths that a provider could take to provide a desired Quality of Experience level. Eleventh, existing methods do not always use techniques that can be applied to different traffic types, i.e.—an ideal technique could be applied to many different traffic types, including Internet Traffic, Voice Traffic, Video Traffic, and any combinations of these various traffic types. Twelfth, existing methods may not always be applicable to the uniquely different characteristics of both Downstream Traffic and Upstream Traffic, which is important since both exist in the real world.

In the specification, the drawings, and the claims, the terms "forward path" and "downstream" may be interchangeably used to refer to a path from the Internet or provider to end-user or subscriber. Conversely, the terms "return path", "reverse path" and "upstream" may be interchangeably used to refer to a path from an end user or subscriber to the Internet or a provider.

To illustrate the various deficiencies of existing traffic engineering methods delineated above, consider an exemplary MSO environment where MSO traffic engineers have historically been tasked with determining the minimum amount of total High-Speed Data DOCSIS Bandwidth Capacity (measured in Mbps) required to maintain "acceptable" Quality of Experience levels across a particular set of subscribers, who together must share that Bandwidth Capacity within a "Service Group." These "Service Groups" are usually defined as the subscribers connected to a single CMTS downstream port, with one or more associated upstream ports. The subscribers reside on the coaxial links of a Hybrid Fiber Coax (HFC) system emanating from a single Optical Fiber Node, which converts optical signals on a fiber into RF signals on a coax. A CMTS Service Group (SG) may span multiple Optical Fiber Nodes. Alternatively, a single Optical Fiber Node may be segmented using multiple wavelengths and contain multiple CMTS SGs.

It is usually assumed that the subscribers within the "Service Group" are characterized by the following parameters: (a) the number of subscribers sharing the bandwidth capacity within a "Service Group" is given by the value Nsub; (b) the subscribers are consuming an average per-subscriber busy-hour bandwidth of Tavg (measured in Mbps); and (c) each of the subscribers is signed up for one of several available Service Level Agreement (SLA) bandwidths (measured in Mbps) that limit the peak bandwidth levels of their transmissions. These SLAs are defined by the peak bandwidth levels offered to the subscribers. Tmax is the DOCSIS parameter that controls the peak bandwidth and is usually set to a value that is slightly higher (e.g. +10%) than the peak bandwidths associated with the customers' SLA, to account for networking overheads. The various SLA peak bandwidths can be identified by values given by Tmax_1, Tmax_2, . . . , Tmax_max (where Tmax_1<Tmax_2< . . . <Tmax_max. Tmax_max is therefore the highest Service Level Agreement with the highest permissible peak bandwidth level.

Obviously, the amount of Bandwidth Capacity offered to the group of Nsub subscribers must be at least sufficient to sustain the peak levels of bandwidth that will be consumed by a single active subscriber. However, it would also be expected that more than one subscriber could become active concurrently. Thus, it would be preferable to determined how many of the subscribers in the service group could be active concurrently. In theory, it is possible that all Nsub of the subscribers could be active concurrently, and if an MSO wished to provide adequate Bandwidth Capacity to support all of their subscribers simultaneously, passing bandwidth at their maximum permissible rate, the MSO could do so. However, that would be very expensive, and the probability of that circumstance occurring, i.e. all Nsub number of subscribers transmitting at their maximum rate at the same time, is so low that the resulting solution would be deemed over-engineered and overly expensive for its application. As a result, there is likely to be a level of concurrency somewhere between the first extreme or only one subscriber using bandwidth at any given instant and the second extreme of all subscribers simultaneously using maximum bandwidth that is the proper design target. Finding this "in-between" solution is, while challenging, one of the necessary tasks of an MSO Traffic Engineer and requires the MSO Traffic Engineer to specify a level of Quality of Experience that is deemed to be both feasible and adequate to keep the subscribers satisfied for a reasonable percentage of time.

Historically, MSO Traffic Engineers used simple rule-of-thumb formulae to determine the amount of required Bandwidth Capacity for a particular "Service Group." Some of the formulae that have been used include:

$$\text{Required Bandwidth Capacity} = N\text{sub} * T\text{avg} \tag{a}$$

$$\text{Required Bandwidth Capacity} = 2 * T\text{max\_max} \tag{b}$$

$$\text{Required Bandwidth Capacity} = 3 * T\text{max\_max} \tag{c}$$

$$\text{Required Bandwidth Capacity} = 1.43 * N\text{sub} * T\text{avg} \tag{d}$$

This last formula (d) causes MSOs to add more Bandwidth Capacity to the Service Group whenever the Service Group's average bandwidth usage level approaches ~70% of the available Bandwidth Capacity. The MSO could alternately reduce the size of the Service Group, e.g. "split nodes", reducing the Nsub component to increase the Bandwidth Capacity per Subscriber.

In addition, the present inventors posit the following formula, which provides good results for Service Groups" with a size of several hundred subscribers:

$$\text{Required Bandwidth Capacity} = N\text{sub} * T\text{avg} + K * T\text{max\_max} \tag{e}$$

Where the K parameter is a QoE coefficient, and it has been found that a value of K=1.2 works well for several hundred subscribers.

Those of ordinary skill in the art will recognize that the five formulae described above can move forward and backwards in time by re-calculating the Nsub and Tavg and Tmax_max values that are found at different points in time. However, these formulae nonetheless suffer from others of the twelve deficiencies listed above. Thus, there is a need within the field of network traffic engineering to find an acceptable technique that identifies the required bandwidth capacity for a service group in an Service Provider environment, while avoiding the twelve problem areas listed above. Such a novel technique would greatly benefit network traffic engineers within all fields and industries, e.g. Telco, MSO, Wireless, etc. In addition to the simplified formulae defined above, there have been other attempts at defining formulae to predict required bandwidth capacities for various types of traffic. The most famous formulae are those developed by Erlang and Engstad, which are predominantly used to predict the Required Bandwidth Capacities for Voice Traffic for telephone calls. These formulae introduced the notion of a "blocking probability", which permits the traffic engineer to somewhat specify an acceptable QoE level. In this case, the QoE was uniquely tied to the probability that a dialed phone call is blocked from being completed. While these formulae, and others like them, are (and may continue to be) useful tools to traffic engineers, each has several shortcomings for the applications of modern-day traffic engineers. First, they seem to be only applicable for voice traffic. Attempts to modify them to be used for other traffic types, e.g. video and high-speed data have been only partially successful, at best.

Moreover, these formulae usually make many simplifying assumptions about the nature of the traffic that do not necessarily match the statistics of real-world video and high-speed Data and Voice traffic of today. For example, some of the formulae derivations assume an infinite number of subscribers. The formulae sometimes assume that all subscribers have identical characteristics, sometimes assume that there is a Poisson Distribution that describes the number of calls that arrive in a given time window, and sometimes assume that the probability density function associated with the time interval between call arrivals is exponential. While all of these assumptions lead to simplifications in the associated mathematics and permit closed-form solutions to be developed, which, admittedly, are very useful, the statistics of the traffic loads that are assumed by these formulae often do not match the statistics of typical real-world traffic loads. This problem is exacerbated when these types of formulae are used to predict the required bandwidth capacity levels for non-voice traffic—i.e.—for video and high-speed Internet data traffic.

Specifically, regarding data traffic, there is not a single event that results in a "blocking" condition where service is denied; rather, congestion leads to reduced throughput and increased latencies and a gradual degradation of QoE. The traffic engineer thus needs to determine the acceptable degradation for the data application, hence it is not the binary scenario presented in legacy telephony applications.

The novel systems and methods disclosed within the present specification, approach the foregoing difficulties much more flexibly than existing systems and methods. The systems and methods disclosed herein preferably have any or all of the following characteristics. First, the disclosed systems and methods preferably do not force-fit traffic flows to a particular, statistical distribution (such as a Poisson distribution) simply because it is easy-to-use. Instead, the disclosed systems and methods preferably use analytical techniques that measure statistical distributions that correspond to actual traffic flows in the past or present, or likely actually future traffic flows extrapolated from currently measurable statistical distributions.

Second, the disclosed systems and methods preferably use easy-to-observe and easy-to-measure metrics to specify the QoE levels experienced by subscribers.

Third, the disclosed systems and methods preferably provide for solutions implementable using any one or more of the following approaches:
  (1) Calculating the QoE level given a Service Group size (Nsub) and given a particular set of characteristics (e.g. Tavg, Tmax and application type) for a given subscriber mix and a given actual available bandwidth capacity;
  (2) Calculating the required bandwidth capacity given a Service Group size (Nsub) and given a particular set of characteristics (e.g. Tavg, Tmax, and application type) for a given subscriber mix and a given a required Quality of Experience level;
  (3) Calculating the permissible Service Group size (Nsub) given the required Quality of Experience level and given the actual Available Bandwidth Capacity and given a particular set of characteristics (e.g. Tavg, Tmax, and application types) for a given subscriber mix;
  (4) Calculating Permissible sets of characteristics (e.g. Tavg, Tmax, and application types) for a given subscriber mix and a given "Service Group" size (Nsub), a given required Quality of Experience level, and a given actual Available Bandwidth Capacity;
  (5) Calculating a set of permissible Service Group sizes (Nsub values) along with a "minimalist" set of characteristics (Tavg, Tmax, and application types) for a given subscriber mix, required QoE level, and actual Available Bandwidth Capacity; and
  (6) Calculating a Service Group sizes (Nsub value) along with a set of characteristics (Tavg, Tmax, and application types) that satisfy a desired rule for a given subscriber mix, required QoE level, and actual Available Bandwidth Capacity.

Fourth, the disclosed systems and methods preferably provide for solutions that address any one or more of the problems identified earlier with respect to existing traffic engineering methods. In particular, the disclosed systems and methods preferably:
  (a) Permit different subscribers to have different average bandwidth levels, as they do in the real world;
  (b) Permit different subscribers to have different peak bandwidth levels, as they do in the real world;
  (c) Permit different subscribers to run different applications that have different bandwidth usage levels, as they do in the real world;
  (d) Permit mixes of different types of subscribers and application types to be combined within a "Service Group," as such diverse mixes exist in the real world;
  (e) Permit accurate modeling of concurrency levels among the mixes of subscribers and application types, to mimic the real world;
  (f) Permit calculations (such as required bandwidth capacity) to be made for all points along a time-line instead of only being made for the present;
  (g) Permit providers to specify QoE levels to match their own needs and constraints, to mimic the real world;
  (h) Permit calculations that can be applied to any sized Service Group, thus making such calculations useful for predicting required bandwidth capacities for many different network components, regardless of size;
  (i) Permit calculations for tying QoE levels to real-world experiences, to predict what user's will actually experience;
  (j) Permit calculations to specify many different paths that can be used by providers to correct any QoE issues, such as adding bandwidth, reducing subscribers, re-arranging the mix of subscribers, etc.
  (k) Permit calculations that can be utilized for any traffic type, e.g. voice, video, high-speed data, etc.; and
  (l) Permit calculations that can be utilized for both downstream and upstream traffic, as in the real world.

Preferably, some embodiments of the disclosed systems and methods accomplish all of the above goals.

The present disclosure will initially describe an embodiment following approach (1) above, with respect to downstream traffic flowing from the Internet to the subscriber). Approach (1) calculates the QoE level given a "Service Group" size (Nsub) and given a particular set of characteristics (Tavg, Tmax, and application types being used) for a given subscriber mix and a given actual available bandwidth capacity. Thereafter, the present disclosure will describe how approach (1) can be slightly modified to support the approaches (2), (3), and (4). The disclosure will also outline how this method can be slightly modified to support Upstream Traffic.

FIG. 1 shows a generic model 10 of downstream traffic from the Internet 12 to a plurality of subscribers 14, as that traffic passes through a set of network elements, including router 16 and CMTS 18, on its way to a particular shared resource, e.g. an egress link 20 emanating from that CMTS). In particular the illustrated generic model 10 shows downstream traffic flowing into a CMTS 18 that then steers, queues, and schedules packet streams arriving at the CMTS to an individual egress DOCSIS link 20 shared by two hundred (Nsub) subscribers 14 via a fiber node 22.

It can be seen from this figure that traffic streaming from the Internet 12 on a 100 Gbps high-speed link flows to router 16. The traffic is then streamed from the Router 16 on a 10 Gbps high-speed link that flows to CMTS 18. The CMTS 18 has several (e.g. one hundred) DOCSIS MAC domains that have DOCSIS channels inside them. The CMTS 18 will steer some of the packets to MAC domain 1. It can be seen that this particular MAC domain creates a potential bottleneck in the downstream direction since there is approximately 864 Mbps of shared bandwidth capacity in the 24-bonded downstream DOCSIS channels emanating from MAC domain 1. The 24 DOCSIS channels in the MAC domain feed the sub-tending cable modems, which in this example, number two hundred, which each share the bandwidth capacity within that MAC Domain. As a result, the CMTS 18 must steer, queue, and schedule packets to the subscribers in an appropriate fashion.

Since bursts exceeding 864 Mbps can periodically occur at the CMTS 18, due to high-speed arrivals of packets at the 10 Gbps interface, queuing is a critical function performed by the CMTS 18. Sometimes the transient packet arrival rates that occur at the 10 Gbps interface of the CMTS 18 can be so high that the CMTS 18 queues are overflowed, or the packet delays incurred within the queues become too large. In these instances, the CMTS 18 may choose to actually drop packets, which triggers a feedback mechanism within TCP that should throttle the transmission rates at the TCP source within the Internet 12. Subscriber QoE is intimately tied to these packet queuing and packet dropping operations of the CMTS 18, because a subscriber's experiences are strongly driven by packet delays, packet drops, and the resultant TCP bandwidth that is driven by the TCP feedback mechanisms carrying delay and drop information to the TCP source (via TCP ACKs).

At a fundamental level, the methods and systems described in this specification rely on the ability to monitor the bandwidth (as a function of time) to each of the subscribers within a "service group". The "service group" under evaluation can vary. In the example shown in FIG. 1, it is defined to be the two hundred subscribers that share the bonded DOCSIS channels emanating from the CMTS 18. Thus, in that case, it is useful to define how much bandwidth capacity is required (and how many DOCSIS channels are required) to provide good QoE to the two hundred subscribers sharing that bandwidth capacity.

Alternatively, the "service group" can be defined to be all of the subscribers connected to all of the MAC Domains managed by the CMTS 18 or a blade within the CMTS 18. If, for example, the CMTS 18 managed 100 MAC Domains and each MAC Domain has two hundred subscribers, then this CMTS-scoped "service group" would consist of the 100*200=20,000 subscribers attached to the CMTS 18. In that case, it would be useful to define how much bandwidth capacity is required (and how many 10 Gbps links are required) at the interface between the CMTS 18 and the router 16.

Alternatively, the "service group" can be defined to be all of the subscribers connected to a router in the Internet. If, for example, the router 16 steered packets to 10 such CMTSs 18, where each CMTS 18 managed 100 MAC Domains and each MAC Domain has two hundred subscribers, then this Router-scoped "service group" would consist of the 10*100*200=200,000 subscribers attached to the router 16. In that case, we might be attempting to define how much bandwidth capacity is required (and how many 100 Gbps links are required) at the interface between the router 16 and the Internet 12.

Obviously, more bandwidth capacity will be required for the router 16 (with 200,000 subscribers) than the CMTS 18 (with 20,000 subscribers), and more bandwidth capacity will be required for the CMTS 18 (with 20,000 subscribers) than the DOCSIS MAC domain (with 200 subscribers). But can easily be appreciated that the required bandwidth capacities do not scale linearly with the number of subscribers—i.e. the bandwidth capacity of the CMTS 18 will not be equal to one hundred times the DOCSIS MAC Domain bandwidth capacity, even though the CMTS 18 has one hundred times as many subscribers as the DOCSIS MAC Domain. This is primarily due to the fact that the probability of a small number of subscribers concurrently receiving downstream data is much higher than the probability of a large number of subscribers concurrently receiving downstream data. This fact is one of the key reasons why the systems and methods described in this specification are so useful; they permit traffic engineers to actually determine the required bandwidth capacities for these differently-sized "service groups."

The systems and methods described in this specification are therefore quite versatile and able to be utilized for specifying bandwidth capacities required at many different locations in a data transmission network from a provider to a subscriber, or customer, e.g. large back-haul routers, small enterprise routers, etc. Broadly considered, it is beneficial to be able to assess the required bandwidth capacity for a given QoE, or conversely, the QoE level for a given bandwidth capacity. By collecting and processing traffic engineering information, e.g. data packets, as such information enters or exits a CMTS (or CCAP), statistical models of customer QoE as a function of traffic engineering parameters such as bandwidth, service group size, etc. can be determined. Different real-world constraints will, as indicated above, use different sets of collected data. For example, data entering a CMTS 18 from router 16 is most relevant to determining required bandwidth or QoE for all service groups served by the CMTS 18, while data exiting the CMTS 18 to the optical transport 20 is most relevant to determining required bandwidth or QoE for service groups served by the transmission line from the CMTS 18 to the optical transport 20. The systems and methods disclosed herein are useful for each of these applications.

To illustrate the utility of the disclosed system and methods, the specification will first describe a procedure for calculating, in the downstream direction, the solution type previously identified as solution/approach (1), i.e. calculating the QoE level given a "service group" size (Nsub), a particular set of characteristics (Tavg, Tmax, and application type) for a subscriber mix, and actual available bandwidth capacity. Then the specification will describe procedures for calculating the solution types (2), (3), and (4) in the downstream direction. Finally, the specification will describe how each of these procedures can be modified for the upstream direction.

Solution (1) in the Downstream Direction

Figure 2A:
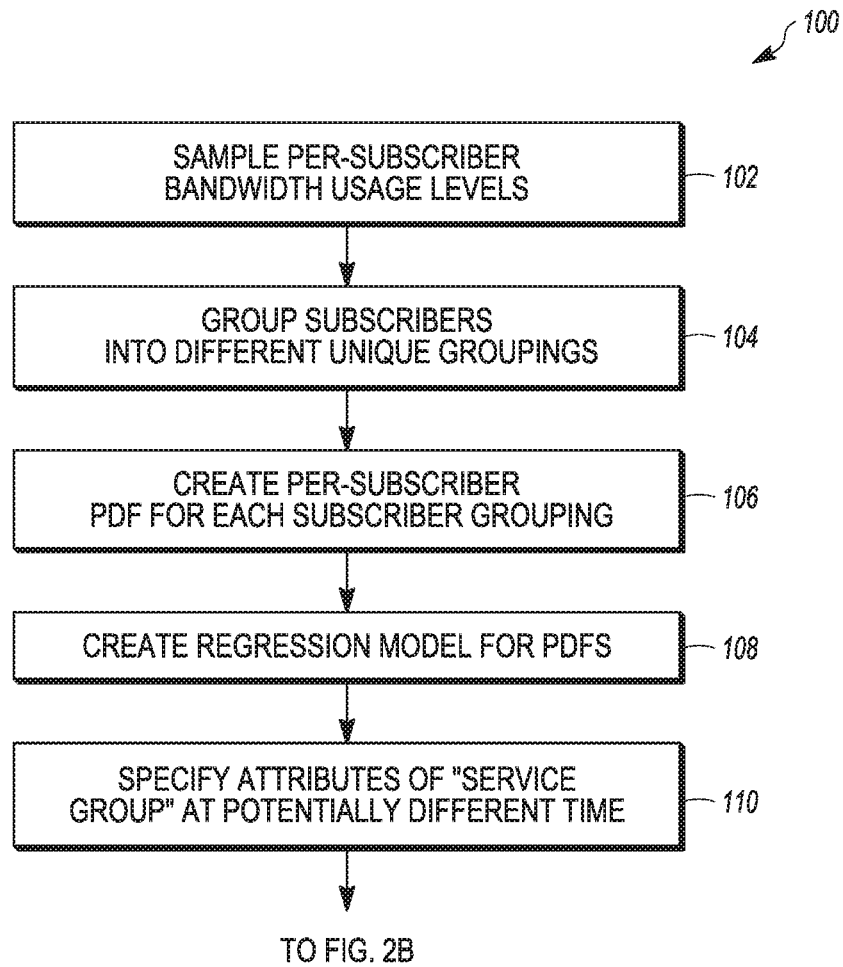
FIGS. 2A-2C show a procedure for calculating the QoE level given a Subscriber "service group" size, a set of transmission characteristics, and available bandwidth capacity.
Figure 2B:
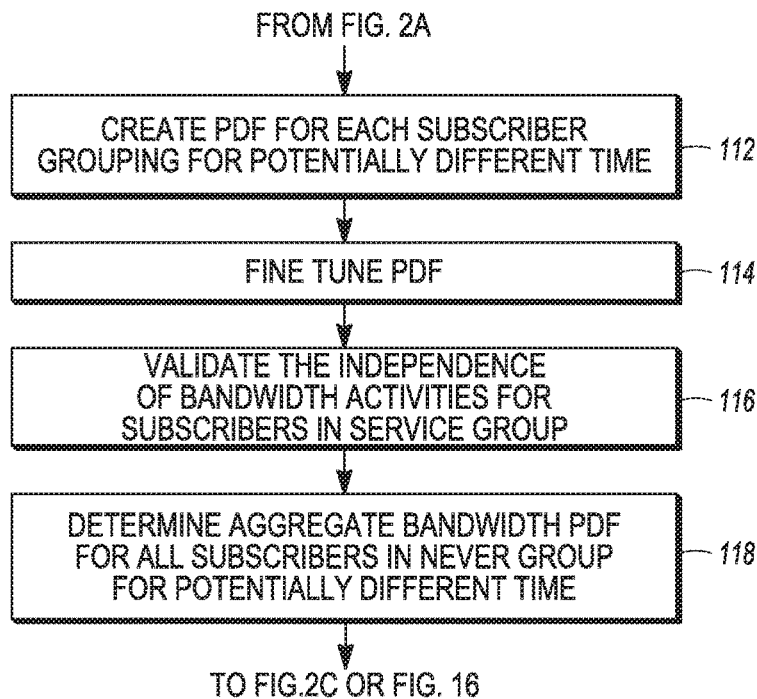
Figure 2C:
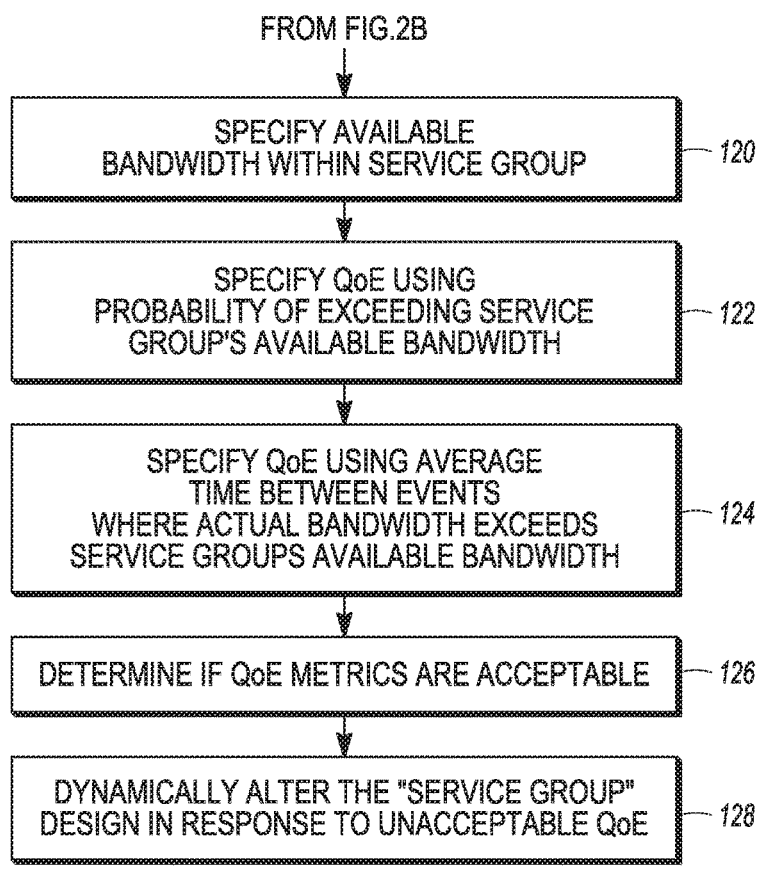

Solution 1 preferably calculates the Quality of Experience level given a "service group" size (Nsub), a particular set of characteristics (Tavg, Tmax, and application type) for a subscriber mix, and actual available bandwidth capacity. FIGS. 2A-2C generally show a procedure 100 that achieves this calculation.

Sample Per-Subscriber Bandwidth Usage

Referring specifically to FIG. 2A, the first step 102 is sampling the per-subscriber bandwidth usage levels as a function of time, with fine-grain temporal granularity. This step preferably collects information about how the subscribers are utilizing their bandwidth in the present time. The resulting present-day statistics associated with these samples will eventually be utilized to predict the future (or past) statistics for subscribers at different points in time, and that information will be utilized to calculate the required bandwidth capacities needed within the DOCSIS MAC Domain.

These per-subscriber bandwidth usage samples can be collected at any one of several points in the path of the flow of the data. Ideally, the samples of the bandwidth usage for these downstream packets streams are taken before the packet streams encounter any major network bottlenecks where packet delays or packet drops become significant. The ideal location to collect these samples would be at the many servers on the Internet where the traffic is originating. However, this is impractical, so the samples may be collected further downstream near the subscribers at points just before locations where bottlenecks (with packet delays and packet drops) are identified as being likely to occur. In the example system shown in FIG. 1, for example, determining the bandwidth capacity requirements for the DOCSIS MAC domain would most likely best be practically achieved by collecting the per-subscriber bandwidth usage samples at the 10 Gbps link into the CMTS 18. Those of ordinary skill in the art will recognize that samples could be collected at the 100 Gbps link into the router 16 without significant bias of the data from packet delays and packet losses that might occur in the CMTS 18.

Furthermore, the access network such as DOCSIS capacity, wireless capacity, DSL capacity, G.Fast capacity, or Ethernet capacity feeding the homes businesses on the Last Hop link often tends to form a major bottleneck for downstream packet streams. The WiFi capacity steering the packets throughout a particular home or business building also forms a major bottleneck for downstream packet streams. Any location "north" of these bottlenecks can serve as an adequate location for sampling the data. One of the most popular locations would be within the CMTS or eNodeB or DSLAM or G.Fast Distribution Point, or in the routers north of these Last Hop links, because these elements are some of the last network elements through which packets will pass before they make their way through the major bottlenecks (and experience potential packet delays and packet drops). Measuring the packet streams before these delays and drops occur helps give more accurate results for the method disclosed in the present specification. Later in the specification, when disclosing systems and techniques pertaining to upstream traffic, the disclosure will also show ways in which the samples can be taken within the bottlenecked regions of the network, however, there may be more error and larger approximations in the resulting answers produced by the disclosed systems and methods.

The appropriate sampling period Ts (the temporal window between successive samples of the average bandwidth) can be determined on a case-by-case basis. Longer sampling periods leads to less data being collected and therefore make it easier to store and process the data, but conversely can make it difficult to "see" bandwidth bursts that are typical of many Internet applications today. For example, consider a 1 Gbps bandwidth burst that occurs for 1 second and then goes silent for 99 seconds. A 100 second sample window will not actually "see" the existence of the 1 Gbps bandwidth burst. It would instead measure 1 Gbits of data being transmitted within a 100 second window of time and calculate that to be an average bandwidth of 1 Gbits/100 seconds=10 Mbps. That is quite a different measurement and characterization of the channel than that which actually occurred on the channel. Shorter sampling periods lead to more collected data, and entail more processing and hardware requirements, but the short samples permit one to actually "see" short bandwidth bursts.

The present inventors have assessed that for existing data network systems, one second sampling periods (i.e. Ts=1), or less, are adequately short. This permits the system to "see" the typical burst periods that occur for Web-browsing activities (where Web pages usually take ~1 second to download), for IP Video Segment transfers (where segments are usually transferred in 2-10 seconds bursts), and for file downloads (where the continuous stream of TCP packets usually easily fill a second of time). Thus, interactions between these different application types also tend to happen over periods of Ts=1 second. It is quite possible that future applications and future network bandwidths will speed up these interactions so that the sampling periods for this method may need to be reduced. However, at present, 1 second samples may be preferable. Accordingly, in some preferred embodiments, the result of step 102 is to capture the average bandwidth consumed by each subscriber within each 1-second sampling window. Average bandwidth within a 1-second window can be obtained by monitoring all passing packets (and their associated lengths) during that 1-second window. At the end of each second, the associated lengths (in bits) for all packets that were transmitted to a particular subscriber during that 1-second window can be added together, and the resultant sum (in bits) can be divided by the sampling period (which happens to be 1 second) to determine the average bandwidth transmitted to that particular subscriber during that 1-second window.

The collection of samples should be done on as many subscribers as possible. In addition, the number of samples per subscriber should be quite large to yield statistically-significant results in probability density functions that are created in later steps. This sampling activity can be performed at all times throughout the day to see average statistics. It can also be done at a specific time of the day to see the particular statistics for that particular time of the day. In some preferred embodiments, the samples are collected only during the "busy window" (e.g. from 8 pm to 11 pm) when subscriber activity levels are at their highest. Successive samples can be taken from many successive days to provide an adequate number of samples for analysis. To view trends, groups of samples can be taken in one month, and then repeated X months later to view any changes that might be occurring. Whenever sampling is being done, the sampling can be done on all subscribers at once, or it can "round-robin" between smaller groups of subscribers, working on one small group of subscribers for one hour and then moving to another small group of subscribers in the next hour. This can reduce the amount of processing required to perform the sampling within the Network Element, but it also increases the total length of time required to collect adequate sample counts for all subscribers.

Sampling can be done using any one of several techniques. In one embodiment, octet counters can be used to count the number of packets passing through the Network Element for each subscriber. The octet counter is incremented by the number of octets in a packet every time a packet for the particular subscriber passes. That octet counter can then be sampled once per second. The sampled octet count values from each successive 1-second sample time can then be stored away in a memory. After some number of samples have been collected, the sampled octet counters can be stored away in persistent memory, and the process can then be repeated. After all of these octet count values have been stored away in persistent memory during the busy window of time (8 pm to 11 pm at night), post-processing of the persisted samples can be performed. The post processing would merely subtract successive values from one another to determine the delta octet value (in units of octets) for each 1-second sampling period. That delta octet value can then be multiplied by 8 to create the delta bit value (in units of bits) for each 1-second sampling period. That delta bit value can then be divided by the sampling period (which in this case is 1 second) to create the average bandwidth (in units of bits per second) for each 1-second sampling period. This creates a vector of average bandwidth values (in units of bits per second and sampled at 1-second intervals) for each subscriber.

Group Subscribers

Still referring to FIG. 2A, step 104 groups subscribers into different groups, each group defining a unique subscriber type. Once the vector of average bandwidth samples (in units of bits per second) are available for each subscriber (as a result of the execution of the previous step), subscribers must be separated and grouped into different groups defining unique subscriber types. This is done by first determining at least three different attributes for each of the subscribers: Tmax, Tavg, and the nature of the applications used by the subscriber. Tmax may be the Service Level Agreement Maximum Bandwidth Level for each respective subscriber. Tavg may be the average bandwidth for each respective subscriber, which can be calculated by summing all of the average bandwidth sample values for the subscriber and dividing by the number of sample values. The nature of the applications used by the subscriber may in a preferred embodiment be the average "Application Active Ratio" of the applications, which is defined as the fraction of 1-second samples where the subscriber's applications were active (with 1-second windows having average bandwidths that are substantially greater than zero). It should be understood that a related metric is the "Application Silent Ratio" of the applications, whereby the Application Silent Ratio is defined as the fraction of 1-second samples where the subscriber's applications were silent (with 1-second windows having average bandwidths equal to or close to zero). Thus, it should be apparent that Application Silent Ratio=1.0−Application Active Ratio. It should be understood that more complicated methods of characterizing the subscriber applications could also be used consistent with the present disclosure.

Separation of the subscribers into different groups can be accomplished by defining thresholds that separate levels from one another. This should preferably be done for each of the attributes. As an example, the Tmax values can be separated according to the different Service Level Agreement (SLA) tiers that the Operator offers. If an Operator offers five Service Level Agreement tiers (e.g. 8 Mbps, 16 Mbps, 31 Mbps, 63 Mbps, and 113 Mbps), then each of those five Tmax values would permit subscribers to be separated according to their Tmax value.

For Tavg values, the entire range of Tavg values for all of the subscribers can be observed. As an example, it may range from 0.1 Mbps to 3 Mbps. Then it is possible that, e.g. three different groupings can be defined (one for high Tavg values, one for medium Tavg values, and one for low Tavg values). The threshold separating high Tavg values from medium Tavg values and the threshold separating medium Tavg values from low Tavg values can be appropriately selected. For example, low Tavg values might include any values less than 0.75 Mbps. High Tavg values might include any values greater than 1.25 Mbps. Medium Tavg values might include any values between 0.75 Mbps (inclusive) and 1.25 Mbps (inclusive).

For the Application Active Ratio values describing the application types being utilized by the subscribers, the Active Ratio values may range from 0.1 to 0.9. It is possible that, e.g. two different grouping can be defined (one for high Application Active Ratio values and one for low Application Active Ratio values). The threshold separating high Application Active Ratio values from low Application Active Ratio can be appropriately selected. For example, low Application Active Ratio values might include any values less than 0.5. High Application Active Ratio values might include any values greater than or equal to 0.5.

Preferably, a single Subscriber Type grouping is a group of subscribers that share common operational characteristics. Ideally, after the mapping, we would have many subscribers mapped into each of the Subscriber Type groupings (to help ensure statistically-significance within the statistics utilized in the upcoming steps). Thus, in the foregoing example, where an operator offers five service tiers of bandwidth, where subscribers are divided into high, medium and low Tavg values, and there are two defined application types utilized by subscribers, a total of thirty (5*3*2) different "Subscriber Type" groupings (for this particular embodiment) can be created. Each subscriber can then be mapped into one (and only one) of these thirty different Subscriber Type groupings, as illustrated in FIG. 3.

In the future, this grouping process might be enhanced further. Additional thresholds may be added per attribute. Other attributes may be considered to further refine the grouping process. Or thresholds might become dependent on multiple attributes. For example, the Tavg threshold for Low, Medium and High may increase with higher SLA values.

Figure 3:
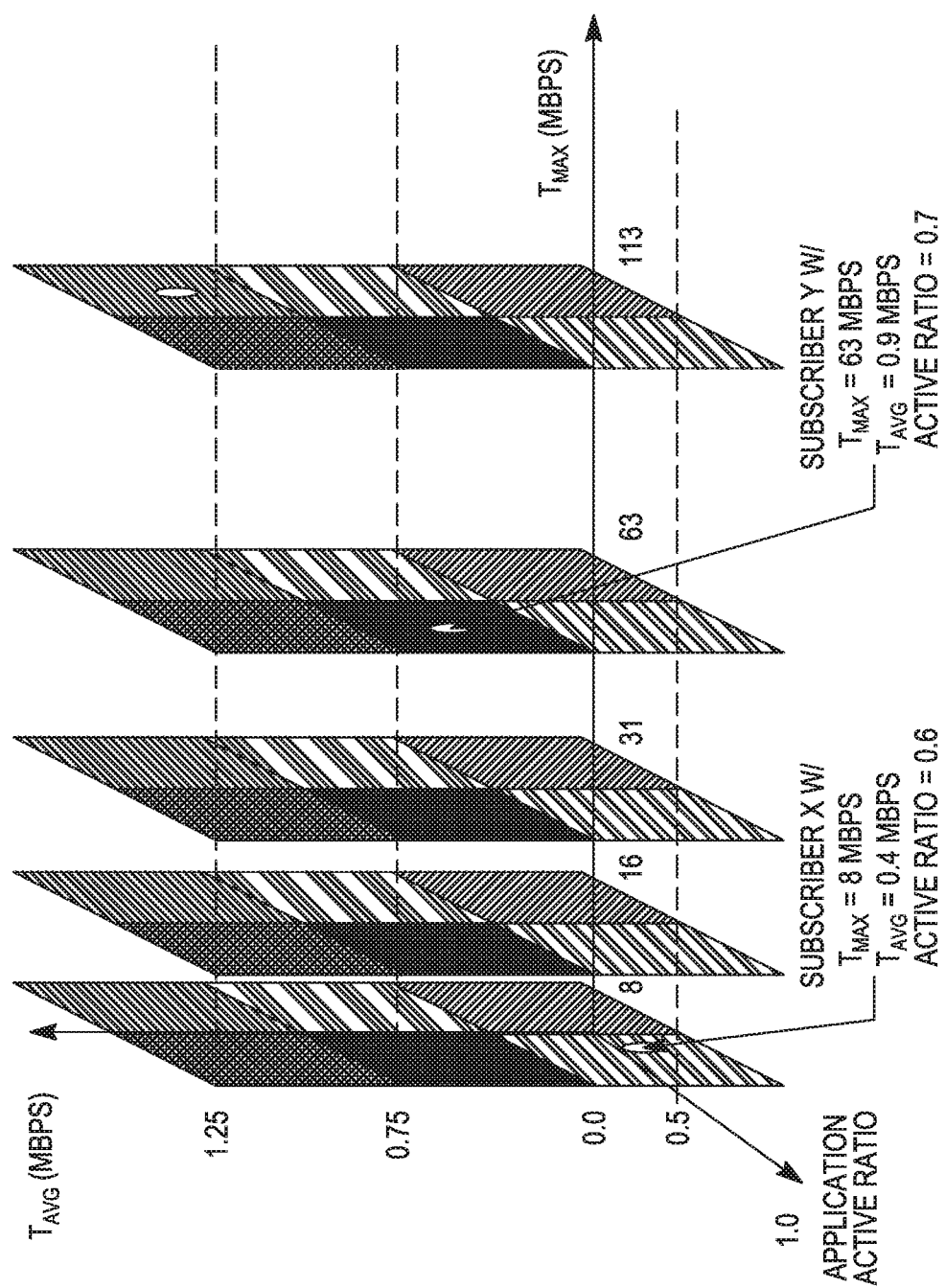
FIG. 3 illustrates the Mapping of Subscribers into Subscriber Type Groupings.

Once each of the subscribers has been mapped into its appropriate Subscriber Type grouping shown in FIG. 3, based on the subscriber's associated operational attributes, then for each particular Subscriber Type grouping, the average bandwidth samples (calculated in step 102) from all of the subscribers within that grouping can be combined to create a super-set of average bandwidth samples for each Subscriber Type grouping. This super-set of samples become the definition of bandwidth usage for each Subscriber Type grouping, containing a mix of the bandwidth usage for all of the users that were mapped to a common Subscriber Type grouping.

Once the super-set of samples has been created for each Subscriber Type grouping, the average attribute values for each Subscriber Type grouping may be calculated. In particular, the Tmax value for each Subscriber Type grouping is easily identified, since all subscribers within the same Subscriber Type grouping share the same Tmax value. The average Tavg value for the super-set of samples can be calculated by summing all of the average bandwidth samples within the super-set and dividing by the total number of samples in the super-set. This may become the defining Tavg value for the particular Subscriber Type grouping. In a similar fashion, the average Application Active Ratio value for the super-set of samples can be calculated by counting the number of non-zero samples within the super-set and dividing by the total number of samples in the super-set. Each Subscriber Type grouping will preferably have a unique triplet of values given by Tmax, Tavg, average Application Active Ratio.

As the number of attributes analyzed increases and/or the number of levels within an attribute increases, then the number of unique Subscriber Type grouping can increase dramatically. It may be possible to cluster multiple Subscriber Type groups with similar behavior to make a more manageable number of groups. In the previous example, there were thirty unique Subscriber Type groups. In some situations, all the Subscriber Type groups with low Tavg values may behave identically, independent of Tmax or Application Active ratio. In that situation, these ten Subscriber Type groups could be consolidated down to a single Subscriber Type group, reducing total group count to twenty one. Other group clustering may be possible for further reductions.

As just disclosed, individual subscribers may be grouped into different categories based on three different attributes, i.e. Tmax, Tavg and average Application Active Ratio. This exemplary grouping improves the accuracy of estimating the probability density function of the per-subscriber bandwidth usage, as disclosed later in this specification. Other embodiments, however, may group subscribers into different categories differently. For example, groups of subscribers may be differentiated by either manual or automatic grouping. For both manual and automatic grouping, the first step is to identify a set of attributes that will be used as the basis for grouping. Note that each attribute adds an additional dimension and therefore can significantly increase the complexity of grouping. The number of attributes (dimensions) should be chosen such that it includes all the attributes necessary to identify any natural groupings of the subscribers, but the number should not be so large as to result in groupings with very sparse data in each group.

With respect to manual grouping, first a set of attributes may be identified. Then each attribute value is divided independently into multiple groups. For some of the attributes the grouping is obvious, for example, the Tmax value is chosen by the operator to be a set of distinct values resulting in an obvious grouping. For other attributes like the Tavg or the Application Active Ratio, one can identify the minimum and maximum value for each attribute, and then divide the range of values of each attribute into a number of groups. These groups can be obtained either by simply dividing the range of values of the attribute into uniform intervals or by selecting a non-uniform set of groups.

Figure 4A:
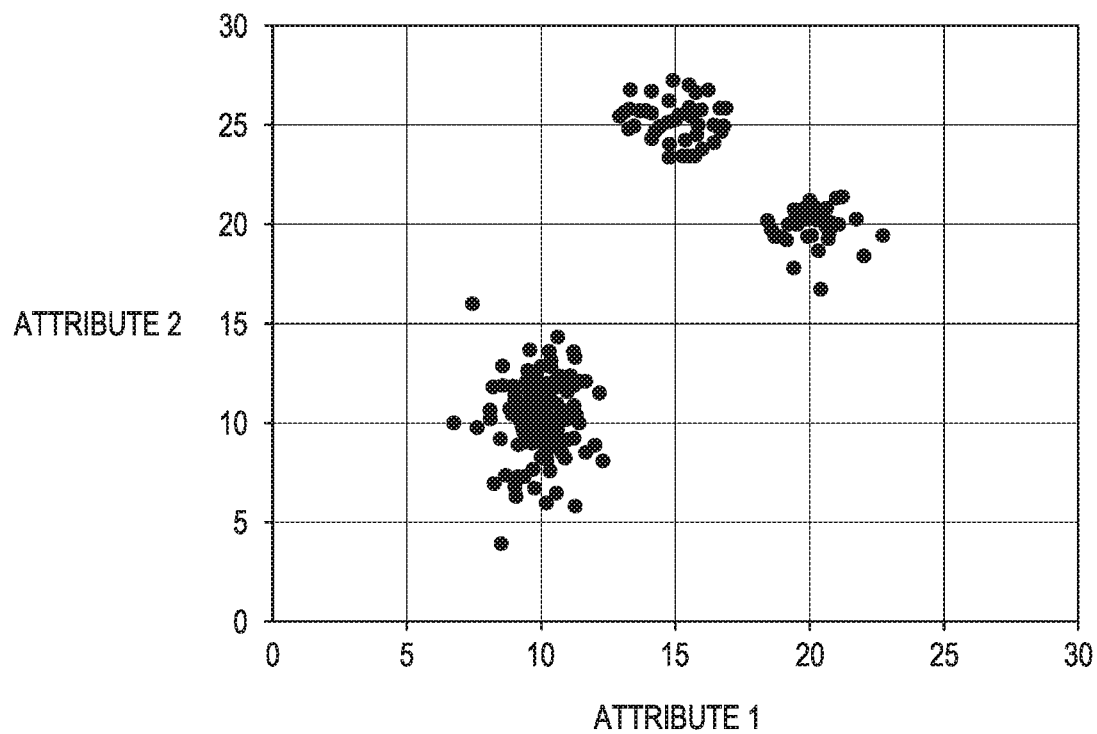
FIG. 4A shows a hypothetical data-set with two attributes where a manual grouping approach can be used to classify subscribers into different groups.
Figure 4B:
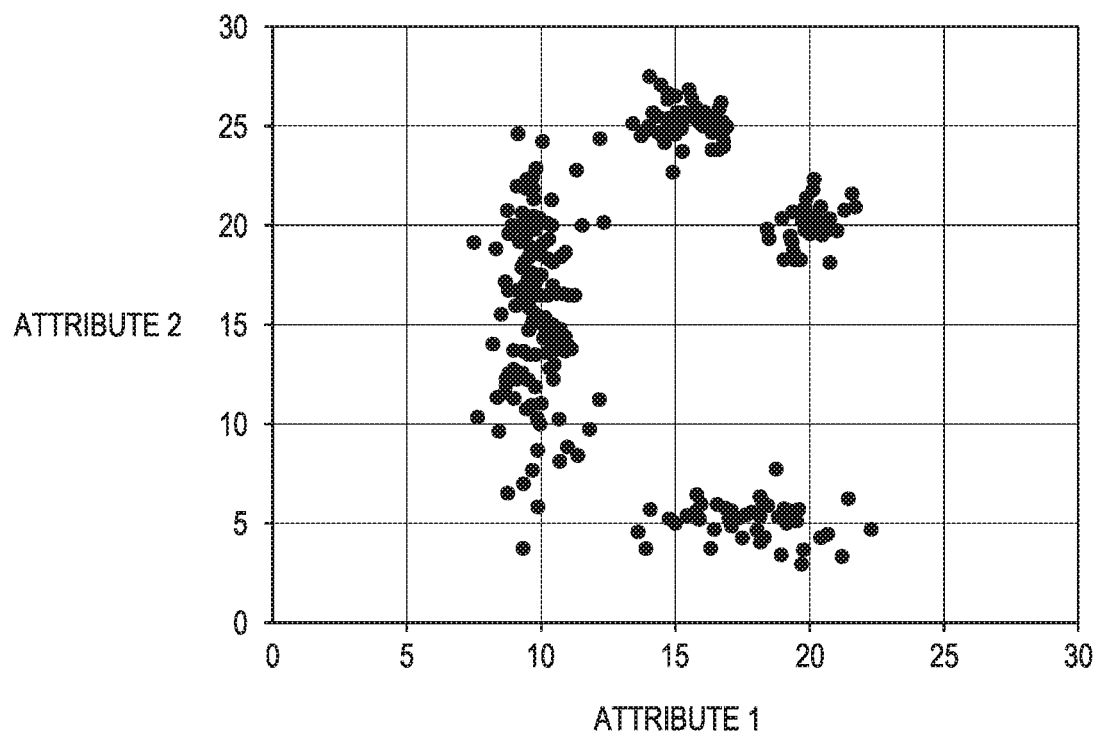
FIG. 4B shows a hypothetical data-set with two attributes that requires a data-driven automatic cluster to classify subscribers into different groups.

Although the manual grouping approach is relatively simple, as the number of attributes and data samples (subscribers) increase it will likely become difficult achieve manual grouping that captures how the data samples are actually clustered. FIG. 4a, for example, shows a scatter plot of a hypothetical dataset with two attributes. Clearly this data-set is simple enough that a manual independent grouping of each attributes will suffice. However, as the data-set gets more complicated as shown in FIG. 4B, for example, a simple manual grouping will be nearly impossible to derive, thereby necessitating an automatic grouping approach. In an automatic grouping approach, preferably a 'data-driven' algorithm is used to identify the clusters in the data. Such techniques are used in existing "big-data" analysis techniques to group observed data into different clusters to derive meaningful inferences. Various clustering algorithms such as the k-means clustering, distributing based clustering or density based clustering algorithms can be used in the automatic grouping approach.

Create Per-Subscriber Bandwidth Probability Density Function for each Subscriber Type Grouping Referring again to FIG. 2A, step 106 may preferably create per-subscriber bandwidth Probability Density Functions (pdfs) for each Subscriber Type Grouping using measurements from grouped subscribers collected in a present time-frame. Specifically, once the super-set vector of average bandwidth samples (in units of bits per second) are available for each Subscriber Type grouping, as a result of the execution of step 104, the current bandwidth probability density function for each Subscriber Type grouping can be calculated. This may in one preferred embodiment be achieved in several sub-steps, as identified below.

First, a frequency histogram is created from the super-set of average bandwidth samples for each Subscriber Type grouping. The frequency histogram must be defined with a chosen "bin size" that is small enough to accurately characterize the bandwidths consumed by the user. The present inventors have determined that bin sizes on the order of ~100 kbps are adequate for today's bandwidth characteristics. Larger bin sizes of (say) ~1-10 Mbps might also be acceptable. The bin sizes in some embodiments might need to be adjusted as the bandwidth usage of subscribers change. In general, the goal is to ensure that successive bins in the frequency histogram have similar frequency count values (meaning that there are no rapid changes in the shape of the frequency histogram between successive bins). The required bin size actually depends to some extent on the maximum bandwidth levels displayed by each subscriber; larger maximum bandwidth levels can permit larger bin sizes to be used. As an example, assume that the bin size was selected to be 10 Mbps. Once the bin size is selected, the x-axis of the frequency histogram can be defined with integer multiples of that bin size. Then the average bandwidth samples for a particular Subscriber Type grouping are used to determine the number of samples that exist within each bin for that particular Subscriber Type grouping.

Figure 5:
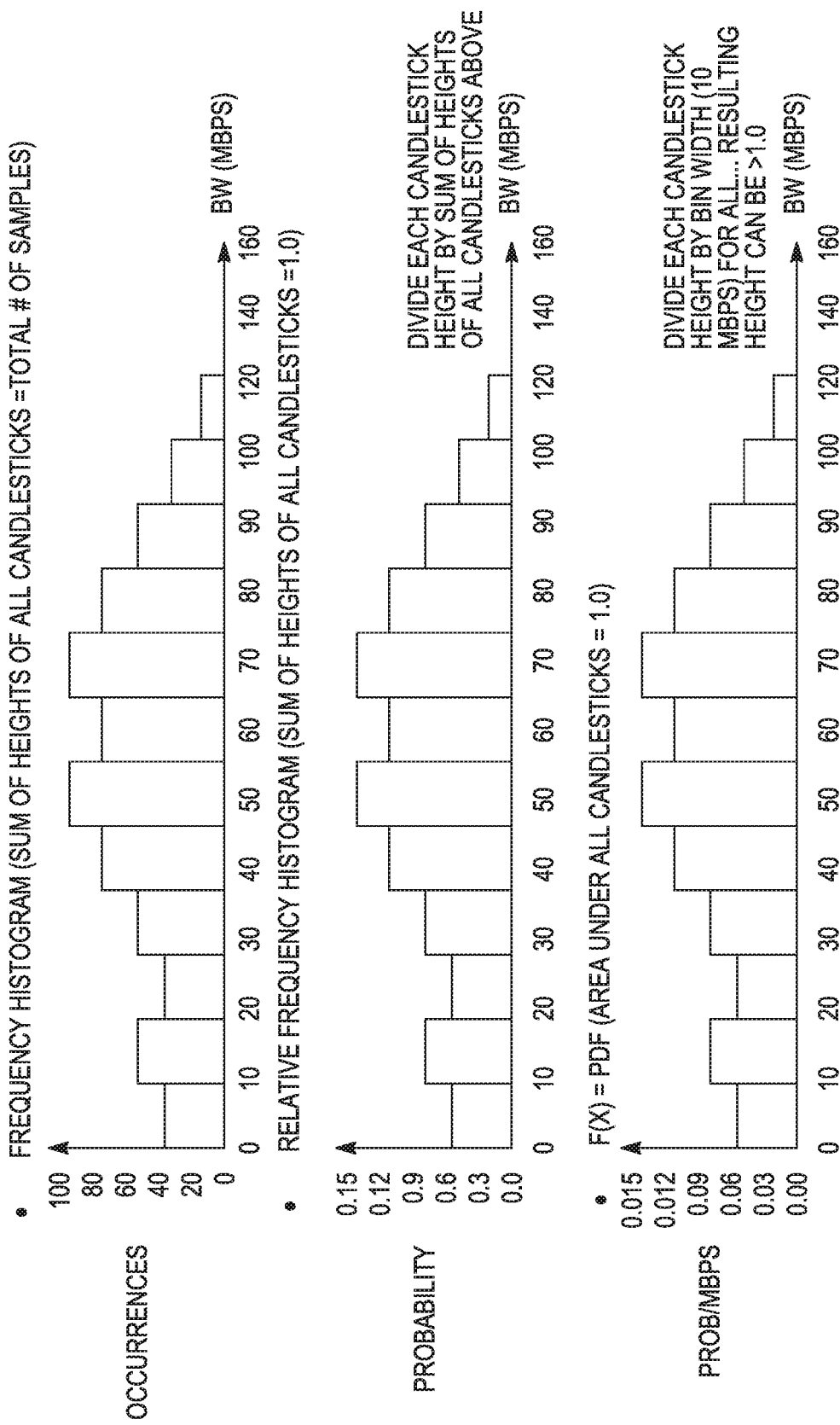
FIG. 5 shows steps for creating Bandwidth Probability Density Functions for each Subscriber or Subscriber Type Grouping.

Referring to FIG. 5, the first bin on the x-axis of the frequency histogram represents bandwidth samples between 0 Mbps (inclusive) and 10 Mbps. The second bin on the x-axis of the frequency histogram represents bandwidth samples between 10 Mbps (inclusive) and 20 Mbps. Other bins cover similar 10 Mbps ranges. The creation of the frequency histogram for a particular Subscriber Type grouping preferably involves scanning all of the super-set average bandwidth samples for that Subscriber Type grouping, and counting the number of samples that exist within the bounds of each bin. The frequency count for each bin is then entered in that bin, and a plot of the frequency histogram similar to the one shown at the top of FIG. 5 would be obtained. In the particular frequency histogram plot of FIG. 5, the first bin (covering the range from 0 Mbps (inclusive) to 10 Mbps) has a frequency count of ~50, implying that 50 of the average bandwidth samples from that subscriber displayed an average bandwidth level between 0 Mbps (inclusive) and 10 Mbps.

Next, the frequency histogram for each Subscriber Type grouping can be converted into a relative frequency histogram. This is accomplished by dividing each bin value in the frequency histogram by the total number of samples collected for this particular Subscriber Type grouping within the super-set of average bandwidth samples. The resulting height of each bin represents the probability (within any sampling period) of seeing an average bandwidth value that exists within the range of bandwidths defined by that particular bin. As a check, the sum of the bin values within the resulting relative frequency histogram should be 1.0.

Finally, the relative frequency histogram can be converted into a probability density function for the Subscriber Type grouping. It should be observed that, since this actually is for discrete data, it is more correct to call this a probability mass function. Nevertheless, the present disclosure will use the term probability density function, since it approximates a probability density function (pdf). The conversion to a pdf for the Subscriber Type grouping may be accomplished by dividing each bin value in the relative frequency histogram by the bin size, in the current example, assumed as 10 Mbps. Those of ordinary skill in the art will appreciate that the resulting probability density function values may have values that are greater than 1.0. In addition, as a check, the sum of each of the probability density function values times the center x-axis value of the bin for each probability density function value should be 1.0.

The probability density function for each Subscriber Type grouping is, in essence, a fingerprint identifying the unique bandwidth usage (within each 1-second window of time) for the subscribers that are typically mapped into a particular Subscriber Type grouping. The bins in the probability density function of a particular Subscriber Type grouping indicate which bandwidth values are more or less likely to occur within any 1-second interval for a "typical" user from that particular Subscriber Type grouping.

Create a Regression Model for the PDFs

Referring again to FIG. 2A, at step 108, regression models are created for each Per-Subscriber Type Bandwidth pdf as a Function of Tmax, Tavg, and Application Active Ratio. Specifically, once the probability density function for each Subscriber Type grouping is known, a large amount of information is available to create a regression model for the pdf as a function of Tmax, Tavg, and Application Active Ratio. Typically, the probability density function will require a multiple regression analysis to be performed. In the end, a formula is produced with the general form $$\text{pdf(Bandwidth)}=f(\text{Bandwidth},Tmax,Tavg,\text{Application Active Ratio})$$

where Bandwidth is the particular bandwidth of interest. A probability density function stretching across a large range of bandwidth values can be created by using the formula with many closely-positioned bandwidth values.

Once obtained, this probability density function formula can be used to predict the pdf value for any subscriber type, even if the subscriber has Tmax and Tavg and Application Active Ratio values that differ from those available in Steps 104 and 106 shown in FIG. 2A.

Specify Attributes of the Entire "Service Group" at a Potentially Different Time-Frame At step 110 details and attributes of the entire "Service Group" are specified at a Potentially Different Time-frame. The term "potentially different time frame" is intended to mean a time frame that is allowed to move forward and backwards in time, though it does not necessarily need to do so. Thus, in one instance, the systems and method disclosed herein may be used to simply measure network characteristics and performance over a current time interval to determine whether a desired QoE is currently being achieved, and if not, to in some embodiments respond accordingly. Alternatively, as explained below, the systems and methods disclosed herein may be used in a predictive capacity to determine network characteristics and performance at an interval that begins, or extends into, the future so as to anticipate and prevent network congestion.

It should also be appreciated that the term "Service Group" can be used in very broad sense; it can define the subscribers who share bandwidth on the bonded DOCSIS channels within a DOCSIS MAC Domain (connected to a single Fiber Node), or alternatively, it could define the subscribers who share bandwidth on a CMTS or on a Backbone Router. The disclosed systems and methods are applicable to all of these different "Service Groups."

Before one can determine the Required Bandwidth Capacity to satisfy the demanded Quality of Experience levels for subscribers of a given "Service Group," the details of the "Service Group" and its associated subscribers must be known. In particular, it is required that at least the following information on the "Service Group" must be known:
  i. the total number of subscribers within the "Service Group" (Nsub)
  ii. the Tmax and Tavg and Application Active Ratio for each of those subscribers OR alternatively a list of all of the different Service Type groupings and their associated attributes, whereby the attributes for each Service Type grouping must include:
      a. the number of subscribers associated with the particular Service Type grouping (or the percentage of the total number of subscribers that are associated with the particular Service Type grouping)
      b. the Tmax value for the Service Type grouping
      c. the average Tavg value for the Service Type grouping
      d. the average Application Active Ratio value for the Service Type grouping.

It is oftentimes the case that a traffic engineer must determine Required Bandwidth Capacities not only for the present time, but also for the future. As a result, the traffic engineer must oftentimes specify the "Service Group" attributes (like Tmax and Tavg and Application Active Ratio values) for years into the future. This is obviously not a trivial exercise, and it is never possible to find an answer with absolute certainty; no one can predict the future, and unexpected variations are always possible. However, one extrapolation of past trends can be useful to predict trends into the future.

These types of extrapolated predictions for the future are quite possible for the Tmax and Tavg values, because their past trends are usually known. One can even determine the different past trends that might exist for Tmax and Tavg values for different Service Type groups. As an example, many Operators have seen downstream Tmax values grow by ~50% per year for extended periods of time, and more recently, many Operators have seen downstream Tavg values grow by ~40% per year. If the Tmax value and Tavg value for the present time is known to be Tmax0 and Tavg0, respectively, and if we assume that the growth rates for Tmax and Tavg remain constant over time, then the predicted Tmax value and Tavg value in Y years from the present time—designated as Tmax(Y) and Tavg(Y), respectively—can be calculated as:

$$Tmax(Y)=(Tmax0)*(1.5)**(Y)$$

$$Tavg(Y)=(Tavg0)*(1.4)**(Y).$$

Notably, the two formulae above are also valid for negative Y values, meaning that they can also be used to "predict" the Tmax and Tavg values that existed in the past. As an example, to determine am estimate on what the Tmax and Tavg values were two years prior to the present time, a value of Y=−2 can be used within the formulae. So the formulae can be utilized to predict the Tmax and Tavg values in the past and in the future.

Create Pdf for Each "Subscriber Group" for a Potentially Different Time-Frame

Referring to FIG. 2B, once the Tmax and Tavg and Application Active Ratio values are known for each subscriber or Subscriber Type grouping for the time-frame of interest (within the particular "Service Group"), this information can be used in step 112 to create a probability density function for each of the subscribers or Service Type groupings (calculated as a function of the predicted Tmax, Tavg, and Application Active Ratio values at the time-frame of interest). This calculation makes use of the formula defined in the Step 4's regression step:

$$\text{pdf(Bandwidth)}=f(\text{Bandwidth},Tmax,Tavg,\text{Application Active Ratio}).$$

After step 112 is completed, a unique probability density function prediction will be available for each subscriber or Subscriber Type grouping within the "Service Group." It is important to recall that the probability density function for Subscriber Type grouping is still a measurement of the probabilities of various bandwidths occurring for a single subscriber that is associated with the unique characteristics of a particular Subscriber Type grouping.

For Subscriber Type groups with smaller SLA values, it may be possible to re-use some of the pdf from other current SLA values. For example, a group with a 10 Mbps Tmax SLA value might become a 20 Mbps Tmax SLA in the future. If the pdf for a 20 Mbps Tmax SLA exists today, that pdf could optionally be re-uses for the 10 Mbps group in the future. Obviously any new Tmax SLA values will require the step 112.

Fine Tune Pdf

At optional step 114, the separate and unique probability density function for each subscriber or Subscriber Type Grouping within the "Service Group" for a Potentially Different Time-frame may be fine-tuned. Specifically, once the predicted probability density function is created in step 112, using the regression formulae for a particular time-frame of interest, it is possible to "fine-tune" the probability density function based on particular views or predictions about the nature of traffic and applications in the time-frame of interest. This permits a traffic engineer to use expertise to over-ride predictions of the regression model. This may or may not be advisable, but it some embodiments of the present disclosure may permit certainly adjustment of the probability density function prediction.

If, for example, a traffic engineer believes that a new video application will appear in a future time-frame that will inject a large amount of high-bandwidth transmissions into the system that may end up creating a great deal of per-subscriber bandwidth around 50 Mbps (which was not predicted by the regression model), then some embodiments may preferably permit the traffic engineer to increase the probability density values in the range from (say) 45 Mbps to 55 Mbps. The resulting curve may be referred to as the "fine-tuned probability density function." Once that fine-tuning is done, then the resulting "fine-tuned probability density function" should preferably be "re-normalized" so that is still displays the unique characteristic required of a proper probability density function. In particular, it should be raised or lowered across its entire length so that the area beneath the probability density function is still equal to one. This can be accomplished by multiplying each value within the probability density function by a scaling factor S, where $$S=1/(\text{area beneath the "fine-tuned probability density function"}).$$

The resultant "fine-tuned and re-normalized probability density function" is therefore given by:

$$\text{"fine-tuned and re-normalized pdf}=S*(\text{"fine-tuned probability density function}).$$

Validate Independence of Bandwidth Activities for Subscribers

At optional step 116, the independence of bandwidth activities for subscribers within a "Service Group may preferably be validated. This step makes use of a well-known theory from probability and statistics that states the following argument:

Assume X and Y are two independent random variables (such as the 1-second average bandwidth measurements taken from two different subscribers). Assume also that $f(x)$ and $g(y)$ are the probability density functions of the two random variables X and Y, respectively. Then the sum of those two random variables produces a new random variable $Z=X+Y$ (which would correspond to the aggregate bandwidth created by adding the 1-second bandwidth samples from the two subscribers together), and the new random variable Z will have a new probability density function given by $h(z)$, where $h(z)=f(x)$ convolved with $g(y)$.

Thus, in this step, it should be confirmed that the bandwidth activities for different subscribers are substantially independent and uncorrelated. It turns out that we can usually assume (while introducing only a small amount of error) that the bandwidth activities of two separate subscribers are largely independent of one another. Studies have shown this to be mostly true. There may be some correlations between bandwidth activities of different subscribers that might be due to:

i. a common propensity among human beings to perform bandwidth-related activities at the top and bottom of the hour (when television shows end);

ii. bandwidth-related activities that are initiated by machines in different subscriber homes that are synchronized to begin their activities at a specific time (such as home-based digital video recorders that are programmed to start their recordings at 8 pm); and iii. potential self-synchronizing behaviors from TCP-oriented applications that are competing for bandwidth (such as Adaptive Bit-Rate video codecs).

However, these interactions tend to be quite small. In order to validate that a particular set of subscribers within a "Service Group" are using bandwidth in ways that are largely independent, a litmus test can be performed which is not necessarily a proof of independence for all time, but it does give a snapshot of the subscriber behavior for a window of time and determines whether the subscriber's activities are largely independent (or not) during that window of time.

Specifically, individual samples of bandwidth with, e.g. 1 second granularity are first collected during the busy window of time (e.g. from 8 pm to 11 pm at night). This is similar to the actions performed in Step 102 above, but this particular set of samples should preferably be collected in a very specific fashion. In particular, the collection of the samples should preferably be synchronized so that the first 1-second sample collected for Subscriber #1 is taken at exactly the same moment in time (plus or minus 100 milliseconds) as the first 1-second sample collected for Subscriber #2. In a similar fashion, the first 1-second sample collected for Subscriber #2 is taken at exactly the same moment in time (plus or minus 100 milliseconds) as the first 1-second sample collected for Subscriber #3. This rule is applied for all Nsub subscribers within the "Service Group." Thus, this procedure will produce 1-second bandwidth samples that are synchronized, permitting the identification of temporal correlations between the activities of the different subscribers. For example, if all of the subscribers happen to suddenly burst to a very high bandwidth level at exactly the same moment in time during, e.g. sample 110 (associated with that single 1-second time period that is 110 seconds after the sampling was initiated), then synchronized behavior within the samples can be identified due to the implication that here is a level of correlation between the subscribers' bandwidth activities.

Disclosed below is a mathematical test to detect the amount of correlation that exists between the sampled subscribers within the "Service Group," and to see how much impact these potential synchronized activities can have on results that will be subsequently calculated.

First, create Bandwidth Probability Density Function #1 based on the bandwidth samples collected from Subscriber #1 and repeat for each of the other subscribers. This will yield Nsub Bandwidth Probability Density Functions, with labels ranging from Bandwidth Probability Density Function #1 to Bandwidth Probability Density Function #Nsub.

The Bandwidth Probability Density Functions can be created using the method disclosed with respect to step 118 of FIG. 2B, discussed below.

Second, convolve all the Nsub Bandwidth Probability Density Functions together to create a Final Aggregate Bandwidth Probability Density Function for this particular "Service Group". It should be noted that this particular Final Aggregate Bandwidth Probability Density Function does not include any recognition of simultaneity between bandwidth bursts between subscribers. Instead, it assumes that all of the bandwidth bursts from the different subscribers are entirely independent from one another, and ignores any correlation between subscriber bandwidth activities.

Third, take each of the time-sequenced bandwidth samples for Subscriber #1 and concatenate them together and treat the result as a row vector, repeating for each of the other subscribers. This procedure will yield Nsub row vectors. Place those row vectors one on top of the other to create a matrix of numbers. The first row in that matrix should hold the time-sequenced bandwidth samples for Subscriber #1. The second row in that matrix should hold the time-sequenced bandwidth samples for Subscriber #2. This pattern should continue until the last row (row Nsub), which should hold the time-sequenced bandwidth samples for Subscriber #Nsub. It should also be apparent that the first column in the matrix represents the first second of synchronized samples for each of the subscribers. The second column in the matrix represents the next second of synchronized samples for each of the subscribers. Successive columns in the matrix also represent synchronized samples for each of the subscribers at a particular instant in time.

Fourth, using the above matrix, add all of the values down each column and create a Sum Vector at the bottom of the matrix. This Sum Vector is the actual per-"Service Group" bandwidth that was passed through the service group, with each value within the Sum Vector representing a particular 1-second sample of time. It should be noted that any simultaneity of bandwidth bursts between subscribers will be described within this Sum Vector. Thus, a particular instant in time where all of the subscribers might have simultaneously burst their bandwidths to very high levels would show up as a very high value at that point in time within this Sum Vector.

Fifth, create the Sum Vector's Bandwidth Probability Density Function based on the bandwidth samples within the Sum Vector. This Sum Vector's Bandwidth Probability Density Function will include a recognition of simultaneity between bandwidth bursts between subscribers. Again, these PDFs can be created using the techniques disclosed with respect to step 118 of FIG. 2A, described below.

Sixth, compare the Sum Vector's Bandwidth Probability Density Function to the Final Aggregate Bandwidth Probability Density Function. In some embodiments, one or more of the well-known "goodness-of-fit" tests from the field of probability and statistics may be used to determine how closely the two Bandwidth Probability Density Functions match one another. At a high level, the right-most tail of the two Bandwidth Probability Density Functions may reveal whether the Sum Vector's Bandwidth Probability Density Function's tail reaches much higher values (with higher probability) than the tail within the Final Aggregate Bandwidth Probability Density Function. If it does, then the individual subscribers are likely illustrating a level of synchronicity and correlation between their bandwidth bursts. However, it is likely that this problem will not be seen to exist in any significant amount, because it has been seen that subscriber behavior does not tend to be heavily synchronized and correlated.

It should be noted that step 116 can only be applied to present-time samples, hence any inference that it yields information about subscriber bandwidth independence for the future is only a hypothesis. However, it seems somewhat logical to assume that if present subscribers display limited correlation between one another's bandwidth levels, then future subscribers will likely also display similar uncorrelated behavior.

Those of ordinary skill in the art will appreciate that the foregoing test for correlation between subscriber behavior can easily be automated for implementation on a computerized device, such as CMTS 118 or other processing device.

Create Aggregate Bandwidth PDF for Subscribers within the "Service Group" for a Potentially Different Time-Frame Once a pdf is created for each subscriber or Subscriber Type grouping (which may optionally be "fine-tuned and re-normalized"), and optionally once independence between subscriber bandwidth activities has been ascertained, a Final Aggregate Bandwidth Probability Density Function for any "Service Group" may be created at step 118.

Step 118 relies on assumptions about the nature of the traffic and some rules from statistics. In particular, it is well-known from probability and statistics that:

Assuming X and Y are two independent random variables (such as the 1-second average bandwidth measurements taken from two different subscribers) and that $f(x)$ and $g(y)$ are the probability density functions of the two random variables X and Y, respectively, then the sum of those two random variables produces a new random variable $Z=X+Y$ (which would correspond to the aggregate bandwidth created by adding the 1-second bandwidth samples from the two subscribers together), and the new random variable Z will have a new probability density function given by $h(z)$, where $h(z)=f(x)$ convolved with $g(y)$.

Figure 6:
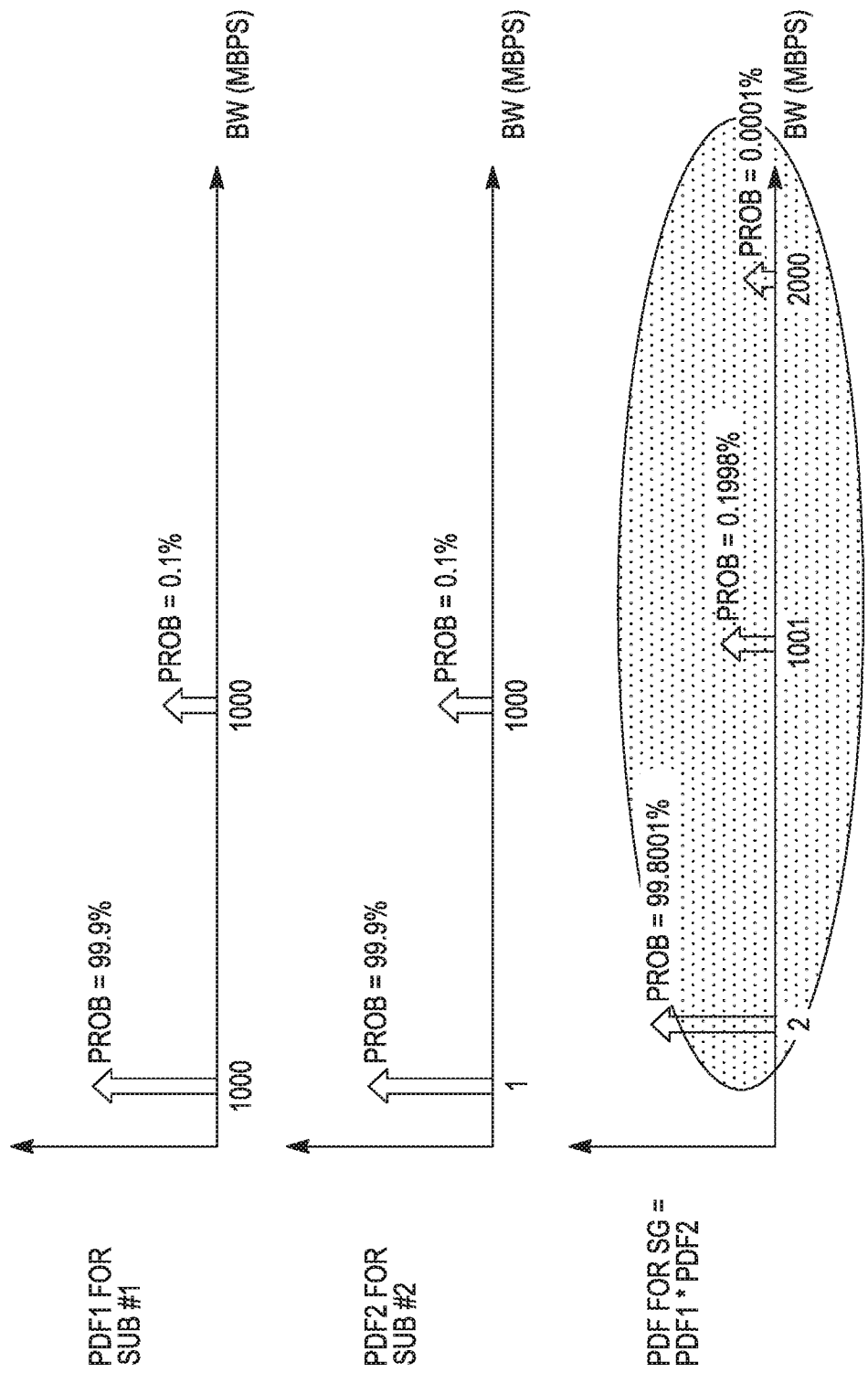
FIG. 6 shows Bandwidth Probability Density Functions for first and second subscribers, and a service group comprised of those Two Subscribers.

This rule is illustrated by the contrived (non-realistic and simplified) bandwidth probability density function plots in FIG. 6. The top plot of FIG. 6 shows the bandwidth probability density function of a particular subscriber #1. The middle plot of FIG. 6 shows the bandwidth probability densify function of a particular subscrber #2. The bottom plot of FIG. 6 (in yellow) shows the bandwidth probability density function resulting from the convolution of the first two bandwidth probability density functions (at the top and middle of FIG. 6). In other words, the bottom plot of FIG. 6 is essentially the bandwidth probability density function of a "Service Group" comprised of subcriber #1 and subscriber #2, whose bandwidths have been summed together. In this figure, the two subscribers both experience bandwidths of only 1 Mbps and 1000 Mbps. While not realistic, illustration shows how the convolution process creates all combinations of bandwidths from the subsribers. Their aggregate bandwidths (in the bottom yellow portion of FIG. 6) illustrate that their "Service Group" with their combined traffic loads would experience bandwidths of 2 Mbps (when both are receiving at 1 Mbps), 1001 Mbps (when one is receiving at 1 Mbps and the other is receiving at 1000 Mbps), and 2000 Mbps (when both are receiving at 1000 Mbps). The actual probabilities of each of these bandwidths are also displayed by the numbers next to the arrows. The following calculations should be noted:

i. prob(aggregate BW is 2 Mbps) = prob(sub #1 is 1 Mbps) * prob (sub #2 is 1 Mbps)
= 0.999*0.999
= 0.998001
= 99.8001%
ii. prob(aggregate BW is 1001 Mbps) =
[ prob(sub #1 is 1000 Mbps) * prob(sub #2 is 1 Mbps) ]
+ [ prob(sub #2 is 1000 Mbps) * prob(sub #1 is 1 Mbps) ] =
[0.001*0.999] + [0.001*0.999] =
0.001998 =
0.1998%
iii. prob(aggregate BW is 2000 Mbps) = prob(sub #1 is 1000 Mbps) * prob(sub #2 is 1000 Mbps)
= 0.001*0.001
= 0.000001
= 0.0001%.

Thus, it can be seen that the actions of the convolution tend to reduce the probabilities of particular bandwidth levels within the "Service Group" (relative to the bandwidth probabilities for each individual subscriber). In the end, the area under each plot must be one to satisfy the required conditions for any probability density function, and that condition is indeed satisfied in all three of the plots shown in FIG. 6.

Figure 7:
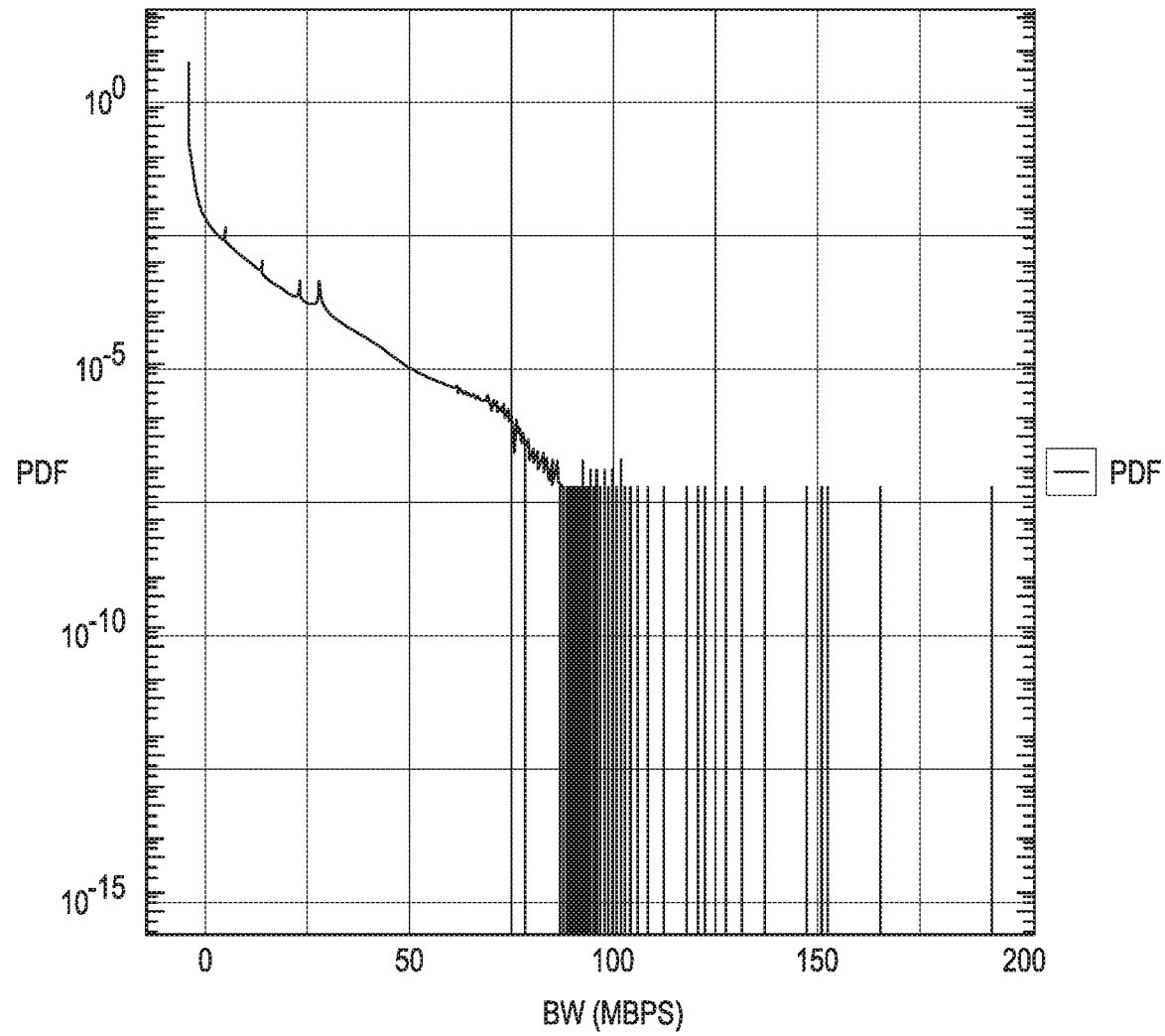
FIG. 7 shows a Bandwidth Probability Density Function for the first subscriber of FIG. 6.
Figure 8:
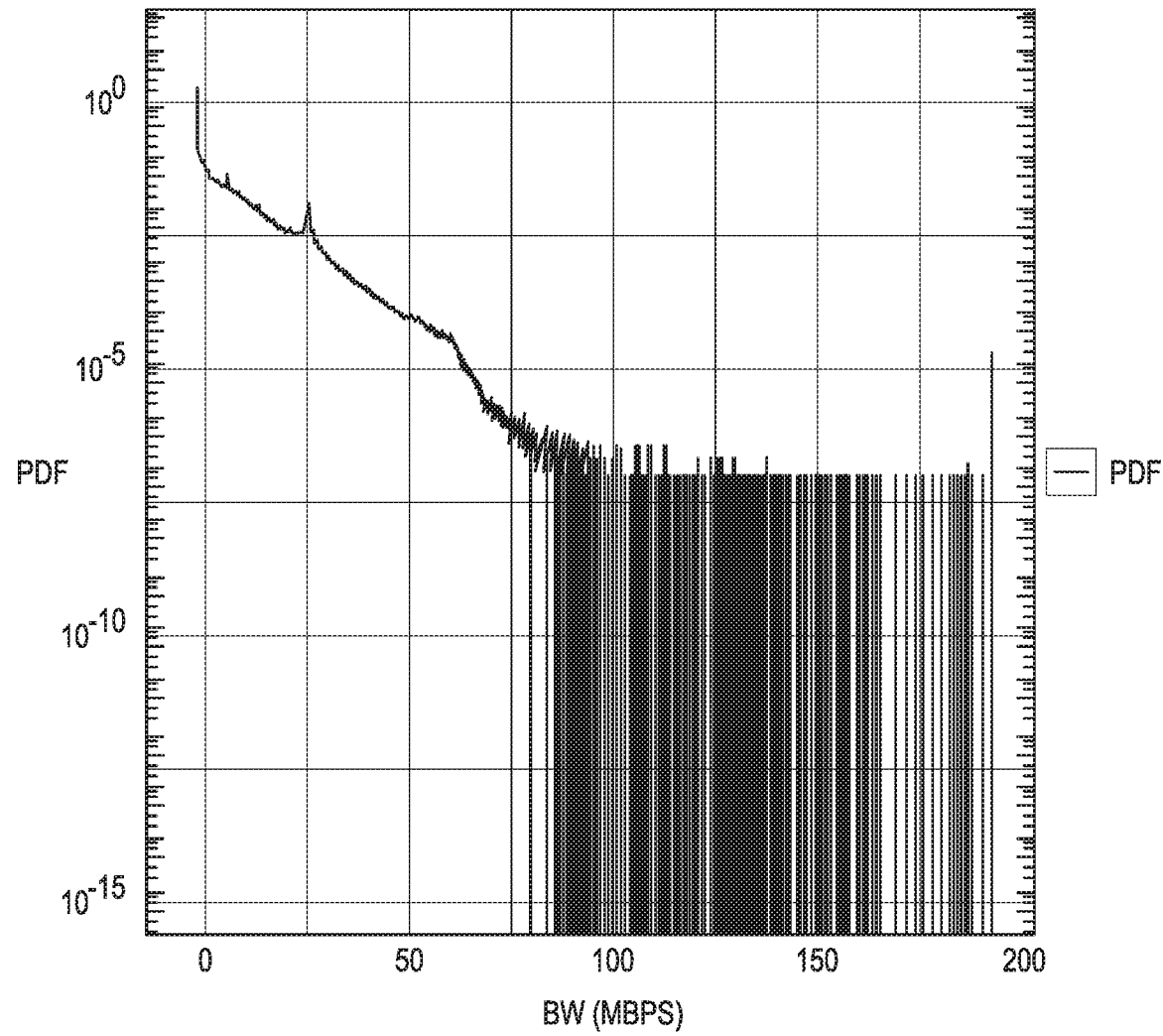
FIG. 8 shows a Bandwidth Probability Density Function for the second subscriber of FIG. 6
Figure 9:
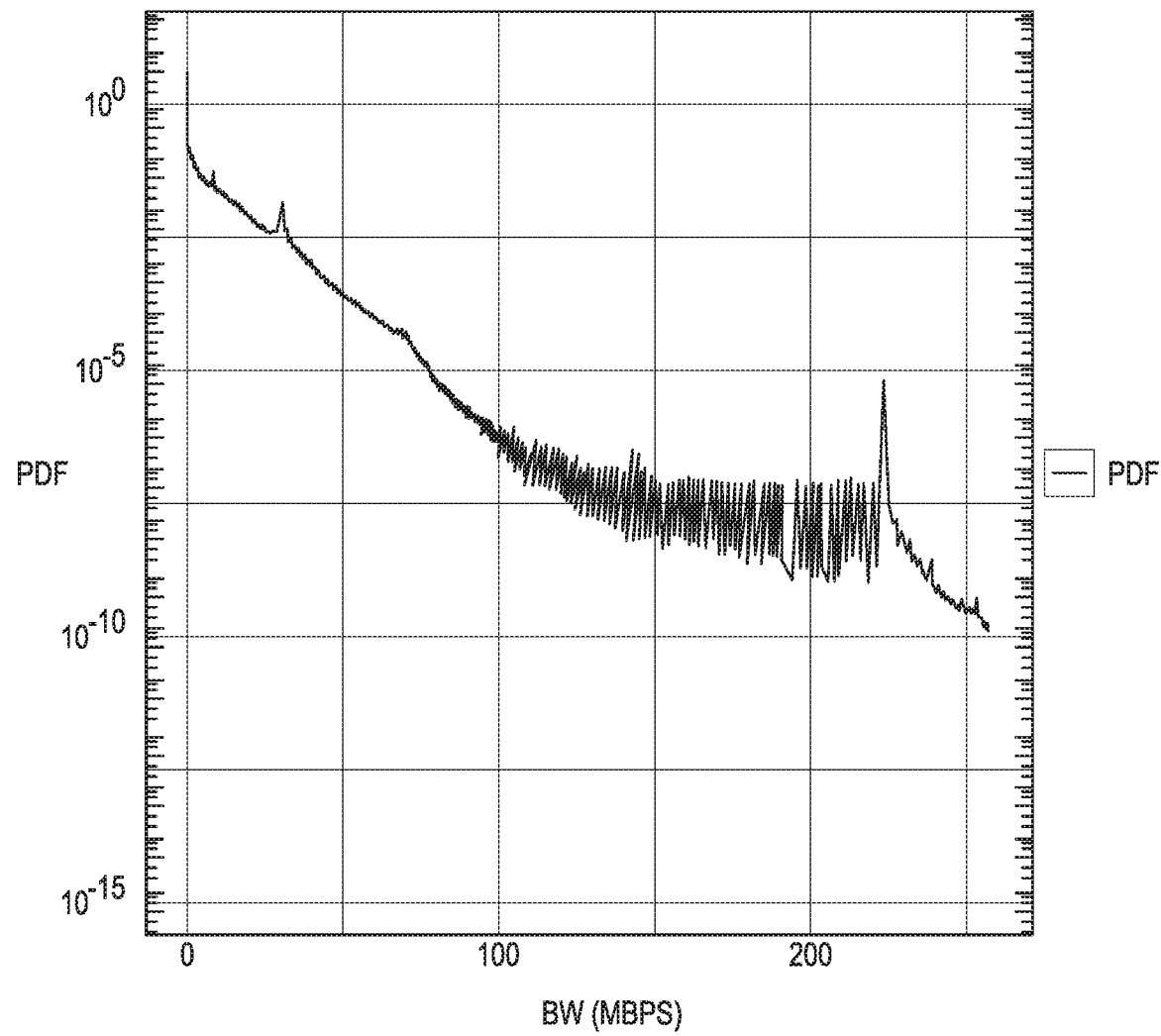
FIG. 9 shows a Bandwidth Probability Density Function for the service group of FIG. 6

Actual bandwidth probability density functions from two different, real-world subscribers are illustrated in FIGS. 7 and 8, respectively, and the resulting convolution output leading to the aggregated bandwidth probability density function for a "Service Group" comprised of the two subscribers is shown in FIG. 9.

It should be noted that the convolution argument described above is only valid if the two initial random variables (X and Y) are independent random variables. However, based on analyses similar to the one described in step 116, these correlations tend to be quite small, and can for the most part, be ignored. On this assumption, by convolving the two "fine-tuned and re-normalized bandwidth probability density functions" together, a new bandwidth probability density function that describes the probability of the aggregate bandwidths for their combined packet streams can be created. It should be noted that, when performing this convolution, it should be understood that the "fine-tuned and re-normalized probability density function" used for a subscriber might be the predicted probability density function for that subscriber in particular, or it might be the predicted probability density function for the Subscriber Type grouping to which the subscriber has been mapped. In either case, the probability density function is a best-guess prediction of that which the user would display.

Once the aggregate bandwidth probability density function for two subscribers has been calculated using the above convolution rule, then that resulting aggregate bandwidth probability density function can be convolved with a third subscriber's "fine-tuned and re-normalized bandwidth probability density function" to create the aggregate bandwidth probability density function for three subscribers. This process can be carried out over and over again, adding in a new subscriber's "fine-tuned and re-normalized bandwidth probability density function" with each successive convolution.

A "Service Group" containing Nsub subscribers would require (Nsub−1) successive convolutions to be performed to create the Final Aggregate Bandwidth Probability Density Function describing the aggregate bandwidth from all Nsub subscribers added together. Since each subscriber's "fine-tuned and re-normalized bandwidth probability density function" can be different from those of the other subscribers, the Final Aggregate Bandwidth Probability Density Function is a unique function for the unique set of subscribers that were grouped together within the "Service Group."

Figure 10:
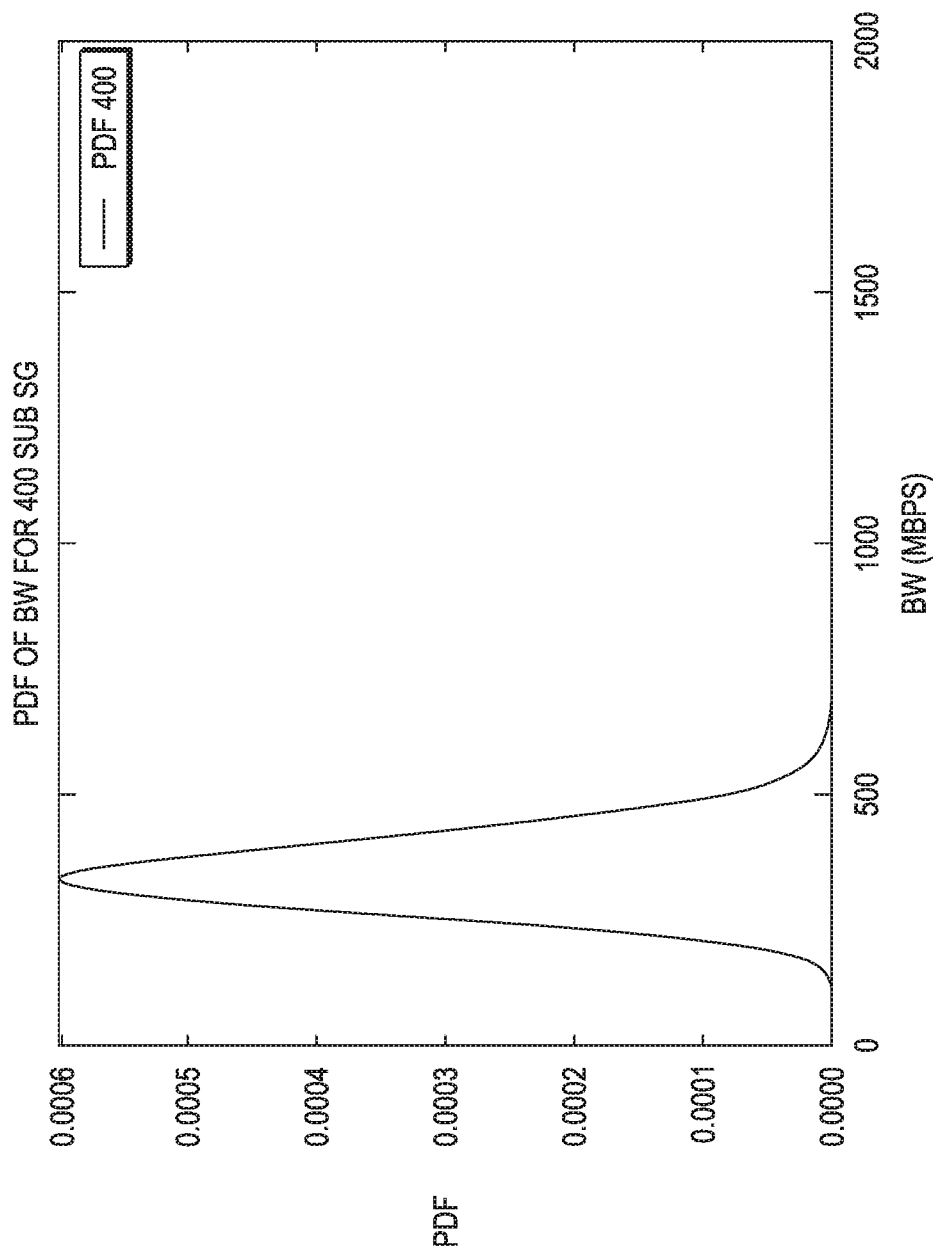
FIG. 10 shows an exemplary Final Aggregate Bandwidth Probability Density Function for a "Service Group" with 400 subscribers.

An example output of this multiple-convolution step is illustrated in FIG. 10 for a real-world "Service Group" containing Nsub=400 subscribers. While this curve looks like a normal, Gaussian curve, it has been found that its tails do not match the Gaussian shape. Since, as will be described later, the shape of the tails is the most important attribute of this curve for purposes of this disclosure, the Gaussian curve cannot reliably be used as an approximation to the actual curve calculated via repetitive convolution. Thus, the repetitive convolution (or the related repetitive FFT) should preferably be utilized.

It should be clear that a similar set of (Nsub−1) successive convolution operations can be performed if the "Service Group" is alternatively defined to have Nsub subscribers, with X % of them being a part of a Service Type grouping with the characteristics of {Tavg1, Tmax1, and Application Active Ratio 1} and Y % of them being a part of a Service Type grouping with the characteristics of {Tavg2, Tmax2, and Application Active Ratio 2}. In that case, we would perform (ceiling(Nsub*X %)−1) convolutions to combine the bandwidth probability density functions of the first ceiling(Nsub*X %) subscribers. It should be noted that these convolutions would utilize bandwidth probability density functions created using {Tmax1, Tavg1, and Application Active Ratio 1}). Then the results of that initial set of convolutions would be used as a starting point, and then another (ceiling(Nsub*Y %)−1) convolutions would be performed to combine the bandwidth probability density functions of the next ceiling(Nsub*Y %) subscribers with the results of the initial set of convolutions. These convolutions would utilize bandwidth probability density functions created using {Tmax2, Tavg2, and Application Active Ratio 2}). This would yield a Final Aggregate Bandwidth Probability Density Function describing the aggregate, combined bandwidth expected for the Nsub subscribers operating within the "Service Group."

The above example illustrates the convolution operations required when there were two different Service Type groupings defined within the "Service Group." Extensions of the above approach are obvious if there are more than two different Service Type groupings within the "Service Group."

It should be apparent that the above approach can be used for "Service Groups" of any size (ex: Nsub=50 or Nsub=50, 000). The approach can also be used for "Service Groups" with any mix of subscriber types (ex: all subscribers with the same high {Tmax, Tavg, Application Active Ratio} values, or a 50:50 mix of subscribers with half having high high {Tmax, Tavg, Application Active Ratio} values and half having low high {Tmax, Tavg, Application Active Ratio} values, or a mix with every subscriber having a different set of {Tmax, Tavg, Application Active Ratio} values.

When the "Service Group" size grows to be large, the large number of convolutions that must be performed in this step can be quite time-consuming. As an example, a "Service Group" containing Nsub=50,000 subscribers would require the repetitive convolution function to be performed 49,999 times. In addition, the length of the convolution grows with each repetitive convolution, so the convolution calculations become quite slow for large Nsub values. Disclosed are several techniques that can be employed to help accelerate the calculation of the multiple convolution functions.

First, Fast Fourier Transforms (FFTs) can be used instead of the slower convolutions. If one probability density function has N samples and the second probability density function has M samples, then each of the probability density functions must be zero-padded to a length of N+M−1, which will ensure that linear convolution (and not circular convolution) is performed by this step. The FFT of each of the zero-padded probability density functions is then calculated. The two FFTs are multiplied together using complex number multiplication on a term-by-term basis. Then the inverse FFT of the multiplied result is then calculated. The result of that inverse FFT is the convolution of the original two probability density functions. This FFT approach is a much faster implementation when compared to the convolution approach, so the FFT approach is the preferred embodiment.

Second, if many of the subscribers use the same {Tmax, Tavg, Application Active Ratio} values, then a binary acceleration procedure is possible. For example, assuming for example that a subset of eleven subscribers whose bandwidth probability density functions will be convolved together have identical {Tmax, Tavg, Application Active Ratio} values, those eleven subscribers will therefore (by definition) also have identical bandwidth probability density functions, given by f(x). The binary acceleration is achieved using the following process. First, convolve f(x) with f(x) to create the bandwidth probability density function for two subscribers—the resulting bandwidth probability density function for two subscribers will be called g(x). Then convolve g(x) with g(x) to create the bandwidth probability density function for four subscribers—the resulting bandwidth probability density function for four subscribers will be called h(x). Then convolve h(x) with h(x) to create the bandwidth probability density function for eight subscribers—the resulting bandwidth probability density function for eight subscribers will be called k(x). Then convolve k(x) with g(x) to create the bandwidth probability density function for ten subscribers—the resulting bandwidth probability density function for ten subscribers will be called l(x). Then convolve l(x) with f(x) to create the bandwidth probability density function for eleven subscribers—the resulting bandwidth probability density function for eleven subscribers will be called m(x). This result would have required a total of (11−1)=10 convolutions if we had not performed the binary acceleration process. Using this binary acceleration process, we were able to reduce the total number of convolutions to 5 convolutions, where the first convolution produced the result for two subscribers, the second convolution produced the result for four subscribers, the third convolution produced the result for eight subscribers, the fourth convolution produced the result for ten subscribers, and the fifth convolution produced the result for eleven subscribers. This binary acceleration process is even more efficient for larger "Service Group" sizes. As an example, if we have a "Service Group" with exactly Nsub=32,768 subscribers and if we assume that all of those subscribers have the same {Tmax, Tavg, Application Active Ratio" values, then instead of performing (32,768−1)=32,767 convolutions, we could achieve our desired result by applying the binary acceleration process and only perform 15 convolutions (since $2^{15}$=32,768).

Third, it is apparent that the convolution calculations are partition-able functions that can be distributed across multiple processor cores in a distributed environment. For example, if a total of 32 convolutions need to be performed, then 16 of them could be placed on one processor core and 16 could be placed on a second processor core. Once each processor core has calculated its intermediate result, the two intermediate results could be combined at a third processor core where the final convolution between the two intermediate results is performed. This divide-and-conquer approach to the convolution calculations can obviously be distributed across even more than two processor cores as long as the results are ultimately merged together for the final convolution steps. This entire approach also seems to be well-architected to be divided and run in a parallel, multi-node fashion within a Hadoop cluster supporting YARN or MapReduce environments. So the computation of the convolutions seems to be well suited for parallelization using multiple servers.

Determining Available Bandwidth Capacity in the "Service Group"

Referring to FIG. 2C, for any sub-system that is passing data to (or from) a group of subscribers within a "Service Group," it is preferable to specify the Available Bandwidth Capacity at optional step 120. Usually, this capacity is dictated by some potential bottlenecks within the system that limit the total amount of bandwidth capacity that can be passed through to (or from) the subscribers within the "Service Group".

These potential bottlenecks can show up in any one of several areas since the data is usually being processed by many elements. As an example, consider a DOCSIS environment where the downstream data is passed through a router 16 and through a CMTS 18 as shown in FIG. 1, onto a fiber-coax distribution system and then onto a cable modem 14. Potential bottlenecks include the WAN-side port bandwidth on the router 16, the router processing capacity, the router backplane capacity, the LAN-side port bandwidth on the router, the WAN-side port bandwidth on the CMTS 18, the CMTS processing capacity, the CMTS backplane capacity, and the Cable-side port bandwidth on the CMTS 18 (defined by the number of DOCSIS channels configured on the coax). Usually, only one of these potential bottlenecks becomes the limiting bottleneck, which limits the overall capacity of the system to its lowest value. While any of these potential bottlenecks (listed above) could be the limiting bottleneck, it is oftentimes found that it is the Cable-side port bandwidth on the CMTS 18 (defined by the number of DOCSIS channels configured on the coax).

Regardless of which potential bottleneck is the limiting bottleneck, the Operator must identify the limiting bottleneck and determine the associated bandwidth capacity permitted by that limiting bottleneck. The Operator can always choose to modify the limiting bottleneck (adding DOCSIS channels, etc.) to increase the associated bandwidth capacity, but that usually involves added system costs. At some point, though, the Operator must "nail down" the particular system elements that they plan to utilize and determine their final limiting bottleneck and their final associated bandwidth capacity. This final associated bandwidth capacity becomes the Available Bandwidth Capacity for the "Service Group."

Calculate a QoE Using the Probability of Exceeding the "Service Group's" Available Bandwidth Capacity as Metric Once the Final Aggregate Probability Density Function" has been calculated for a particular "Service Group" (using the iterative convolutions from the previous Step) and once the Available Bandwidth Capacity for the "Service Group" has been identified, it may be preferable to define a metric to quantitatively measure the Quality of Experience Level that the subscribers within that "Service Group" are likely to experience. Ideally, this would be a metric that ties back to the Final Aggregate Probability Density Function and the Available Bandwidth Capacity.

Many different Quality of Experience metrics could be utilized. One preferred metric that is applicable to many different service types (data, voice, video, etc.) is the probability that the subscriber actions will request bandwidth levels that exceed the "Service Group's" Available Bandwidth Capacity. Thus, at step 122 a desired QoE Level may be specified using the metric of the probability of exceeding the "Service Group's" available bandwidth capacity. The reasoning for using this metric is straightforward.

Figure 11:
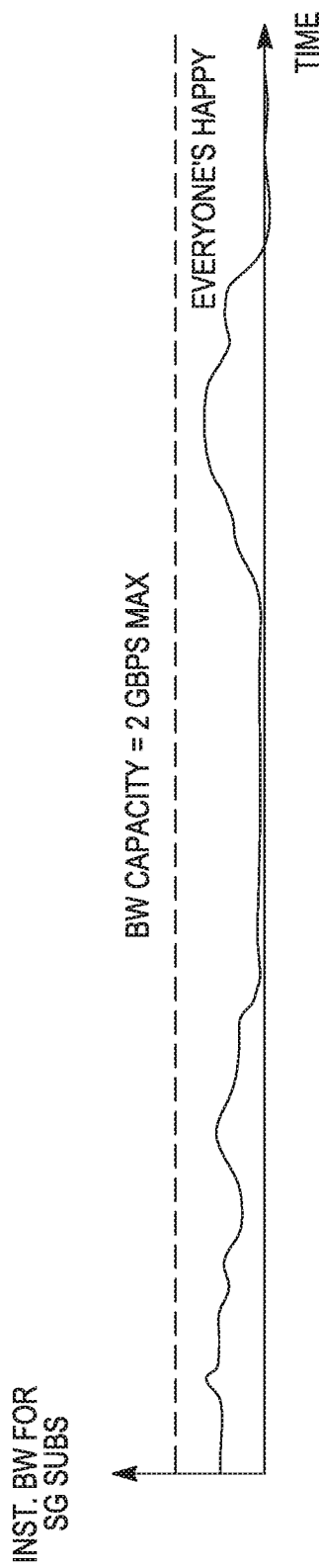
FIG. 11 illustrates a system that typically exhibits high QoE Levels.

Consider a scenario where an Operator has constructed a system that can deliver an Available Bandwidth Capacity of 2 Gbps to a "Service Group." If the subscribers within that "Service Group" are never requesting more than 2 Gbps of actual bandwidth, then it is highly probable that those subscribers will have high Quality of Experience levels, as shown for example, in FIG. 11. This, of course, assumes that their data flows are not hindered by other path obstacles, such as server overloads at the source or router congestion in the path north of the Operator's delivery network.

Figure 12:
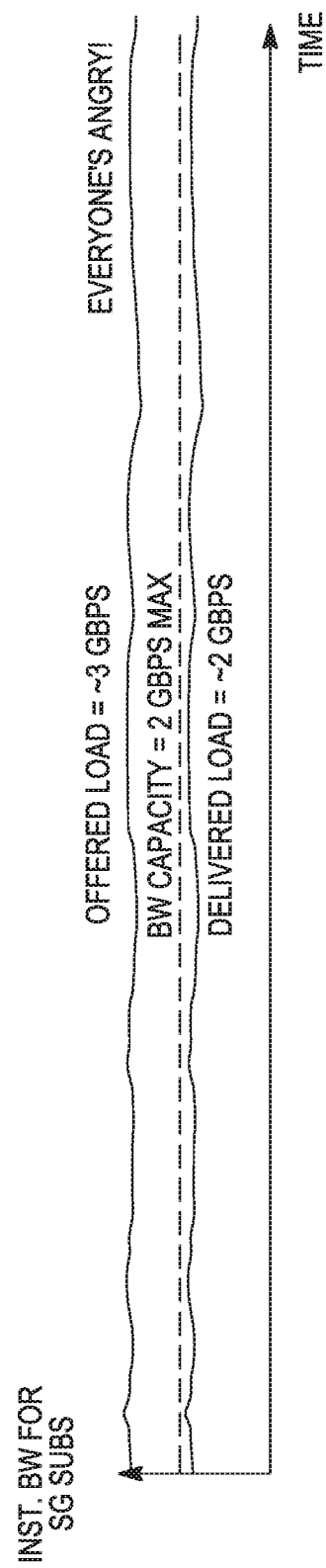
FIG. 12 illustrates a system that typically exhibits low QoE Levels.

If, conversely, the subscribers within that "Service Group" are always requesting more than 2 Gbps of actual bandwidth, then it is highly probable that those subscribers will have a low Quality of Experience level, as illustrated in FIG. 12. The high bandwidth traffic streams (the Offered Load) arriving at the CMTS, such as the CMTS 18 of FIG. 1, will need to be throttled to the available bandwidth capacity of 2 Gbps by the CMTS box to create a set of lower-bandwidth traffic streams that are egressed from the CMTS (the Delivered Load). This throttling of the Offered Load can only be accomplished using packet delays in queues and packet drops within the CMTS. It should be clear that packet delays and packet drops occur at all network elements—such as Routers—within the Internet. These delays and drops are likely to couple back (via the TCP ACK feedback path) to the TCP source and cause TCP to decrease its congestion window and decrease the throughput of the traffic streams being sent to the subscribers. The subscribers are likely to see the lowered throughput values, and those lowered throughput values could lead to lowered QoE levels.

Figure 13:
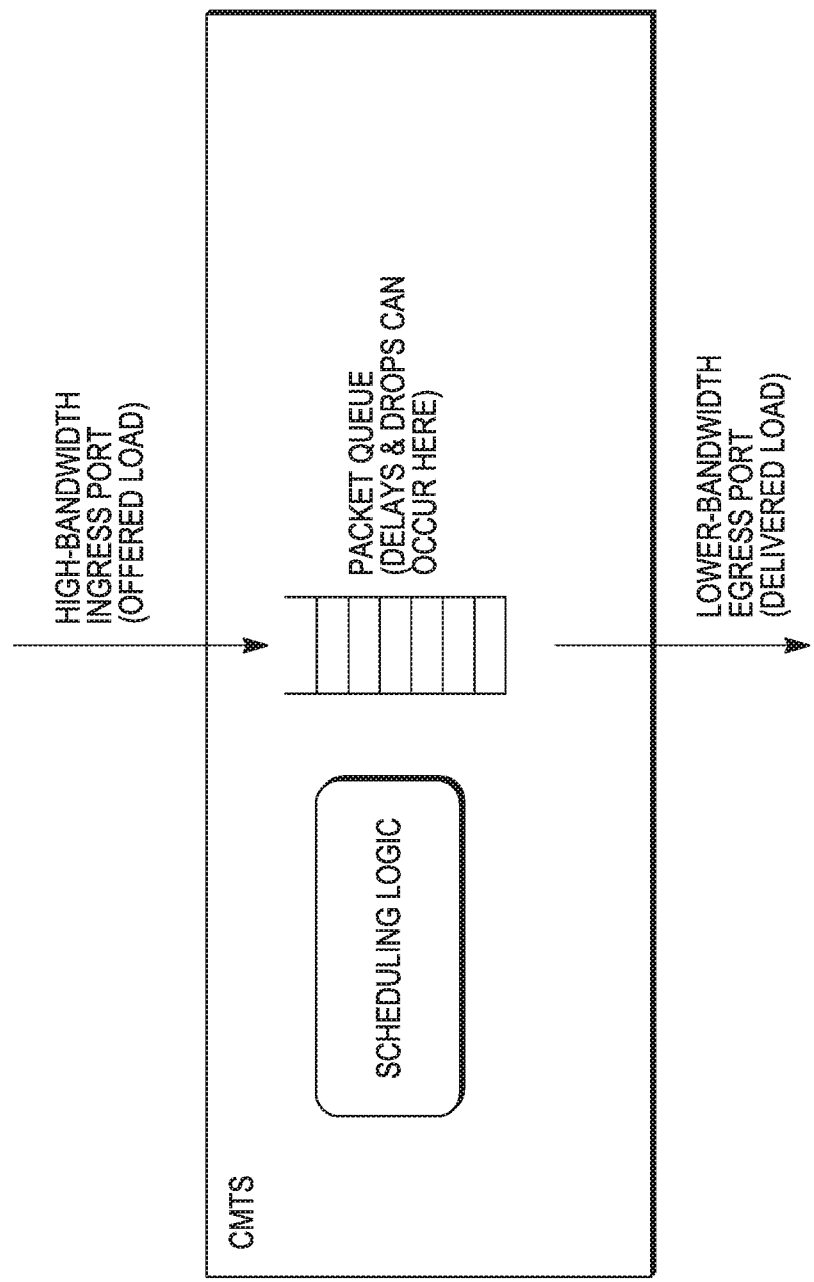
FIG. 13 illustrates ingress bandwidth and egress Bandwidth on a CMTS.

FIG. 11 thus illustrates an interesting point related to the bandwidth-sampled measurements take in step 102 of FIG. 2A, i.e. that there is both ingress traffic and egress traffic that must oftentimes be considered. For example, for the downstream high-speed data traffic propagating through the network elements of FIG. 1, the ingress traffic for the CMTS 18 arrives from the router 16, and the egress traffic for the CMTS 18 departs from the CMTS heading towards the combiner 19 downstream of the CMTS 18. Thus, there are many locations at which bandwidth samples can be taken. Ideally, these bandwidth samples are taken at the ingress side of the network element where queuing and dropping are likely to play a significant role in throttling the bandwidth at a "choke point." For DOCSIS systems, the queuing and dropping of packets are likely to occur within the Traffic Management & Scheduling logic of the CMTS. The "choke point" is likely to be at the CMTS itself, because that is where available bandwidth capacity from the ingress links (at the top of the CMTS in FIG. 1) is reduced immensely before the traffic is transmitted on the egress links. The ingress bandwidth will oftentimes be higher than the egress bandwidth because of the packet delays and packet drops that can occur within the CMTS. This is why it is possible for the ingress bandwidth on the CMTS to exceed the Available Bandwidth Capacity associated with the egress port on the CMTS. The potentially-higher bandwidth on the ingress port is sometimes called the "Offered Load," and the potentially-lower bandwidth on the egress port is sometimes called the "Delivered Load." It is oftentimes true that the Delivered Load is lower than the Offered Load. The difference between the two values at any point in time represents packet streams that have been delayed or dropped to lower the Delivered Load levels. These concepts are illustrated within FIG. 13.

Figure 14:
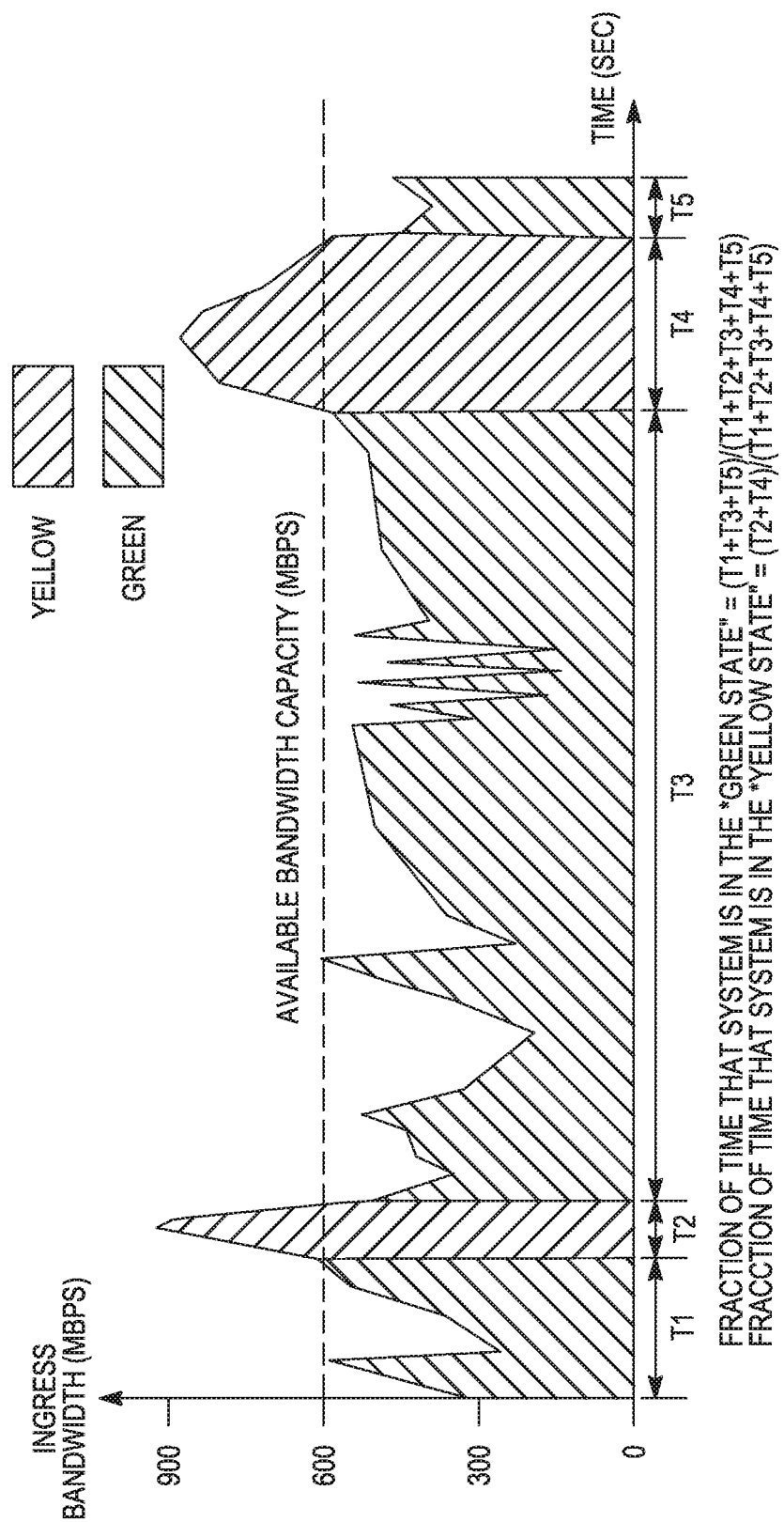
FIG. 14 illustrates a system where actual bandwidth fluctuates to sometimes provide a high QoE and sometimes provide a low QoE.

The extreme examples illustrated within FIGS. 11 and 12 are not the norm. In the real world, traffic fluctuations can occur, so that Offered Load is sometimes less than the available bandwidth capacity, yielding a good QoE, but sometimes greater than available bandwidth capacity, yielding potentially bad or potentially good Quality of Experience. This is illustrated in FIG. 14.

Within this specification, the periods of time when the Offered Load is less than the Available Bandwidth Capacity will describes as "Green" periods of time, where green implies good QoE—all packets are flowing quickly through the CMTS without large delays or packet drops. Within this specification, periods of time when the Offered Load is greater than the Available Bandwidth Capacity will be described to be "Yellow" periods of time, where yellow implies possibly bad QoE or possibly good QoE; some of the packets are flowing through the CMTS with large delays and/or packet drops during a "Yellow" period of time, but it is not clear if that "Yellow" event is causing reductions in Quality of Experience. Whether a low QoE results depends on the nature of the applications that are recipients of the reduced bandwidth levels. For example, ABR IP Video streams (such as those delivered by Netflix) are rather resilient to periodic packet delays and packet throughputs because (a) there are relatively large jitter buffers built into the client software that permits the incoming packet streams to have periodic reductions or packet losses, and TCP re-transmissions can easily fill in those gaps; and (b) the adaptive nature of ABR IP Video can permit the stream bandwidths to be reduced (using lower resolutions) if/when packet delays or packet drops are experienced. However, other applications (such as Speed Tests) can be very sensitive to the packet delays and packet drops that might occur. Thus, a "Green" event almost always implies good Quality of Experience, but a "Yellow" event is less clear—it could be implying bad Quality of Experience for some subscribers and good Quality of Experience for other subscribers. But at a high level, a "Yellow" event does represent the possibility of having lowered Quality of Experience.

Thus, we state that we can get some measure of the Quality of Experience among subscribers if we monitor the fraction of time that the subscribers within the "Service Group" are experiencing "Green" events (Prob("Green")) and the fraction of time that subscribers within the "Service Group" are experiencing "Yellow" events (Prob("Yellow")). It should be noted that if observations are taken over long enough times, then the fraction of time that subscribers within the "Service Group" are experiencing "Green" events=probability of experiencing a "Green" event=Prob ("Green") and the fraction of time that subscribers within the "Service Group" are experiencing "Yellow" events=probability of experiencing "Yellow" event=Prob ("Yellow"). It should also be noted that Prob("Green")+Prob ("Yellow")=1.0. A higher fraction of "Yellow" events (i.e.—a higher value of Prob("Yellow")), and conversely, a lower fraction of "Green" events (i.e.—a lower value of Prob("Green")) is an indicator that the Quality of Experience level for subscribers might be lowered. And a lower fraction of "Yellow" events (i.e.—a lower value of Prob ("Yellow")), and conversely, a higher fraction of "Green" events (i.e.—a higher value of Prob("Green")) is an indicator that the Quality of Experience level for subscribers are probably higher. So although these metrics (Prob("Yellow")

and Prob("Green")) are not perfect, they are both measurable metrics are useful indicia of Quality of Experience.

Another useful result of using these two metrics (Prob("Yellow") and Prob("Green")) is that they can also be easily obtained from the Final Aggregate Bandwidth Probability Density Function combined with the Available Bandwidth Capacity value. This means that work in the time domain is not necessary to calculate the two metrics, and since the defined techniques in the preceding steps permit the calculation of Final Aggregate Bandwidth Probability Density Functions and Available Bandwidth Capacity values for "Service Groups" for future times, using probability density functions and Available Bandwidth Capacity values to calculate the Prob("Yellow") and Prob("Green") will provide more value and more ability to adapt to the future than working with time-domain samples.

An exemplary embodiment that calculates the two metrics (Prob("Yellow") and Prob("Green")) from a known Final Aggregate Bandwidth Probability Density Function and a known Available Bandwidth Capacity value for a "Service Group" proceeds as follows. Recognizing that the area under a portion of the Final Aggregate Bandwidth Probability Density Function ranging from Bandwidth #1 to Bandwidth #2 yields the probability of the "Service Group" seeing bandwidth within the range from Bandwidth #1 to Bandwidth #2. Thus, if Bandwidth #1 is defined to be at the Available Bandwidth Capacity value and if Bandwidth #2 is defined to be infinity, then the Prob("Yellow") is equal to the area under the Final Aggregate Bandwidth Probability Density Function between the Available Bandwidth Capacity value and infinity. In essence, this is the probability that the "Service Group's" bandwidth level exceeds the Available Bandwidth Capacity value.

Figure 15:
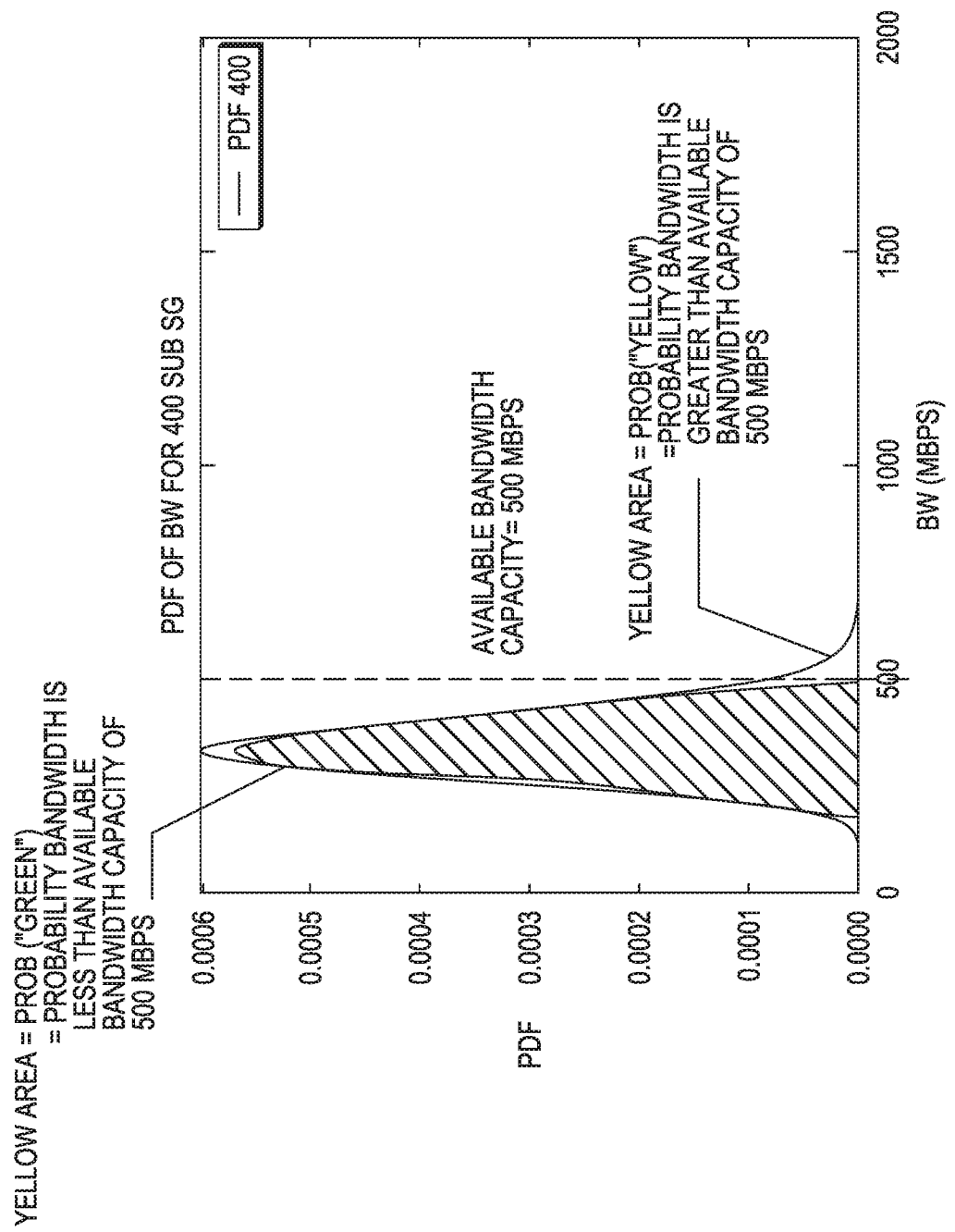
FIG. 15 shows a calculation of a Prob("Green") and Prob("Yellow") from a Final Aggregate Bandwidth Probability Density Function and an Available Bandwidth Capacity.

In a similar fashion, if Bandwidth #1 is defined to be zero and if Bandwidth #2 is defined to be the Available Bandwidth Capacity value, then the Prob("Green")=the area under the Final Aggregate Bandwidth Probability Density Function between zero and the Available Bandwidth Capacity value. In essence, this is the probability that the "Service Group's" bandwidth level is less than the Available Bandwidth Capacity value. These concepts are illustrated in FIG. 15. As the Available Bandwidth Capacity (defined by the red, dashed line) is moved to higher or lower bandwidth levels (to the right and left in the figure), the area associated with the Prob("Green") becomes larger and smaller, respectively. This modification of the Available Bandwidth Capacity value essentially changes the Quality of Experience level.

Thus, simple and well-known numerical methods to calculate areas underneath curves can be used to determine both Prob("Green") and Prob("Yellow") once the Final Aggregate Bandwidth Probability Density Function and the Available Bandwidth Capacity are known. The Prob("Green") value is a metric that can be used as a worst-case indicator of Good Quality of Experience—it essentially describes the worst-case (smallest) fraction of time to expect the subscribers within the "Service Group" to experience Good Quality of Experience. Similarly, the Prob("Yellow") value is a metric that can be used as a worst-case indicator of Bad Quality of Experience in that it essentially describes the worst-case (largest) fraction of time to expect the subscribers within the "Service Group" to experience Bad Quality of Experience. It should be noted that the actual fraction of time that subscribers will truly experience Bad Quality of Experience will likely be less than this worst-case number. As a result, this Prob("Yellow") metric actually gives an upper bound on the amount of time that subscribers will experience Bad Quality of Experience.

It should be clear that the use of a Bandwidth Probability Density Function to describe the bandwidth bursts of FIG. 14 loses an important piece of information that is in FIG. 14. That piece of information describes the temporal locality of the bandwidth bursts. In the real world, it is clear that there is some dependence between the temporal location of one bandwidth burst (for a 1-second window) and the temporal location of other bandwidth bursts (for 1-second windows). Once a burst begins, there is a higher probability that it will continue to exist in the next few seconds. However, this effect becomes less and less important when systems have a relatively low Prob("Yellow") value. The probability of ever bursting to "Yellow" is low, so the probability of having consecutive "Yellow" intervals is also a low probability. Since it is to be expected that designs using the disclosed systems and methods will typically be demanding that Prob("Yellow") be low, the fact that the temporal relationships between bursts are lost in the Bandwidth Probability Density Functions may be ignored.

Calculate a QoE Using the Average Time Between Events where Actual Bandwidth Exceeds Available Bandwidth as Metric The calculations outlined in the previous disclosure pertaining to step 122 give a reasonably good QoE metric using the disclosed Prob("Green") and Prob("Yellow") values. High Prob("Green") values and correspondingly-low Prob("Yellow") values correspond to High Quality of Experiences. However, other metrics may be used in addition, or as an alternative to, the metrics disclosed with respect to step 122 to provide more or different information on how well or poorly a particular "Service Group" design will operate. Once the Prob("Yellow") metric is calculated, this value will also indicate the fraction of time that the "Service Group" will be experiencing a "Yellow" event (with the Offered Load being greater than the Available Bandwidth Capacity). Since the bandwidth samples for the "Service Group" are taken in known intervals, e.g. every second, this Prob("Yellow") metric also indicates the fraction of bandwidth samples that we expect to show bandwidth measurements that are greater than the Available Bandwidth Capacity for the "Service Group.

Thus, the "Yellow" events are actually scattered in time across all of the 1-second time-domain samples for the "Service Group." In some embodiments, it may be assumed that the "Yellow" events are not correlated and can occur randomly across time, hence the average time between successive "Yellow" events (i.e.—the average time between 1-second samples with bandwidth greater than the Available Bandwidth Capacity) can be calculated, and in step 124 a QoE can be specified using the metric of the average time between events where actual bandwidth exceeds available bandwidth. The simple formula that gives us this new metric is:

$$\text{Avg. Time Between "Yellow" Events} = \text{Sampling Period} / [\text{Prob}(\text{"Yellow"})]$$

In many of the examples above, a sampling period of 1 second was used. In such a case, the formula above becomes:

$$\text{Average Time Between "Yellow" Events} = 1 \text{ second} / [\text{Prob}(\text{"Yellow"})].$$

The table below indicates how various measurements for Prob("Yellow") (and Prob("Green")) will convert into Average Time Between Successive "Yellow" Event values:

| Prob Yellow | Prob Green | Average Time Between "Yellow" |
|---|---|---|
| 0.02 | 0.98 | 50 seconds |
| 0.01 | 0.99 | 1 min. 40 seconds |
| 0.005 | 0.995 | 3 min. 20 seconds |
| 0.001 | 0.999 | 16 min. 40 seconds |
| 0.0005 | 0.9995 | 22 min. 20 seconds |
| 0.0001 | 0.9999 | 2 hours 46 min. |
| 0.00005 | 0.99995 | 5 hours 33 min. |

From this table, it can be seen the reductions in Prob ("Yellow") values lead to lower probabilities of having a "Yellow" event, and this in turn leads to much longer average periods of time between successive "Yellow" events. If the "Service Group's" Available Bandwidth Capacity is increased to a level so that the Prob("Yellow") drops to be 0.0001 (and the Prob("Green")=0.9999), then the average time duration between successive "Yellow" events is 2 hours and 46 minutes. This is approximately equal to the entire duration of the "Busy Period" that typically occurs from 8 pm to 11 pm every night. As a result, it implies that only a single 1-second "Yellow" event will typically occur in a given night. This may be deemed to be acceptable to most Operators. If even lower probabilities of "Yellow" events are desired, then the average time duration between successive "Yellow" events will be even longer, and many nights will go by without a single "Yellow" event occurring.

The present inventors believe that cost-sensitive Operators might wish to run their "Service Groups" with a Prob("Yellow")=0.02 value and a corresponding (Prob ("Green")=0.98. With this network condition, a "Yellow" event will occur about once every 50 seconds. But since most "Yellow" events are not catastrophic and since the successive "Yellow" events are likely to impact different subscribers with each successive event, most subscribers will likely not notice the repercussions of a "Yellow" event occurring every 50 seconds. Using this design permits the Operator to run the "Service Group" with much lower Available Bandwidth Capacities, which permits them to save investment dollars on equipment needed to provide that Available Bandwidth Capacity. However, those of ordinary skill in the art will recognize that different embodiments using this disclosed metric may target different Prob("Yellow") values.

Speed tests may be one of the most demanding applications, and is very sensitive to network congestion. It is also a very important tool that operators and customers both use to measure SLA performance. Therefore, the QoE impact of a common speed test like OOKLA when using Prob("Yellow")=0.02 value may be examined. This test will typically run in 25 seconds or less, so on average, there may be a single "Yellow" event once every other speed test. This means the speed test without the "Yellow" event will run at its full Tmax speed. The other speed test with a "Yellow" event will run at full speed for 24 of the 25 intervals, but at a reduced rate for the "Yellow" interval. Even if we assume the capacity is negligible during the "Yellow" event, the speed test still achieves 96% of its Tmax capacity. If the DOCSIS Tmax parameter is provisioned with at least 4% additional overhead, then the consumer can still achieve their contract SLA value despite a single "Yellow" event. With at least 8% additional Tmax overhead, the consumer can still achieve their contract SLA value with two "Yellow" events. For this example, the probability of two "Yellow" events within a single speed test is a very small.

Those of ordinary skill in the art will appreciate that some embodiments of the disclosed system may only use the metric described in step 122, while others may only use the metric described in step 124. For example, as noted above, the metric described in step 124 (the average time between "Yellow" events) is calculated on the assumption that the yellow events are not correlated, and although this metric may still be useful in circumstances where the yellow events do happen to be correlated, justifying the metric's use in all circumstances, some other embodiments may determine whether such correlation exists, and if it does exist, only use the metric described in step 122. Still other embodiments may use both metrics while other embodiments may use other metrics not specifically described herein, thus each of the steps 122 and 124 are strictly optional, though in preferred embodiments it is certainly beneficial to establish some metric for quantifying QoE.

Those of ordinary skill in the art will also appreciate that the steps previously described do not necessarily have to be performed in the exact order described. For example, some embodiments may specify available bandwidth prior to sampling per-subscriber bandwidth usage, or prior to creating probability distribution functions, etc.

All of the previous steps can be performed in real-time (as the network is operating) or can be performed by sampling the data, archiving the data, and then performing all of these calculations off-line and saving the results so that the results can be used in the field at a later time.

The sampling/archiving approach requires network monitoring tools, significant amounts of storage and significant post-processing, which may restrict the number of sites and Service Groups that may be monitored. Conversely, designing a CMTS/CCAP box with ports or other connections enabling remote monitoring/storing of data flowing through the CMTS/CCAP may enable massive amounts of data to be analyzed in real-time and compressed into a more manageable format. While trying to create a bandwidth pdf per modem may not be realistic, the CMTS may be able to create Frequency Histogram bins for each of the Subscriber Type groups as well as its own DOCSIS Service Groups and its NSI port Service Group. This will easily allow a bandwidth pdf to be created for each in real time. With many CMTSs gathering these same statistics, a much larger sampling of modems can be created.

Using these techniques, the system may be able to effectively calculate Prob("Yellow") in real time for each of its DOCSIS Service Groups. This potentially enables real-time QoE Monitoring for each and every Service Group, providing a tremendous boost to network operations trying to determine when each Service Group's Available Bandwidth Capacity may be exhausted.

Determining if the QoE Metrics are Acceptable

The techniques described in Steps 102-124 permit the Operator to calculate several Quality of Experience Metrics, including the Prob("Yellow"), the Prob("Green"), and the Average Time Between Successive "Yellow" Events.

In optional step 126, the Operator may determine if the resulting output Quality of Experience metrics are acceptable or not. Operators can use experience with customer trouble tickets and correlate the number of customer trouble tickets to these metrics to determine if the output metrics are a sufficient measure of QoE. They can also use the results of simulation runs (mimicking the operations of subscribers and determining when the metrics yield acceptable subscriber performance levels). Either way, this permits the Operator to eventually define Threshold Values for Acceptable Operating Levels for each of the Quality of Experience metrics.

Another technique that can create a more formal correlation between the Prob("Green") values and the Quality of Experience is to create a simulation model of the CMTS (or other network element), from which the nature of the associated packet stream delays and packet drops for a particular system can be determined, and then subsequently the approximate Quality of Experience Level (such as the OOKLA Performance Monitor Score or other Performance Monitor Score) of packet streams within an "Area" (such as a Service Group) can be determined by inserting those simulated packet delays and packet drops into a real OOKLA run. In some embodiments, this can be accomplished in a laboratory environment, which can be accomplished as shown below:

i. Identify the delay statistics of long-delay bursts associated with a particular Prob("Green") value. This can be accomplished by running actual collected subscriber packet streams through the CMTS simulation model. The model preferably buffers the packets and potentially drops packets when bandwidth bursts occur. The output of this simulation run will yield delay and drop characteristics that correspond to the particular "Service Group" solution;

ii. Whenever an ingress bandwidth burst occurs from multiple transmitting subscribers, there should be clear delay bursts occurring within the simulation model. These delay bursts are preferably labeled with a variable i, where i varies from 1 to the number of delay bursts in the simulation run. For a particular delay burst with the label i, that particular delay burst can be roughly characterized by looking at the worst-case delay $Max\_Xi$ experienced by any packet within that i-th delay burst ($Max\_Xi$). It can also be roughly characterized by the entire duration $Yi$ (in time) of the delay burst. Compile a list of ($Max\_Xi$, $Yi$) tuples for the various delay bursts seen within the simulation, where $Max\_Xi$ indicates the maximum delay and $Yi$ indicates the burst length associated with delay burst i;

iii. From the list compiled in step (ii), identify the largest $Max\_Xi$ value and the largest $Yi$ value, and place these two largest values together into a tuple to create ($Max\_Max\_Xi$, $Max\_Yi$). This anomalous tuple represents the worst-case scenario of packet delays and packet burst durations (for the particular "Service Group" of interest) in subsequent steps. Thus, a canonical delay burst that delays ALL packets by $Max\_Max\_Xi$ within a window of time given by $Max\_Yi$ will be injected into actual packet streams going to an OOKLA Test;

iv. Select a Z value that represents the fraction of the way through the OOKLA Performance Monitor Tests when the long-delay burst is injected into the stream of packets associated with the OOKLA Test;

v. Run a real-world OOKLA Performance Monitor Test, using a real OOKLA client and real OOKLA server.

vi. Calculate the average number N of canonical delay bursts that would occur (on average) during the duration of the OOKLA test. If, for example, the OOKLA test runs for $Test\_Time=40$ seconds and bursts were found to occur (on average) every $T=19$ seconds, then $N=ceiling(Test\_Time/T)=ceiling(40/19)=2$ canonical bursts of delay $Max\_Max\_Xi$ and for a duration of $Max\_Yi$ can be inserted into the path of packets within the OOKLA test;

vii. Insert an appropriate number N of canonical delay bursts into the OOKLA packet while the OOKLA Performance Monitor is running, where the packets receive a $Max\_Max\_Xi$ delay for a period time given by $Max\_Yi$. This delay is simply added to their normal delays due to the propagation path. The last $Max\_Yi$ canonical delay burst window should be inserted at a point that is a fraction Z of the way through the OOKLA test's completion; and viii. Measure the OOKLA Performance Monitor Test score (S) for the run associated with each run with a tuple of values given by ($Max\_Max\_Xi$, $Max\_Yi$, Z, N), and repeat the runs to get a statistical sampling of S scores, using the worst-case S score to specify the worst-case OOKLA score for this particular "Service Group" and using ($Max\_Max\_Xi$, $Max\_Yi$, Z, N) to define the nature of the delay bursts that attack the OOKLA packet streams. Then create a mapping from the "Service Group" and ($Max\_Max\_Xi$, $Max\_Yi$, Z, N) values to Prob("Green") and to the OOKLA worst-case S score.

A table of predicted OOKLA Performance Monitor Test scores (S) can be created for many different "Service Group" system types. The goal is to create a table associating the worst-case OOKLA Performance Monitor Score (S) with Prob("Green") values and with associated delay burst values within the ($Max\_Max\_Xi$, $Max\_Yi$, Z, N) tuple for each "Service Group" system type in a list of "Service Group" types. This may be accomplished as outlined below:

1. Repeat steps i-viii above for a larger number of "Service Group" configurations, in some embodiments even for hypothetical "Service Groups" that do not yet exist today;

2. Identify a particular "Service Group" type from a list of "Service Groups" containing various arrangements of Nsub subscribers, where each subscriber has a specifically-defined (Tmax, Tavg, Application Active Ratio) tuple. This "Service Group" definition should also specify the Available Bandwidth Capacity within the "Service Group;"

3. Create models for the Subscriber Probability Density Functions for each subscriber within the particular "Service Group" using the regression models output from Step 108 in FIG. 2A. Use the convolution methods described above to determine the associated Prob ("Green") value associated with each "Service Group" and the Available Bandwidth Capacity within the "Service Group;"

4. Since this is potentially a hypothetical "Service Group", there may not be actual data collected from the service group, hence in some instances traffic may need to be generated in a CMTS simulation environment for each subscriber by generating bursts from their per-Subscriber Bandwidth Probability Density Function models. In essence, this creates a Cumulative Distribution Function from each per-Subscriber Bandwidth Probability Density Function model. To determine the particular bandwidth level generated by a particular subscriber during a 1-second time window, a uniform random number generator can be used to access a random Variable J onto the y-axis of the Cumulative Distribution Function, and then a map can be made from J across to the Cumulative Distribution Function curve, and then down to the x-axis to select a 1-second bandwidth value for this particular subscriber to transmit. Repeated mappings of this nature can create a representative bandwidth curve for this particular subscriber. This process can be performed for all subscribers within the "Service Group." It should be noted that any localized bunching of bandwidth that might occur in the real-world will likely not be captured in this process. If it is desired to add this effect, then multiple 1-second bursts can be artificially moved together, but determining how to do this may be difficult;

5. The bandwidth bursts from all of the subscribers can then be aggregated together to create an aggregate bandwidth flow through the CMTS simulation environment. The CMTS simulator can then perform Traffic Management on the bandwidth and pass the bandwidth in a fashion similar to how it would be passed in a real-world CMTS. The simulation environment can keep track of per-subscriber delay bursts and packet drops. There will be clear delay bursts within the simulation model that occur every time an ingress bandwidth burst occurs. Labeled these delay bursts with a variable i, where i varies from 1 to the number of delay bursts. For a particular delay burst with the label i, that particular delay burst can be roughly characterized by looking at the worst-case delay $Max\_Xi$ experienced by any packet within that i-th delay burst ($Max\_Xi$). It can also be roughly characterized by the entire duration Yi (in time) of the delay burst.

Thus a list of ($Max\_Xi$, Yi) tuples can be created for the various delay bursts seen within the simulation, where $Max\_Xi$ indicates the maximum delay and Yi indicates the burst length associated with delay burst i. Repeat this for all subscribers;

6. Search through the list of all subscribers and identify the largest $Max\_Xi$ value and the largest Yi value. Put these two largest values together into a tuple to create ($Max\_Max\_Xi$, $Max\_Yi$). This anomalous tuple represents the worst-case scenario of packet delays and packet burst durations in subsequent steps. Thus, a canonical delay burst that delays ALL packets by $Max\_Max\_Xi$ within a window of time given by $Max\_Yi$ will be injected into actual packet streams going to an OOKLA Test;

7. Selecting a Z value which represents the fraction of the way through the OOKLA Performance Monitor Tests when the long-delay burst is injected into the stream of packets associated with the OOKLA Test 8. Run an OOKLA Performance Monitor Test;

9. Calculate the average number N of canonical delay bursts that would occur (on average) during the duration of the OOKLA test. If, for example, the OOKLA test runs for Test_Time=40 seconds and bursts were found to occur (on average) every T=19 seconds, then insert N=ceiling(Test_Time/T)=ceiling(40/19)=2 canonical bursts of delay $Max\_Max\_Xi$ and for a duration of $Max\_Yi$ into the path of packets within the OOKLA test;

10. Insert an appropriate number N of canonical delay bursts into the OOKLA packet while the OOKLA Performance Monitor is running . . . where the packets receive a $Max\_Max\_Xi$ delay for a period time given by $Max\_Yi$. This delay is added to their normal delays due to the propagation path. The last $Max\_Yi$ canonical delay burst window should be inserted at a point that is a fraction Z of the way through the OOKLA test's completion;

11. Measure the OOKLA Performance Monitor Test score (S) for the run associated with each run with a tuple of values given by ($Max\_Max\_Xi$, $Max\_Yi$, Z, N). Repeat the runs to get a statistical sampling of S scores; and 12. Repeat steps 1-11 for many different "Service Groups." This will create the desired table showing "Service Group" type, Prob("Green"), ($Max\_Max\_Xi$, $Max\_Yi$, Z, N), and worst-case OOKLA performance score (S).

Dynamically Alter "Service Group" Design in Response to Unacceptable QoE Metrics In steps 122 and 124, threshold values for acceptable operating levels were defined for each of the QoE metrics (Prob("Yellow"), the Prob("Green"), and the average time between successive "Yellow" Events. If the current QoE metric values or the futures-based predictions for the QoE metric values (as calculated in Steps 122 & 124) do not yield acceptable results (i.e.—they do not fall on the desirable side of the Threshold Values), then actions should be taken to "fix" the "Service Group." The system can automatically initiate many of these actions once triggered by the undesirable comparison between the actual QoE metric and the threshold values. As noted earlier, in some embodiments, service providers may wish to define different thresholds for acceptable QoE for different service groups, or even different thresholds for acceptable QoE for different subscriber service tiers within a service group.

Typical actions that can be taken in a DOCSIS Cable environment include:

i. Sending a message to initiate a node-split (the action the divides the subscribers in a "Service Group" up into two smaller "Service Groups" such that their newly defined "Service Groups" have lower Nsub values and lower bandwidth levels and better QoE;

ii. Sending a message to move high-bandwidth subscribers off of the DOCSIS Cable Service Group environment and into another Service Group (e.g. PON) environment so that the remaining subscribers in the DOCSIS Cable SG environment experience lower bandwidth levels and better QoE;

iii. Turning on more DOCSIS 3.0 or 3.1 channels so that the Available Bandwidth Capacity levels are increased and subscribers experience better QoE;

iv. Turning off DOCSIS 3.0 channels and replacing the DOCSIS 3.0 channels by new DOCSIS 3.1 channels so that the available bandwidth capacity levels are increased and subscribers experience better QoE;

v. Reducing the number of video channels (e.g. leveraging Switched Digital Video (SDV), converting MPEG-2 to MPEG-4 and/or reducing program counts), and replacing the video channels by new DOCSIS 3.1 channels so that the available bandwidth capacity levels are increased, and subscribers experience better QoE;

vi. Increasing the spectrum of the system by turning on more spectrum so that the available bandwidth capacity levels are increased and subscribers experience better QoE; and vii. Upgrading the HFC plant to a Distributed Access Architecture such as Remote PHY or Remote MAC-PHY that will potentially increase the modulation orders used by DOCSIS 3.1 channels, thus increasing available bandwidth.

Those of ordinary skill in the art will appreciate that this listing is non-exhaustive, and other actions may be taken to modify a Service Group to obtain acceptable operating levels.

Solution (2) in the Downstream Direction

As noted earlier, one embodiment of the disclosed systems and methods includes calculating the required bandwidth capacity given a Service Group size (Nsub), a particular set of characteristics for a given subscriber mix, and a required QoE level. This method may be achieved by first performing steps 102-118 shown in FIGS. 2A and 2B.

Figure 16:
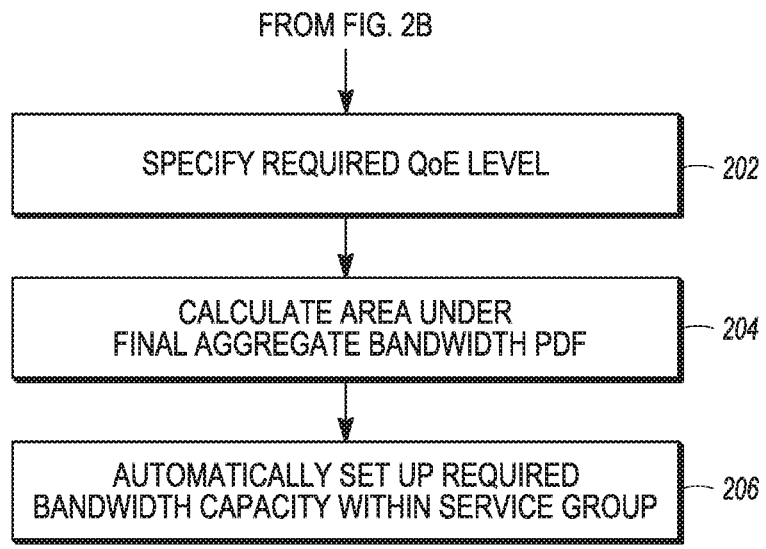
FIG. 16 shows an exemplary method for calculating the required bandwidth capacity given a Service Group size and given a particular set of characteristics for a given subscriber mix and a given a required QoE level.

Referring to FIG. 16, following step 118, the required Quality of Experience level is specified at step 202. This input can be given in terms of the Prob("Yellow") value desired, the Prob("Green") value desired, or the "Average Time Between Successive "Yellow" Events" value desired. Those of ordinary skill in the art will realize that, if any one of these three values are specified, the other two can be calculated). Thus, regardless of which value is input, the desired Prob("Green") value can be ascertained.

At step 204, numerical methods may preferably be used to successively calculate the area underneath the Final Aggregate Bandwidth Probability Density Function, beginning at zero bandwidth and advancing in a successive fashion across the bandwidths until the calculated area underneath the Final Aggregate Bandwidth Probability Density Function from zero bandwidth to a bandwidth value X is equal to or just slightly greater than the desired Prob ("Green") value. It should be noted that this procedure calculates the Cumulative Distribution Function associated with the Final Aggregate Bandwidth Probability Density Function. The value X is the value of interest, which is the required "Required Bandwidth Capacity" needed within the Service Group.

Finally, at step 206 actions are automatically selected to set up the required bandwidth capacity within the "Service Group." The system can automatically initiate many of these actions once triggered by the previous calculations. Potential such actions in a DOCSIS cable environment include:

1) turning on more DOCSIS 3.0 or 3.1 channels so that the available bandwidth capacity levels are established, and subscribers experience the desired QoE;
2) Turning off DOCSIS 3.0 channels, and replacing the DOCSIS 3.0 channels by new DOCSIS 3.1 channels so that the available bandwidth capacity levels are established and subscribers experience the desired QoE;
3) Reducing the number of video channels (e.g. leveraging Switched Digital Video (SDV), converting MPEG-2 to MPEG-4 and/or reducing program counts), and replacing the video channels by new DOCSIS 3.1 channels so that the available bandwidth capacity levels are established and subscribers experience the desired QoE;
4) Increasing the spectrum of the system by turning on more spectrum so that the available bandwidth capacity levels are established and subscribers experience the desired QoE;
5) Scheduling a node split; and
6) Upgrading the HFC plant to a Distributed Access Architecture such as Remote PHY or Remote MAC-PHY that will potentially increase the modulation orders used by DOCSIS 3.1 channels, thus increasing available bandwidth.

Those of ordinary skill in the art will appreciate that this listing is non-exhaustive, and other actions may be taken to set up the required bandwidth capacity within the "Service Group."

After the previous steps have been implemented, it may be beneficial to actually create a formula describing the "Required Bandwidth Capacity" for the particular system being defined. As can be seen above, "Required Bandwidth Capacity" is defined to be the particular (smallest) available bandwidth capacity value or X value calculated above. This can be done by executing the above steps for many different systems with various mixes of Tavg, Tmax, and Application Active Ratios on the subscribers. In the end, the desired formula might be of the form:

$$\text{Required Bandwidth Capacity} = f(Tavg, Tmax, \text{Application Active Ratios}, \text{Prob("Yellow")})$$
$$= Nsub*Tavg + \text{Delta}(Tavg, Tmax, \text{Application Active Ratios}, \text{Prob("Yellow")}).$$

Once many systems can be observed, the Delta formula can be calculated using Regression techniques.

The Nsub*Tavg portion of the formula can be considered the Tavg of the Service Group (Tavg_sg) and refined further. In this form, Tavg is the average bandwidth across all subscribers. As noted previously, Tavg may vary for each of the Subscriber Type groups. So a more accurate representation might be:

$$Tavg\_sg = Nsub*Tavg = \Sigma Nsub(i)*Tavg(i) \text{ for } i=1 \text{ to } n$$

where Nsub(1) and Tavg(1) is associated with the 1$^{st}$ Subscriber Type group and Nsub(n) and Tavg(n) are associated with nth Subscriber Type group.

The Delta function may also be refined to be:

$$\text{Delta}(Tavg, Tmax, \text{Application Active Ratios}, \text{Prob("Yellow")}) = Tburst + QoE\_\text{Delta}(Tavg, Tmax, \text{Application Active Ratios}, \text{Prob("Yellow")}) = Tmax\_max + QoE\_\text{Delta}(Tavg, Tmax, \text{Application Active Ratios}, \text{Prob("Yellow")})$$

where Tburst is the minimum acceptable bandwidth burst rate. For many operators, this will default to Tmax_max. In less competitive and unregulated areas, an operator might choose a lower Tburst (e.g. Tburst=50%*Tmax).

Solution (3) in the Downstream Direction

Figure 17:
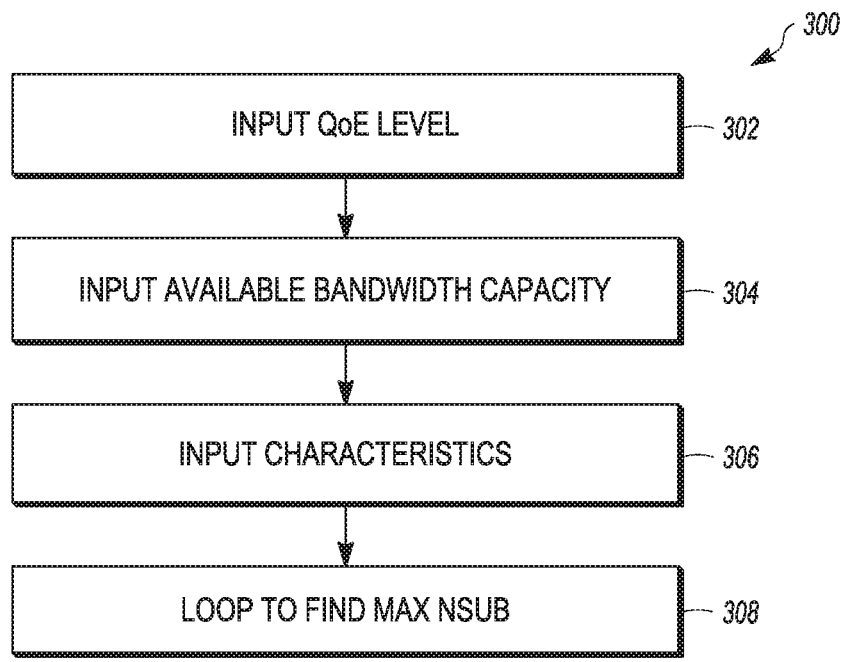
FIG. 17 shows an exemplary method for calculating a permissible Service Group size (Nsub) given the required QoE, the actual available bandwidth capacity, and a particular set of characteristics for a given subscriber mix.

As noted earlier, one embodiment of the disclosed systems and methods includes calculating the permissible Service Group size (Nsub) given the required QoE level, the actual available bandwidth capacity, and a particular set of characteristics for a given subscriber mix. FIG. 17 shows one method 300 that accomplishes this solution.

At step 302, a required QoE may be input, using any one or more of the three metrics described earlier, given by Prob("Yellow"), Prob("Green"), or Average Time Between Successive Yellow Events. Those of ordinary skill in the art will appreciate that, once one of the three metrics is input, the other two can be calculated.

At steps 304 and 306, the available bandwidth capacity within the "Service Group" and the appropriate set of characteristics (e.g. Tavg's and Tmax's, and application types being used) may be entered, respectively.

At step 308, a loop—generally comprising steps 102-118 shown in FIGS. 2A-2B—is repeatedly performed where the value of Nsub is progressively increased from an initial value until the largest value of Nsub is achieved that satisfies the three constraint inputs listed above, e.g. until Nsub has become so large that the required QoE metric is exceeded, after which the immediately preceding Nsub value is used as the output.

Those of ordinary skill in the art will appreciate that different embodiments may use different steps in the loop 308. For example, the steps referred to as optional in the foregoing description of FIGS. 2A and 2B may be omitted from the loop 308 without departing from the scope of the present disclosure.

Solution (4) in the Downstream Direction

Figure 18:
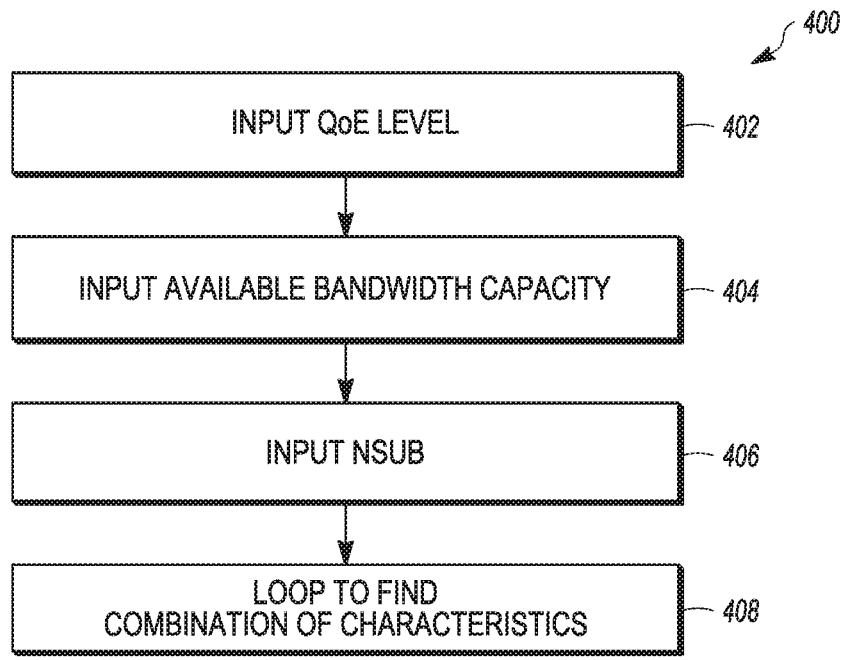
FIG. 18 shows an exemplary method for calculating permissible sets of characteristics for a given subscriber mix, "Service Group" size, required QoE level, and actual Available Bandwidth Capacity.

As noted earlier, one embodiment of the disclosed systems and methods includes calculating permissible sets of characteristics for a given subscriber mix, "Service Group"

size, required QoE level, and actual Available Bandwidth Capacity. FIG. 18 shows one method 400 that accomplishes this solution.

At step 402, a required QoE may be input, using any one or more of the three metrics described earlier, given by Prob("Yellow"), Prob("Green"), or Average Time Between Successive Yellow Events. Those of ordinary skill in the art will appreciate that, once one of the three metrics is input, the other two can be calculated.

At steps 404 and 406, the available bandwidth capacity within the "Service Group" and a selected "Service Group" size Nsub may be entered, respectively.

At step 408, a loop—generally comprising steps 102-118 shown in FIGS. 2A-2B—is repeatedly performed where values of {Tavg, Tmax, Application Active Ratio} are gradually increased from an initial value until the combination of {Tavg, Tmax, Application Active Ratio} is achieved that satisfies the three constraint inputs listed above, e.g. until the combination has become so large that the required QoE metric is exceeded, after which the immediately preceding Nsub value is used as the output.

Those of ordinary skill in the art will appreciate that different embodiments may use different steps in the loop 408. For example, the steps referred to as optional in the foregoing description of FIGS. 2A and 2B may be omitted from the loop 408 without departing from the scope of the present disclosure.

Moreover, it should be noted that the foregoing procedure makes the simplifying assumption that all Nsub subscribers share the same {Tavg, Tmax, Application Active Ratio} values. This method can be extended, however. to include various mixes of Subscriber Type groups to yield results with different {Tavg, Tmax, Application Active Ratio} values.

Solution (5) in the Downstream Direction

Figure 19:
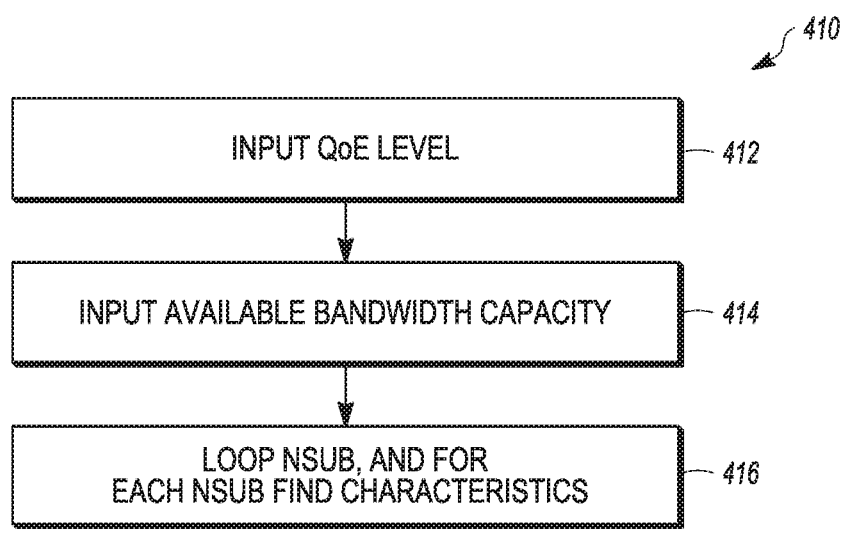
FIG. 19 shows an exemplary method for calculating permissible combinations of sizes for subscriber groups and particular sets of characteristics for those subscriber groups.
Figure 20:
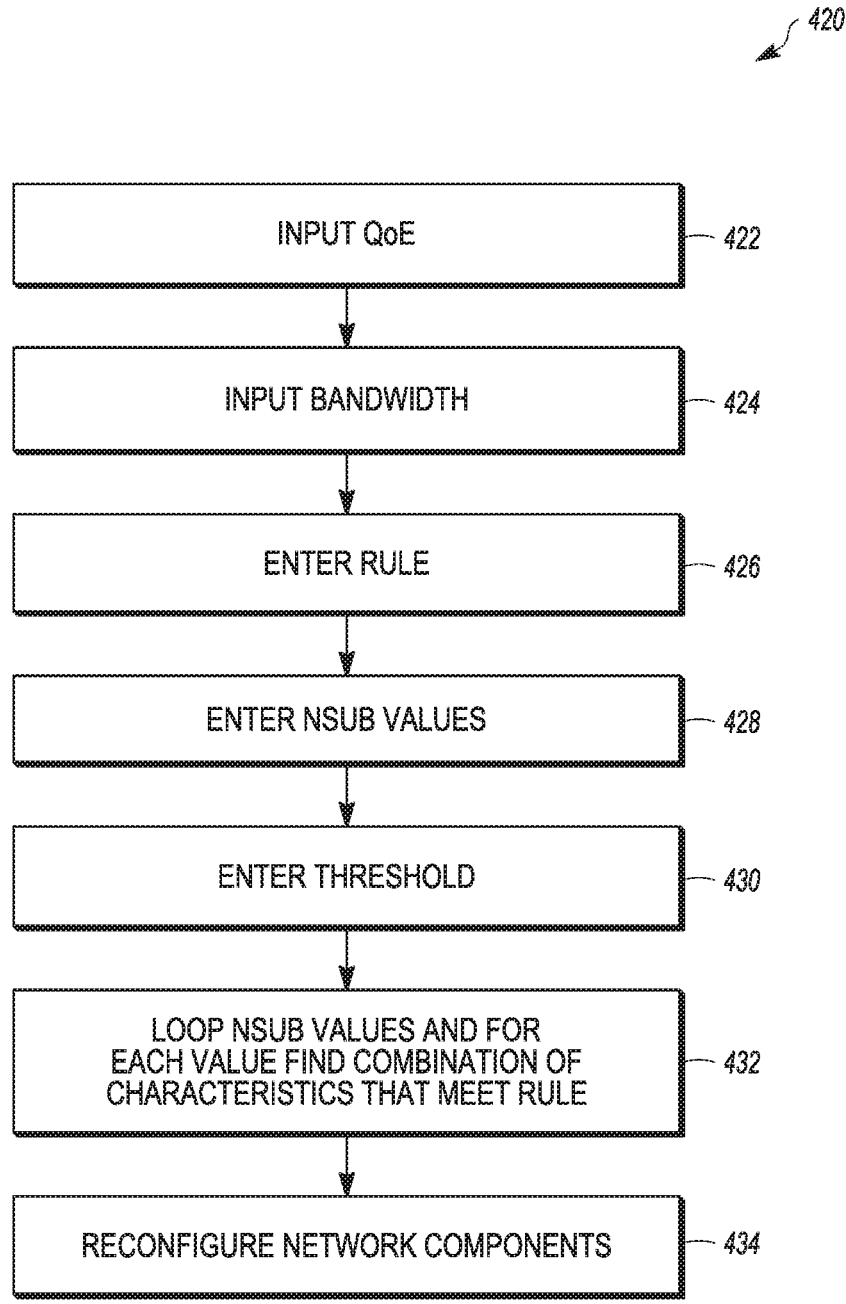
FIG. 20 shows an exemplary method for simultaneously calculating an appropriate Service Group size (Nsub) and a set of characteristics for that Service Group size.

Another embodiment of the disclosed systems and methods includes a method combining Solution (3) and Solution (4). In particular, this embodiment would require calculating a set of permissible Service Group sizes (Nsub values) along with a "minimalist" set of characteristics (Tavg, Tmax, and application types) for a given subscriber mix, required QoE level, and actual Available Bandwidth Capacity. FIG. 19 shows one method 410 that accomplishes this solution.

At step 412, a required QoE may be input, using any one or more of the three metrics described earlier, given by Prob("Yellow"), Prob("Green"), or Average Time Between Successive Yellow Events. Those of ordinary skill in the art will appreciate that, once one of the three metrics is input, the other two can be calculated.

At step 414, the available bandwidth capacity within the "Service Group" may be entered and at step 416, a loop—generally comprising steps 102-118 shown in FIGS. 2A-2B—is iteratively performed, where the value of Nsub is incremented from an initial value to a final value, and for each Nsub value, the values of {Tavg, Tmax, Application Active Ratio} are gradually increased from an initial value until the combination of {Nsub, Tavg, Tmax, Application Active Ratio} is achieved that satisfies the two constraint inputs listed above, i.e. until the combination has become so large that the required QoE metric is exceeded, after which the immediately preceding combination of {Nsub, Tavg, Tmax, Application Active Ratio} values is used as the output for that value of Nsub, and the next iteration of the loop is performed at the next incremental value of Nsub, until an Nsub value is reached for which no combination of attributes will satisfy the required QoE metric, after which the preceding Nsub value is used as the final value.

Those of ordinary skill in the art will appreciate that different embodiments may use different steps in the loop 416. For example, the steps referred to as optional in the foregoing description of FIGS. 2A and 2B may be omitted from the loop 416 without departing from the scope of the present disclosure.

Moreover, it should be noted that the foregoing procedure makes the simplifying assumption that all Nsub subscribers share the same {Tavg, Tmax, Application Active Ratio} values. This method can be extended, however. to include various mixes of Subscriber Type groups to yield results with different {Tavg, Tmax, Application Active Ratio} values.

Solution (6) in the Downstream Direction

Another embodiment of the disclosed systems and methods includes a different combination of Solution (3) and Solution (4). In particular, this embodiment would require calculating a Service Group sizes (Nsub value) along with a set of characteristics (Tavg, Tmax, and application types) that satisfy a desired rule for a given subscriber mix, required QoE level, and actual Available Bandwidth Capacity. FIG. 18B shows one method 420 that accomplishes this solution.

At step 422, a required QoE may be input, using any one or more of the three metrics described earlier, given by Prob("Yellow"), Prob("Green"), or Average Time Between Successive Yellow Events. Those of ordinary skill in the art will appreciate that, once one of the three metrics is input, the other two can be calculated.

At step 424, the available bandwidth capacity within the "Service Group" may be entered, and at step 426, a desired rule may be entered. Rules can take many forms. An example of a rule might be that the QoE Level must be acceptable and that the Nsub value must be within a pre-specified range and that the total revenues generated by the subscriber pool must exceed some pre-defined value. Since the revenue per subscriber is associated with the Tmax setting of the subscriber, the rule might state that the QoE Level must be acceptable and that the Nsub value must be within a pre-specified range and that the product of the Nsub value times the Tmax value must be greater than a particular pre-defined threshold (since the product of the Nsub value times the Tmax value may be related to the total revenues generated by the subscriber pool).

Assuming such a rule, at step 428, the minimum permissible Nsub value and that maximum permissible Nsub value may be entered, which together define the pre-specified range for Nsub values. At step 430, the pre-defined threshold value (to be compared against the product of the Nsub value times the Tmax value) may be entered.

At step 432, a loop—generally comprising steps 102-118 shown in FIGS. 2A-2B—is repeatedly performed where the value of Nsub is incremented from the minimum permissible Nsub value to the maximum permissible Nsub value, and for each Nsub value, the values of {Tavg, Tmax, Application Active Ratio} are gradually increased from an initial value to a final value until the rule is satisfied—i.e., until the QoE Level becomes acceptable and the product of the Nsub value times the Tmax value is greater than the pre-defined threshold. Once a set of values that satisfy the rule have been found, the resulting combination of {Nsub, Tavg, Tmax, Application Active Ratio} values is used as the output that satisfies the rule.

Those of ordinary skill in the art will appreciate that different embodiments may use different steps in the loop 432. For example, the steps referred to as optional in the foregoing description of FIGS. 2A and 2B may be omitted from the loop 612 without departing from the scope of the present disclosure.

Moreover, it should be noted that the foregoing procedure makes the simplifying assumption that all Nsub subscribers share the same {Tavg, Tmax, Application Active Ratio} values. This method can be extended, however to include various mixes of Subscriber Type groups to yield results with different {Tavg, Tmax, Application Active Ratio} values.

Moreover, it should be noted that automated actions can be executed by the CMTS to dynamically re-configure the network components (e.g. using OpenFlow or Netconf/YANG messages to detour traffic to different ports or to change the settings on dynamically-configurable Fiber Nodes) to ensure that all of the service groups are sized to match the {Nsub, Tavg, Tmax, Application Active Ratio} combination that was output from the above algorithm. This is illustrated in optional step 434.

Predicting Forward Life Span of a "Service Group" and Automatically and Dynamically Altering "Service Group"

Another valuable tool that can be used to help trigger actions within an Artificial Intelligence engine is a disclosed tool that predicts the required bandwidth capacity on a month-by-month or year-by-year basis, going forward into the future. This tool preferably performs this calculation with inputs of the current Available Bandwidth Capacity, the highest and lowest acceptable Prob("Green") QoE levels, the CAGR (Cumulative Annual Growth Rate) for Tmax values, and the CAGR (Cumulative Annual Growth Rate) for Tavg values. The particular nature of the "Service Group" should preferably also be specified, which in some manner describes the size (Nsub) of the "Service Group" and the current (Tmax, Tavg, Application Active Ratio) values for each of the Nsub subscribers within the "Service Group." The CAGR values can be used to re-calculate the (Tmax, Tavg, Application Active Ratio) values for each of the Nsub subscribers at different months or years into the future.

Figure 21:
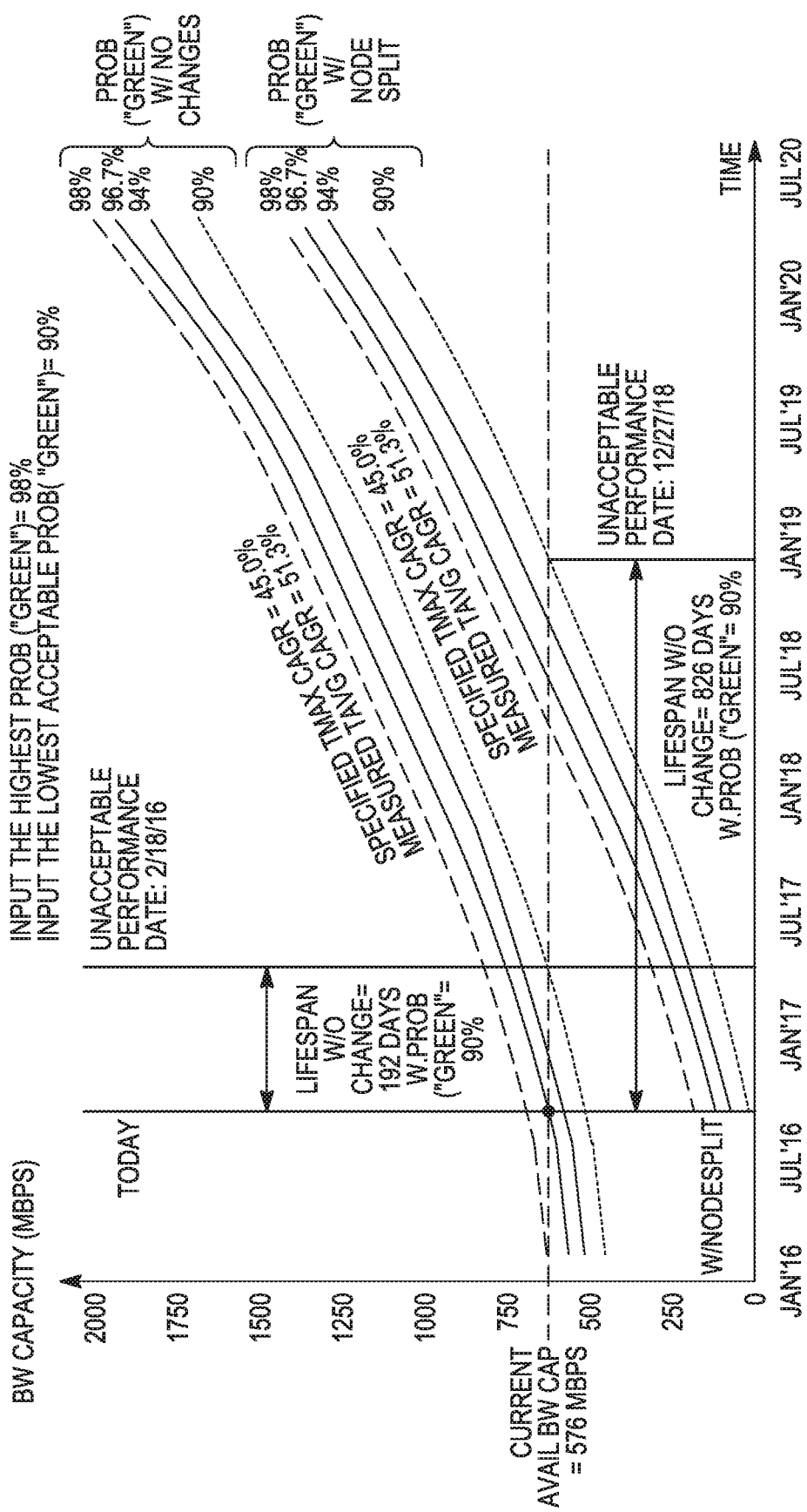
FIG. 21 shows an exemplary method for determining the life span of a "Service Group," with and without a node split.

Referring to FIG. 21, with the (Tmax, Tavg, Application Active Ratio) values for each subscriber at each moment (month or year) in the future, the steps 102-118 disclosed above may be used to calculate the required bandwidth capacity at different points in time (by creating the regression-based models of Bandwidth Probability Density Functions for each subscriber at each point in time, and then convolving the Bandwidth Probability Density Functions for each set of Nsub subscribers at each point in time to create the Final Aggregate Bandwidth Probability Density Function for the "Service Group" at each point in time, and then the Required Bandwidth Capacity can be calculated for a range of acceptable Prob("Green") Quality of Experience levels. As long as the current available bandwidth capacity is greater than the required bandwidth capacity for the lowest permissible Prob("Green") QoE level, then the current "Service Group" will continue to provide adequate service and will have a life-span that extends deeper into the future. When the current available bandwidth capacity is less than the required bandwidth capacity for the lowest permissible Prob("Green") QoE level, then the current "Service Group" will not provide adequate service, and will have to end its life-span, thus requiring a change of some sort. This procedure therefore permits the life-span for the current "Service Group" to be determined.

In some embodiments, the number of subscribers may be reduced to simulate a typical Node-split activity, which turns a single node into two or more nodes and spreads the Nsub subscribers across the two or more nodes. Also, the Nsub subscribers may or may not be equally distributed across all the new smaller nodes. Using this new "Service Group" definition, the steps listed in the previous paragraph can be repeated and the life-span of the "Service Group" with a Node-split can be calculated.

Once the tool has created the information on the life-span of the current "Service Group" (with and without a node split), this information can be used to trigger dynamic and automatic alteration of the "Service Group" at an appropriate time preceding the end of life for the "Service Group." These alterations can include:

1) turning on more DOCSIS 3.0 channels so that the available bandwidth capacity levels are established and subscribers experience the desired QoE;
2) turning on more DOCSIS 3.1 channels so that the available bandwidth capacity levels are established and subscribers experience the desired QoE;
3) turning off DOCSIS 3.0 channels, and replacing the DOCSIS 3.0 channels with new DOCSIS 3.1 channels so that the available bandwidth capacity levels are established and subscribers experience the desired QoE;
4) reducing the number of video channels (e.g. leveraging Switched Digital Video (SDV), converting MPEG-2 to MPEG-4 and/or reducing program counts), and replacing the video channels with new DOCSIS 3.1 channels so that the available bandwidth capacity levels are established and subscribers experience the desired QoE;
5) Increasing the spectrum of the system by turning on more spectrum so that the available bandwidth capacity levels are established and subscribers experience the desired QoE;
6) scheduling a Node split; and
7) Upgrading the HFC plant to a Distributed Access Architecture such as Remote PHY or Remote MAC-PHY that will potentially increase the modulation orders used by DOCSIS 3.1 channels, thus increasing available bandwidth.

Those of ordinary skill in the art will appreciate that this listing is non-exhaustive, and other actions may be taken to dynamically and automatically alter the "Service Group."

Another potential application is in the Remote PHY case. In a Fiber Deep R-PHY scenario, there may only be a couple dozen subscribers per R-PHY Device (RPD). Multiple RPD may be concentrated together to form a single DOCSIS MAC domain Service Group in order to most effectively utilize CCAP Core resources. Which RPDs are grouped together can greatly impact each Service Group QoE. An intelligent tool can analyze subscriber usage to classify them and effectively create a bandwidth pdf per RPD. The tool can then decide which RPD to group together to get optimum performance.

Solution (1) in the Upstream Direction

The "upstream" direction in a DOCSIS system is comprised of the flow of packets propagating from the cable modems in the home through the Hybrid Fiber Coax plant and to the CMTS and then onward to the Router that feeds the Internet. Unfortunately, the elements in the network that are likely to be Upstream "choke points" are most likely the cable modems within the homes, because the bonded upstream channels within the Hybrid Fiber Coax hop are probably lower in bandwidth than any other link in the upstream path. Ideally, the upstream bandwidth samples (of Step 1) would be measured at the ingress links on these "choke-point" cable modems. These ingress links on the cable modems are typically Ethernet or WiFi links within the subscribers' homes. Since there are so many of them, and since they are not usually accessible, it is much more difficult to acquire bandwidth measurements at those ingress "choke points." Ideally, this is what could be done and the steps of solution (1) in the upstream direction can in some embodiments be identical to those described previously described for the downstream direction, but in this ideal situation, the bandwidth samples would be taken at the Ethernet and WiFi links within all of the homes feeding the "Service Group."

Figure 22:
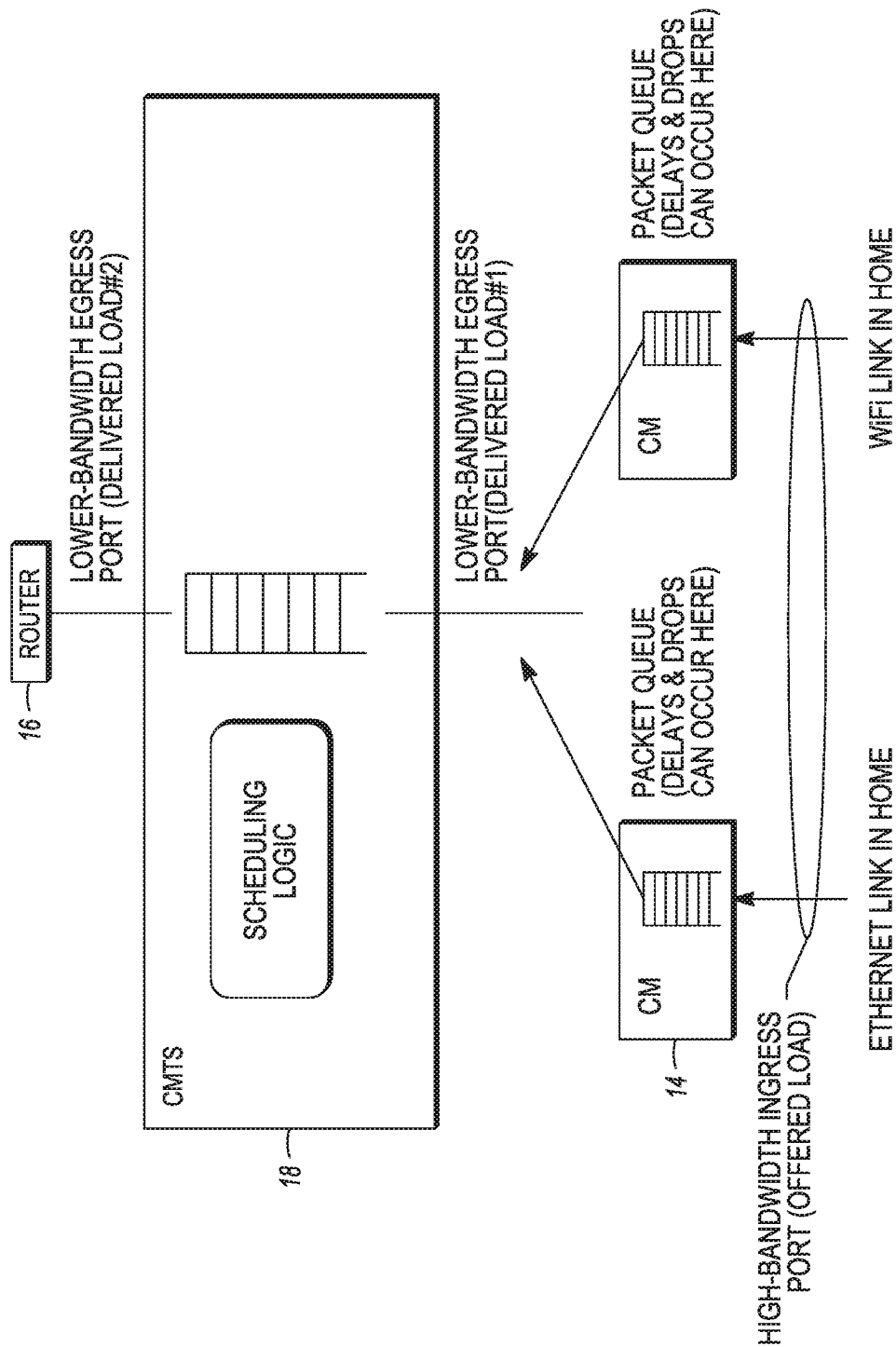
FIG. 22 schematically illustrates the flow of data in an upstream direction.

However, where it is impractical to measure these bandwidth samples, an alternative embodiment, which may introduce some acceptable error, should be used for the upstream direction. Referring to FIG. 22, the Ethernet and WiFi links are beneath the cable modems (CMs), and the union of all of those links from all subscriber homes creates the logical high-bandwidth ingress port for the upstream system of interest. The queues in the cable modems create the choke points where packet streams may incur a bottleneck. These cable modem queues are the "choke points" for the upstream flows, and this is where queueing and delays and packet drops can occur. The actual upstream hybrid fiber coax is the lower-bandwidth egress port. Bandwidth sample measurements would ideally be taken at the Ethernet and WiFi links beneath the cable modems.

If access to those points are not available, then the bandwidth sample collection points should preferably be moved to a different location, such as the CMTS or at the northbound links or network elements above the CMTS. As a result of this modification, the bandwidth samples are taken at the "wrong" location, and some form of correction may in some embodiments be made for the morphing that might take place between the ideal sampling location and the actual sampling location. These morphs result from the fact that the delays and drops from the cable modem queues have already been experienced by the packet streams if bandwidth sample measurements are taken at the CMTS or north of the CMTS. In essence, the fact that the packets passed through the cable modem queues and Hybrid Fiber Coax Channels already is likely to smooth out the bursts. In addition, if bandwidth sample measurements are taken on links or elements north of the CMTS, then the morphs will also include the impacts resulting from the CMTS processing the Upstream packets and potentially bunching them together before they are re-transmitted to the north-bound links, which may reintroduce some burstiness.

Figure 23:
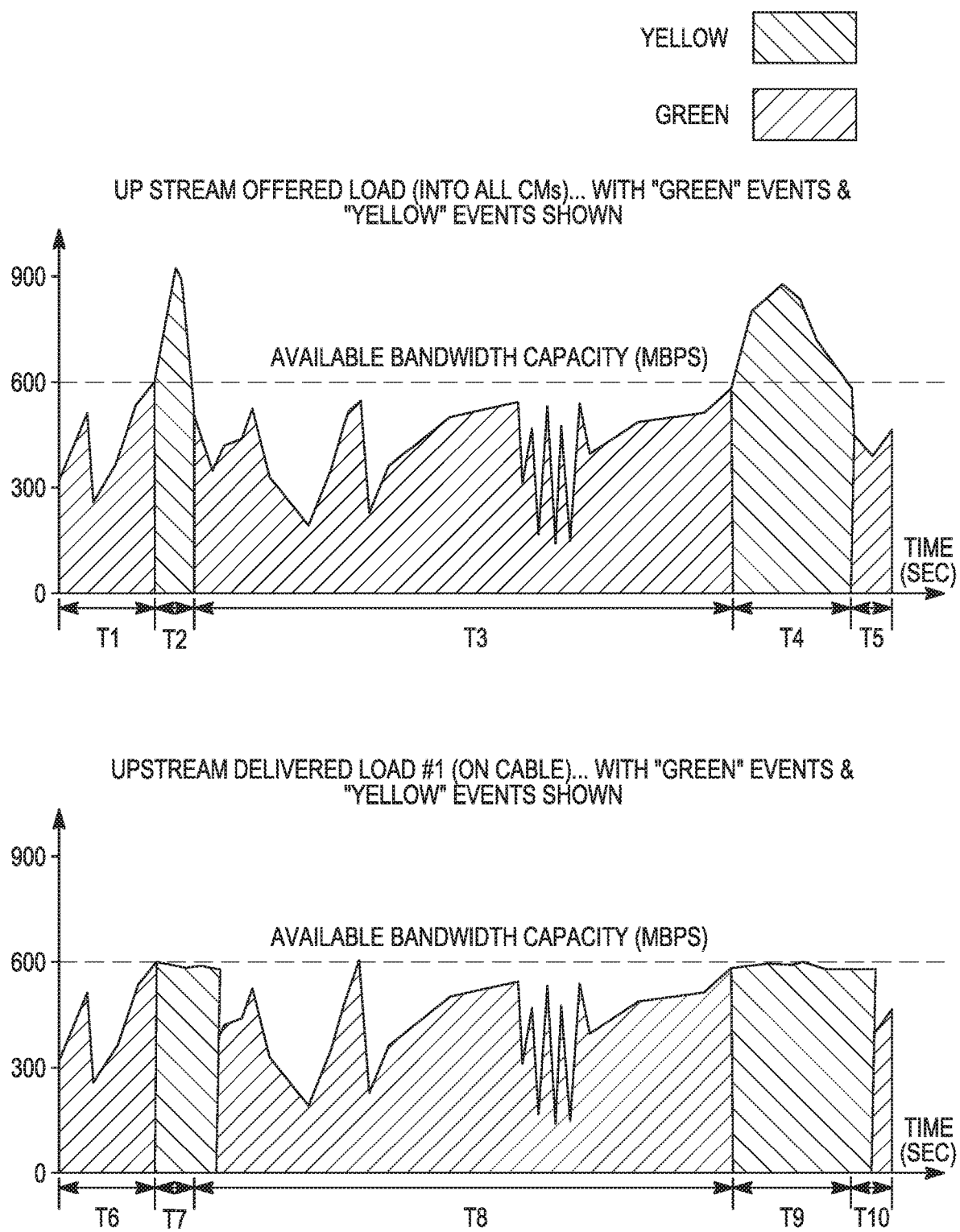
FIG. 23 illustrates potential problems with information flowing in the upstream direction.

Thus, sampling at the CMTS (or north of the CMTS) may result in slightly lowered estimates of the available bandwidth capacity requirements. However, the CMTS Upstream scheduling cycle is on the order of several milliseconds, which is small when considering a 1-sec sample window. Accordingly, as long as the entire upstream scheduler process introduces a minimal amount of delay, e.g. 50 msec, one plausible embodiment is to simply use the bandwidth samples collected in the CMTS (or north of the CMTS) and perform the rest of the steps 104-118 without any change. Alternatively, in other embodiments, the required bandwidth capacities may be increased slightly for the upstream solution. This may also result in slightly increased estimates for the QoE, so the resulting QoE levels may be decreased slightly for the upstream solution. All of these issues can result from the fact that the high peak bandwidths generated by the cable modems within the measured "Service Group" will be clamped to be no higher than the available bandwidth capacity. In addition, the periods of time when the bandwidth is clamped at the available bandwidth capacity may be artificially lengthened due to the actions of the queues within the cable modems. Fortunately, these effects are not typically impacting only a single modem—these effects will typically impact many modems that happened to be transmitting when the peak bandwidth is clamped to the available bandwidth capacity level. As a result, the impact of this clamping effect is distributed across many modems, and the morphs for any particular modem are minimal. These issues are all illustrated in FIG. 23.

In other embodiments, it may be preferable to provide instrumentation in the CMTS to more accurately measure the upstream traffic. If measurements are taken and it is known that the CMTS upstream data did not reach any of the congested "yellow" regions in FIG. 21, then there is very accurate data. If the percentage of time that the upstream is congested is known, then will define a certain level of confidence.

Example Instantiations

Figure 24:
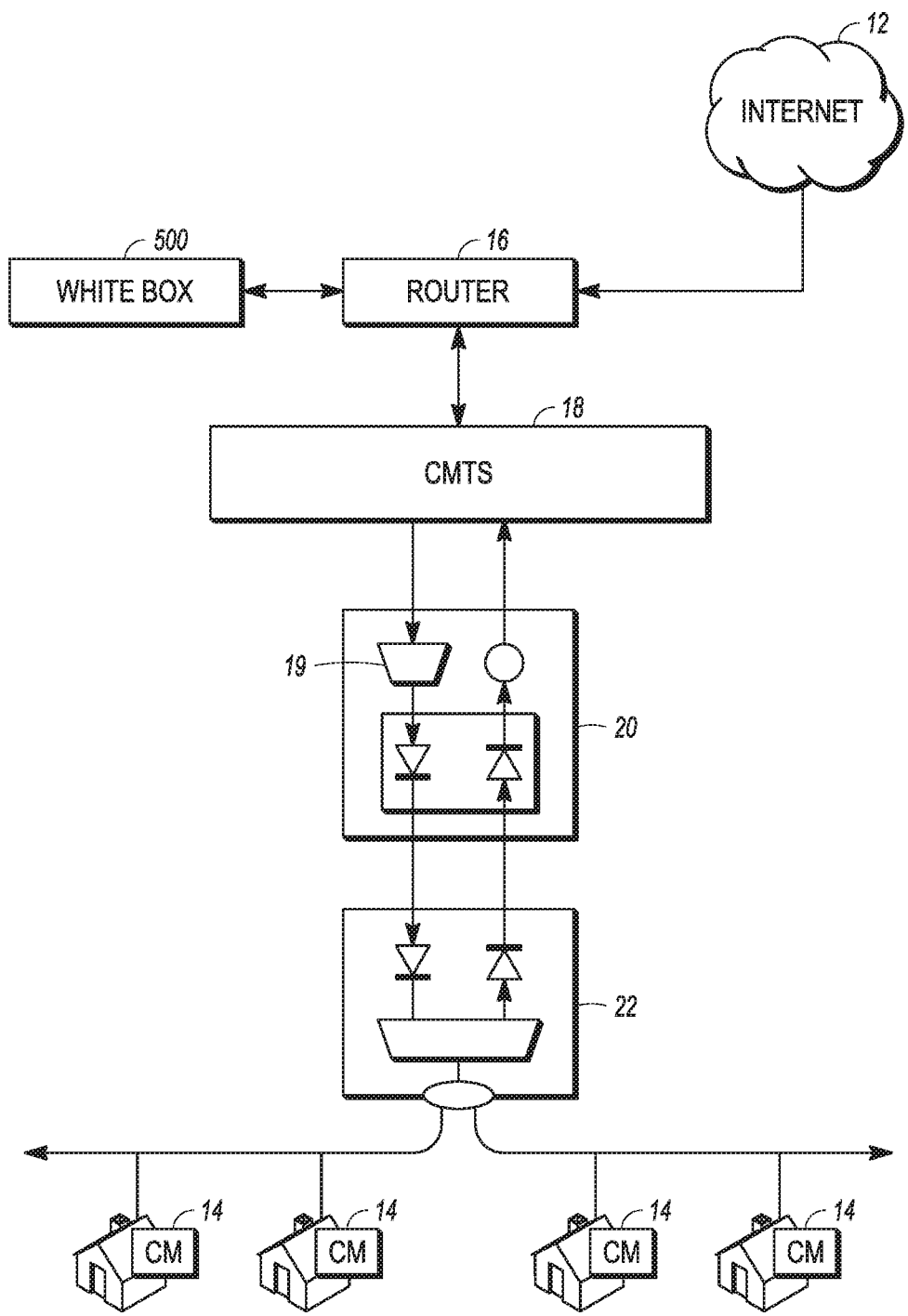
FIG. 24 shows an exemplary system utilizing white box hardware to perform one or more functions described in the present specification.

A number of different physical embodiments of systems implementing the foregoing disclosure is possible. For example, as shown in FIG. 24, one particular instantiation may use white box hardware 500 that can receive one or more Ethernet links to a CMTS 18 at a relatively high data-rate.

Ideally, the number of ingress Ethernet links into the white box hardware should be greater than or equal to the number of active ingress Ethernet links feeding the CMTS 18. The Ethernet links connected to these input ports on the white box hardware should also be connected to ports on the router (or switch) to the North of the CMTS. The downstream packets being directed at the CMTS 18 can then be port-mirrored and sent to both the CMTS 18 and the white box hardware. Upstream packets being sent north from the CMTS 18 can also be port-mirrored and sent to both the Internet and the white box hardware.

Since the white box hardware receives every packet sent to and sent from the CMTS 18, it can record the bandwidth to and from each subscriber IP address on a second-by-second basis during the busy period. This information can be constantly updated and archived to a disk within the white box server (or to a remote disk farm). This permits the white box hardware to continually update and expand on the accumulated bandwidths for all subscribers, as defined in step 102.

Once the data samples have been collected, then the post-processing steps 104 etc. can also be implemented by the processors within the white box server. These steps can include communicating via SNMP or CLI or other protocols to the CMTS 18 to acquire information about the particular subscribers attached to the CMTS 18 and their subscriber Service Level Agreement settings. These steps can also include communicating via SNMP or CLI or other protocols to the CMTS 18 to change settings on the number of channels or bandwidth of channels in response to the triggers that are generated as a result of the statistical analyses that are performed within Steps 104 etc.

Some of the key advantages of this approach include:
1. its ability to work with any generic CMTS architecture—from Integrated CCAP to Distributed Access Architectures;
2. its ability to work with any vendor's CMTS or CM equipment;
3. all of the original data and timestamp information is preserved so additional analysis can be performed in the future;

4. it aligns nicely with future directions of virtualizing routers and CMTS functionality into the cloud;

However, some of the drawbacks include the network bandwidth and storage capacity requirements of the white box server, especially if it must monitor across many CMTS in a very large system.

Alternatively, some or all of the statistical analyses might be performed within the CMTS. For example, the CMTS 18 could examine every packet passing through it; assign it to an appropriate Subscriber Type group; and then collect relevant statistics such as Tavg and calculate the bandwidth pdf for that Subscriber Type group. The CMTS 18 may also collect relevant statistics for each of its Service Groups such as Tavg and any associated QoE thresholds for that Service Group.

In some embodiments where the CMTS 18 performs some of the statistical analyses, the white box 500 may periodically poll each CMTS 18 in the system to gather this intermediate data. This can include communicating via SNMP or CLI or other protocols to the CMTS 18 to acquire information. The polling might be done on the order of seconds, minutes, hours or days depending on the information being retrieved. Additional post processing may then be performed by the white box server. This may include taking data from multiple CMTS's 18 and merging the data into a single profile for the entire system.

Some of the key advantages of this approach include:
1. it can be implemented across every CMTS, so statistics is being gathered for every single user.
2. it dramatically reduces the network bandwidth and storage requirements needed by the white box server.
3. processing is being done in real-time and does not require any post-processing to see some of the results.

It could be envisioned that both implementations above could be used jointly. The functions done in the CMTS 18 provides basic analysis across an operator's entire footprint; while a white box server could still receive port-mirrored packets from a given CMTS 18 where it performs more comprehensive statistical analyses on the information.

Those of ordinary skill in the art will appreciate that, although a CMTS 18 as shown and described to illustrate the disclosed subject matter in the context of a CATV hybrid-fiber coax architecture, other embodiments of the disclosed systems and methods may be used in other data distribution systems, e.g. cellular networks, telephone/DSL networks, passive optical networks (PON), etc. Thus, the disclosed systems and methods are relevant to any system that delivers data, voice, video, and other such downstream content from a common source to a multiplicity of customers via a distribution network, and or delivers upstream content from each of a multiplicity of customers to a common destination via such a distribution network.

Figure 25:
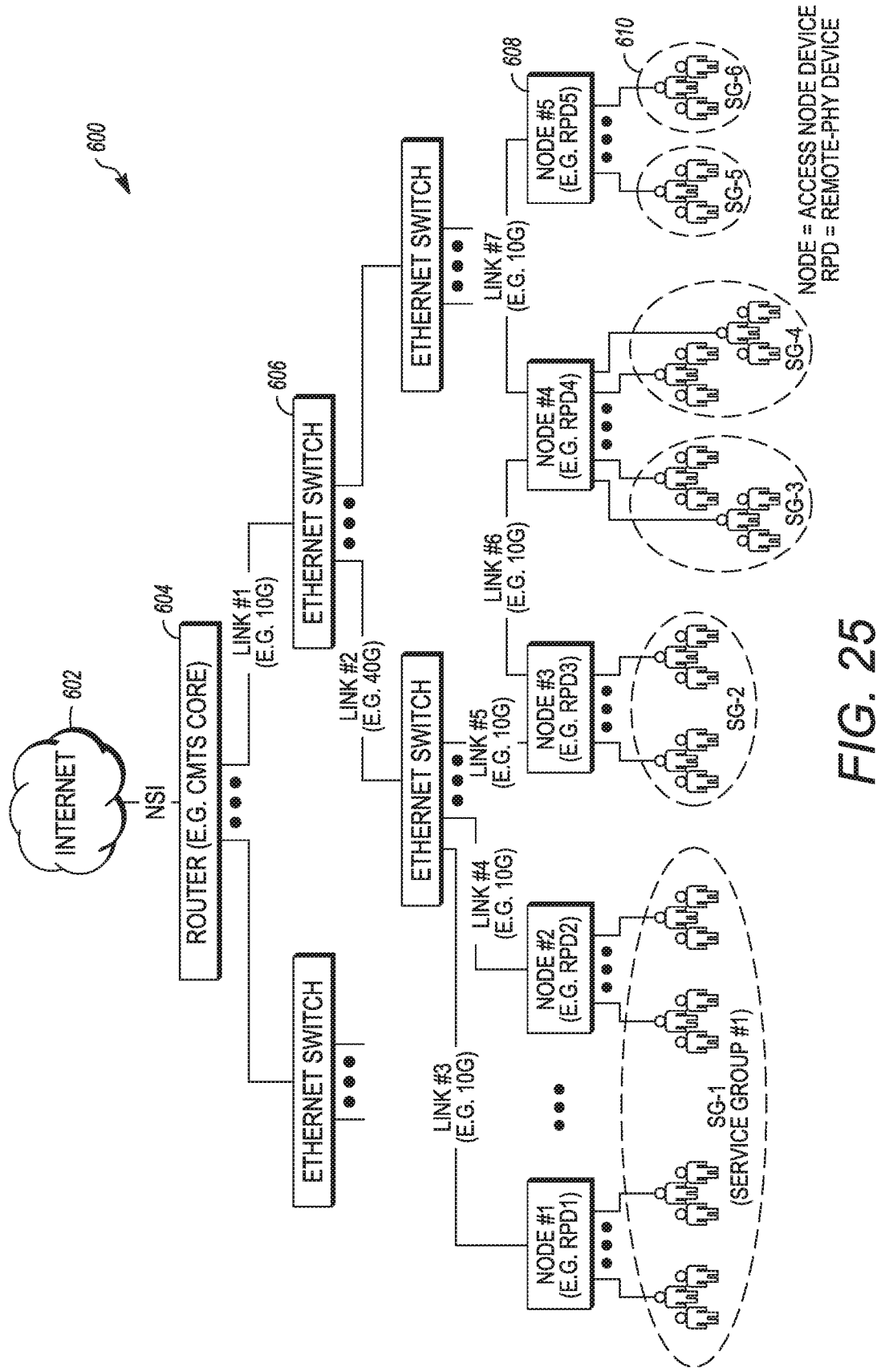
FIG. 25 shows a distributed access architecture capable of implementing embodiments of the disclosed systems and methods.

For example, FIG. 25 shows a distributed access architecture 600 for distributing content to a plurality of customer or subscriber groups 610 from the Internet 602 via a router 604 and a network of Ethernet switches 606 and nodes 608. In this architecture, the router 604 may receive downstream content from the Internet 602 and relay that content along a branched network, controlled by the Ethernet switches 606, to nodes 608. Each node 608 services a respective group of subscribers 610.

The distributed architecture 600 is particularly useful for automated response to the information gleaned from the probability distribution functions, as described earlier in the specification. As one example, the router 604 and/or Ethernet switches 606 may dynamically adjust service group sizes in response to measurements indicating that QoE is, or will, degrade to unacceptable levels based on probability distribution functions for a current or future time period. As another example, the router 604 and/or Ethernet switches may reconfigure customers 610 into different subscriber groups based on usage patterns so as to reduce the probability that bandwidth demand on the router 604, or any Ethernet switch 606, rises to a level that would produce a QoE deemed unacceptable. In still another example, where data to particular customers or groups of customers may be provided through more than one Ethernet switch, or links between nodes, different sets of Ethernet switches may be activated or deactivated during certain times of the day to provide required bandwidth when it is most likely to be demanded. In still another example, a node split may be automatically triggered when the systems and methods determine it is necessary, as described earlier. In still another example, the disclosed systems and methods may utilize service groups of different sizes, e.g. service group 1 of size four and service group 2 of size 2 as shown in FIG. 25. Those of ordinary skill in the art will appreciate that the system 600 provides many different opportunities to automatically, dynamically respond to information provided by the automated analysis of probability functions measured by sampling packets of data to subscribers, as described earlier, to maintain a desired QoE over time.

Those of ordinary skill in the art will appreciate that in each of the examples illustrated in the preceding paragraph, it is desirable to perform one or more of the analyses described earlier (e.g. sampling, creation of a pdf, regression, forward-time analysis etc.) on each of the Service Groups defined in the system of FIG. 25, as well as all the intermediate links (e.g. links #1 to #7), as well as the Internet connection to the router 604.

Those of ordinary skill in the art will also appreciate that the automated response of a system, such as the system 600, may be initiated in many different manners. For example, the router/CMTS core 604 may include circuitry for controlling Ethernet switches 606 and/or nodes 608 in response to data measured in the router CMTS core 604. Alternatively, data measured on the router 604 may be transmitted to a remote device, such as the white box 500 of FIG. 24 or a remote server for analysis and subsequent remote automated control of the Ethernet switches 606 and/or nodes 608. In still other embodiments, one or more nodes 608 may include circuitry for automatically implementing a node split when instructed.

The above methods provide a powerful way to architect and manage bandwidth for both present-time and future networks. The methods were described for examples using High-Speed Data traffic. But since the measurement techniques (sampling bandwidth every second) are applicable to other traffic types (ex: Video, Telephony, etc.), the methods can be used in a similar fashion for many different traffic types.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An apparatus that distributes content to a plurality of groups of customers over a distribution network, each group of customers having an associated time varying bandwidth demand on said device, said apparatus comprising:
at least one measurement instrument capable of monitoring respective packets of data associated with each of said plurality of groups of customers, to sample said time-varying bandwidth demand for each said group of customers as said packets of data pass through said device; and
a processor that uses samples received from said at least one measurement instrument to construct at least one probability distribution function associated with a one of said plurality of groups of customers, the probability distribution function measuring the relative likelihood that said one of said plurality of groups of customers' demands bandwidth at each of a range of bandwidth values; where the samples used by the processor are measured over an interval no longer than approximately one second, and are used to construct a first probability distribution function associated with a present time, and a second probability distribution function associated with a future time.

2. The apparatus of claim 1 including a CMTS in a CATV distribution network.

3. The apparatus of claim 2 where the measurement instrument measures packets of data entering said CMTS from a router to the Internet.

4. The apparatus of claim 2 where the measurement instrument is in the CMTS and the processor is in a device remotely connected to the CMTS.

5. The apparatus of claim 1 where the measurement instrument monitors packets of data moving in a downstream direction to said groups of customers.

6. The apparatus of claim 1 where the measurement instrument monitors packets of data moving in an upstream direction from said groups of customers.

7. A method for automatically generating a probability distribution function measuring the relative likelihood that one of a plurality of groups of customers in a distribution network instantaneously demands bandwidth, from a distribution device, at each of a range of bandwidth values, the method comprising:
sampling packets of data passing through said distribution device to measure a time varying bandwidth usage for each of a plurality of customers;
grouping said plurality of customers into respective ones of said plurality of groups of customers;
automatically calculating a super-set of average bandwidth samples for each one of said plurality of groups of customers;
automatically creating a relative frequency histogram using the super-set of average bandwidth samples; and
automatically creating the probability distribution function using the relative frequency histogram; where the method also includes the steps of:
creating an individual probability distribution function for each subscriber in a respective one of said plurality of groups of customers; and
convolving the individual distribution functions together to create an aggregate probability distribution function for the respective one of said plurality of groups of customers.

8. The method of claim 7 including the steps of convolving together individual probability distribution functions for each of a plurality of service type groupings within a service group to obtain a plurality of service type probability distribution functions, and convolving the service type probability distribution functions together to obtain the aggregate probability distribution function.

9. The method of claim 7 where the subscribers are grouped by at least three of Tmax, Tavg, application active ratio, and application silent ratio.

10. The method of claim 7 where the grouping is automatic.

11. The method of claim 7 including the step of creating a cluster of at least two groups of said plurality of customers and calculating a super-set of average bandwidth samples for said cluster.

12. The method of claim 7 where the relative frequency histogram is constructed using bin sizes selected based on the maximum bandwidth levels displayed by each subscriber.

13. The method of claim 7 where the respective sizes of bins in the relative frequency histogram are selected to minimize rapid changes in the shape of the frequency histogram between successive bins.

14. The method of claim 7 where probability distribution is created from the relative frequency histogram by dividing each bin value in the relative frequency histogram by the bin size.

* * * * *